(12) United States Patent
Khoshnevis et al.

(10) Patent No.: US 8,923,224 B2
(45) Date of Patent: Dec. 30, 2014

(54) QUANTIZING RELATIVE PHASE AND RELATIVE AMPLITUDE FOR COORDINATED MULTIPOINT (COMP) TRANSMISSIONS

(75) Inventors: Ahmad Khoshnevis, Portland, OR (US); Sayantan Choudhury, Berkeley, CA (US); John M. Kowalski, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 632 days.

(21) Appl. No.: 13/209,155

(22) Filed: Aug. 12, 2011

(65) Prior Publication Data

US 2013/0039283 A1 Feb. 14, 2013

(51) Int. Cl.
*H04W 72/04* (2009.01)
*H04B 7/02* (2006.01)
*H04B 7/06* (2006.01)

(52) U.S. Cl.
CPC ............ *H04B 7/024* (2013.01); *H04B 7/0626* (2013.01); *H04B 7/0639* (2013.01)
USPC .......................................... 370/329; 455/101

(58) Field of Classification Search
USPC ............ 370/329–330, 341, 431; 455/101, 69, 455/562.1
See application file for complete search history.

(56) References Cited

U.S. PATENT DOCUMENTS

| | | | |
|---|---|---|---|
| 7,099,634 B2 * | 8/2006 | Tanaka | 455/101 |
| 8,385,452 B2 * | 2/2013 | Gorokhov | 375/267 |
| 2003/0124995 A1 * | 7/2003 | Tanaka | 455/101 |
| 2004/0233871 A1 * | 11/2004 | Seki et al. | 370/331 |
| 2005/0111742 A1 | 5/2005 | Seo | |
| 2005/0117660 A1 * | 6/2005 | Vialle et al. | 375/299 |
| 2006/0018389 A1 * | 1/2006 | Koorapaty et al. | 375/259 |
| 2006/0209883 A1 * | 9/2006 | Suzuki | 370/465 |
| 2008/0139135 A1 | 6/2008 | Abreu et al. | |
| 2008/0214127 A1 | 9/2008 | Karmi et al. | |
| 2010/0040012 A1 * | 2/2010 | Uchishima | 370/329 |
| 2010/0104033 A1 * | 4/2010 | Gorokhov | 375/260 |
| 2011/0299379 A1 | 12/2011 | Sesia et al. | |
| 2012/0020433 A1 * | 1/2012 | Bhattad et al. | 375/296 |
| 2013/0195035 A1 * | 8/2013 | Taoka et al. | 370/329 |
| 2013/0201912 A1 * | 8/2013 | Sheng et al. | 370/328 |

FOREIGN PATENT DOCUMENTS

| | | |
|---|---|---|
| EP | 1523195 | 4/2005 |
| WO | 2010/048513 | 4/2010 |
| WO | 2010/081736 | 7/2010 |
| WO | 2011/017459 | 2/2011 |

OTHER PUBLICATIONS

Alcatel-Lucent Shanghai Bell, Alcatel-Lucent, "Feedback Overhead for DL CoMP," 3GPP TSG RAN WG1 Meeting #60, R1-100935, Feb. 2010.
Lloyd, S., "Least squares quantization in PCM," IEEE Transactions on Information Theory, vol. 28, No. 2, pp. 129-137, Mar. 1982.
International Search Report issued for International Patent Application No. PCT/JP2012/005128 on Oct. 30, 2012.

* cited by examiner

*Primary Examiner* — Phuc Tran
(74) *Attorney, Agent, or Firm* — Austin Rapp & Hardman

(57) ABSTRACT

A method for quantizing a relative phase and a relative amplitude is described. A received symbol is obtained. A relative phase is determined from the received symbol. A relative amplitude is also determined from the received symbol. A quantized relative phase is obtained for the relative phase. A quantized relative amplitude is obtained for the relative amplitude.

37 Claims, 10 Drawing Sheets

QUANTIZING RELATIVE PHASE AND RELATIVE AMPLITUDE FOR COORDINATED MULTIPOINT (CoMP) TRANSMISSIONS

TECHNICAL FIELD

The present invention relates generally to wireless communications and wireless communications-related technology. More specifically, the present invention relates to systems and methods for quantizing relative phase and relative amplitude for coordinated multipoint (CoMP) transmissions.

BACKGROUND

Wireless communication devices have become smaller and more powerful in order to meet consumer needs and to improve portability and convenience. Consumers have become dependent upon wireless communication devices and have come to expect reliable service, expanded areas of coverage and increased functionality. A wireless communication system may provide communication for a number of cells, each of which may be serviced by a base station. A base station may be a fixed station that communicates with mobile stations.

Various signal processing techniques may be used in wireless communication systems to improve both the efficiency and quality of wireless communications. For example, a wireless communication device may report uplink control information (UCI) to a base station. This uplink control information (UCI) may be used by the base station to select appropriate transmission modes, transmission schemes and modulation and coding schemes for downlink transmissions to the wireless communication device.

The use of coordinated multipoint (CoMP) transmission is considered a major enhancement to Long Term Evolution (LTE) Release 11. Benefits may be realized by improvements to the use of coordinated multipoint (CoMP) transmission.

DETAILED DESCRIPTION

Figure 1:
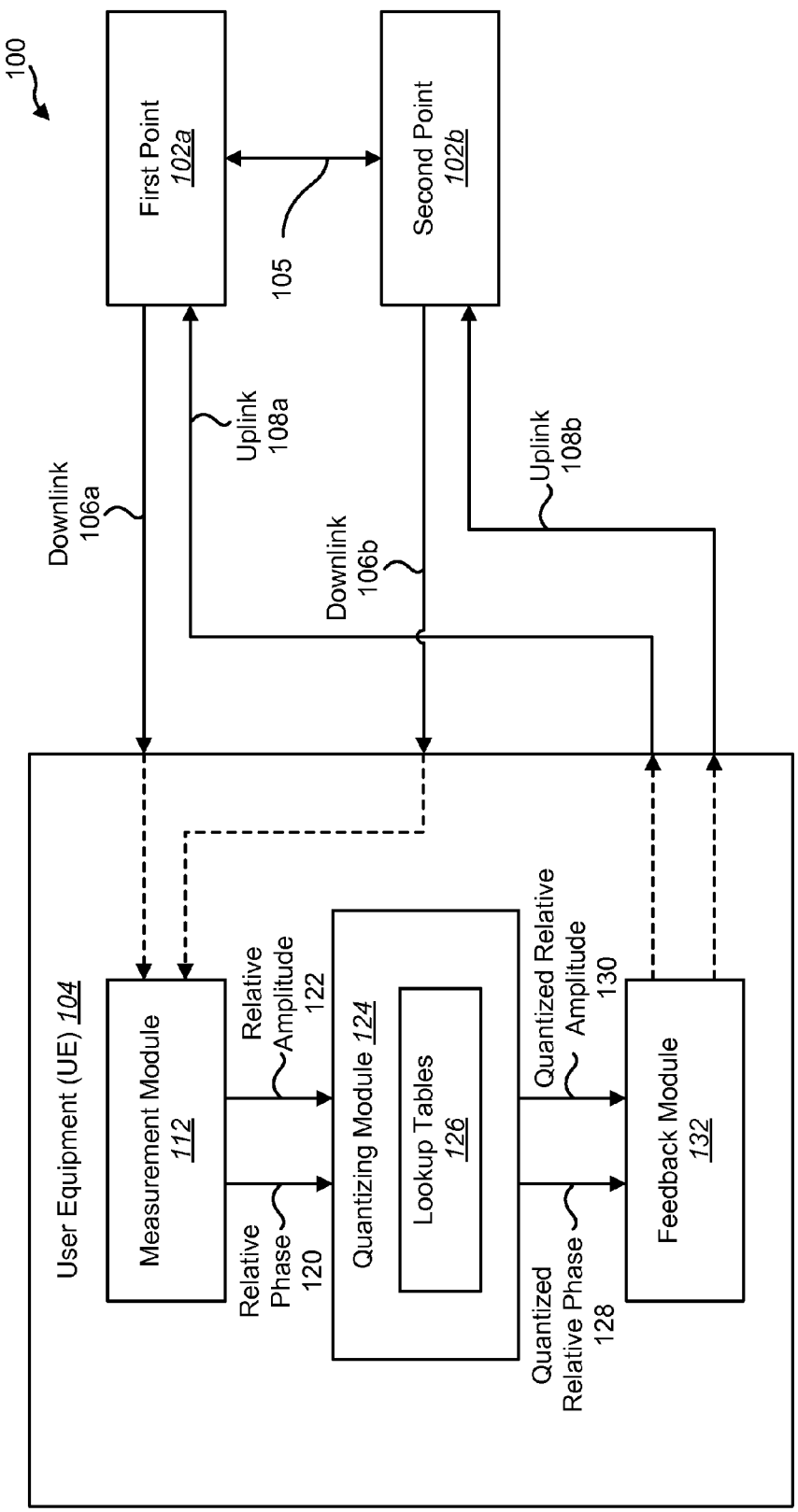
FIG. 1 is a block diagram illustrating a wireless communication system that may utilize coordinated multipoint (CoMP) transmission.

A method for quantizing a relative phase and a relative amplitude is described. A received symbol is obtained. A relative phase is determined from the received symbol. A relative amplitude is also determined from the received symbol. A quantized relative phase is obtained. A quantized relative amplitude is also obtained.

A quantization error of the quantized relative phase and the quantized relative amplitude may be less than a quantization error of a uniform quantizer for both the relative phase and the relative amplitude. The quantized relative phase and the quantized relative amplitude may be fed back to a serving eNode B. The method may be performed by a user equipment (UE).

Signals may be received from a first set of antenna ports over a first downlink channel. The first set of antenna ports may use a first reference signal configuration. Signals may also be received from a second set of antenna ports over a second downlink channel. The second set of antenna ports may use a second reference signal configuration. The received symbol may be obtained from the signals. The first set of antenna ports may include a first transmission point. The second set of antenna ports may include a second transmission point. The first transmission point and the second transmission point may use coordinated multipoint (CoMP) transmissions. The first transmission point may be a serving point. In one configuration, both the first transmission point and the second transmission point are serving points.

A combined downlink channel between the UE and both the first transmission point and the second transmission point may be estimated. A singular value decomposition operation may be performed on the estimated downlink channel.

Obtaining the quantized relative phase may include determining a number of bits available for use in the quantized relative phase, determining a number of transmit antenna ports used for downlink transmission, and using a first lookup table to obtain a set of partition and codebook as the quantized relative phase. The first lookup table may be dependent on the number of bits available and the number of transmit antennas. The first lookup table may be generated using a Lloyd-Max algorithm. A second lookup table may be used to determine the first lookup table used.

The first lookup table may be dependent on receiver combining based on a combined channel and using mean squared error as a metric for evaluating quantization error. The first lookup table may instead be dependent on receiver combining based on a combined channel and using absolute value of error as a metric for evaluating quantization error.

Obtaining the quantized relative amplitude may include determining a number of bits available for use in the quantized relative amplitude, determining a number of transmit antenna ports used for downlink transmission, and using a first lookup table to obtain a set of partition and codebook as the quantized relative amplitude. The first lookup table may be dependent on the number of bits available, the number of transmit antenna ports used, and one of receiver combining based on a serving cell channel and receiver combining based on a combined channel. The first lookup table may be generated using a Lloyd-Max algorithm. A second lookup table may be used to determine the first lookup table.

The relative amplitude may be one of an amplitude of a received signal from the first transmission point (or set of antenna ports) divided by an amplitude of a received signal from the second transmission point (or set of antenna ports), the square of the amplitude of the received signal from the first transmission point divided by the square of the amplitude of the received signal from the second transmission point, a minimum of the amplitude of the received signal from the first transmission point and the amplitude of the received signal from the second transmission point divided by a maximum of the amplitude of the received signal from the first transmission point and the amplitude of the received signal from the second transmission point, and the square of a minimum of the amplitude of the received signal from the first transmission point and the amplitude of the received signal from the second transmission point divided by the square of a maximum of the amplitude of the received signal from the first transmission point and the amplitude of the received signal from the second transmission point.

The quantized relative phase may include a partition and a codebook. The partition and the codebook may be obtained directly from a distribution of the relative phase. The quantized relative amplitude may also include a partition and a codebook. The partition and the codebook may be obtained directly from a distribution of the relative amplitude.

A user equipment (UE) configured for quantizing a relative phase and a relative amplitude is also described. The UE includes a processor, memory in electronic communication with the processor and instructions stored in the memory. The instructions are executable to obtain a received symbol. The instructions are also executable to determine a relative phase from the received symbol. The instructions are further executable to determine a relative amplitude from the received symbol. The instructions are also executable to obtain a quantized relative phase. The instructions are further executable to obtain a quantized relative amplitude.

The 3rd Generation Partnership Project, also referred to as "3GPP," is a collaboration agreement that aims to define globally applicable technical specifications and technical reports for third and fourth generation wireless communication systems. The 3GPP may define specifications for the next generation mobile networks, systems and devices.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN).

At least some aspects of the systems and methods disclosed herein may be described in relation to the 3GPP LTE and LTE-Advanced standards (e.g., Release-8, Release-9, Release-10 and Release-11). However, the scope of the present disclosure should not be limited in this regard. At least some aspects of the systems and methods disclosed herein may be utilized in other types of wireless communication systems.

In LTE Release-11, the use of coordinated multipoint (CoMP) transmission is a major enhancement. In coordinated multipoint (CoMP) transmission, a user equipment (UE) may be able to receive downlink signals from multiple geographically separated antennas (referred to herein as points). Points may be located on the same base station or on different base stations. Points may be connected to a base station but be in a different physical location than the base station. Furthermore, uplink transmissions by the user equipment (UE) may be received by the multiple points. Sectors of the same site may correspond to different points. A user equipment (UE) may receive the physical broadcast channel (PBCH) form one point or a set of points that are referred to as the serving point(s). The serving point may be the serving cell of Rel-8.

Each point may be controlled by an eNode B. There may be one or multiple eNode Bs. One of the eNode Bs may be referred to as the serving eNode B. The serving eNode B may perform most of the processing, such as baseband processing and scheduling. Because some of the antennas might be collocated at an eNode B, the eNode B may also be a point. The serving eNode B may control one or multiple cells. One cell may be designated as the serving cell. The designation of a cell as the serving cell may dynamically change over time. Each cell may then control one or more points. The serving cell may control a point or set of points that are designated as the serving point. The point designated as the serving point may dynamically change over time.

A user equipment (UE) may also receive UE-specific controls from a point or set of points referred to as the control signaling point(s). The control signaling point may be the serving cell of Rel-8. The points used for physical downlink shared channel (PDSCH) transmissions to a specific user equipment (UE) may or may not be the same as the serving point(s) and control signaling point(s) for the user equipment (UE).

By coordinating the downlink transmissions from each point to the user equipment (UE), the downlink performance can be significantly increased. Likewise, by coordinating the uplink transmissions from the user equipment (UE), the multiple points may take advantage of the multiple receptions to significantly improve the uplink performance. In coordinated multipoint (CoMP) transmissions, the channel state information (CSI) of each coordinated point may be reported separately or jointly with the same format as Release-10 or new formats.

The use of coordinated multipoint (CoMP) transmission may increase uplink and downlink data transmission rates while ensuring consistent service quality and throughput on LTE wireless broadband networks and 3G networks. Coordinated multipoint (CoMP) transmission may be used on both the uplink and the downlink. The systems and methods discussed herein relate to downlink transmissions (i.e., transmissions from a base station to a user equipment (UE)). Two major coordinated multipoint (CoMP) transmission methods are under consideration: coordinated scheduling/coordinated beamforming (CS/CB) and joint processing (JP).

In coordinated scheduling/coordinated beamforming (CS/CB), the scheduling of the transmission (including beamforming functionality) may be dynamically coordinated between the points (i.e., the points in a serving coordinated multipoint (CoMP) cooperating set) to control/reduce the interference between different coordinated multipoint (CoMP) and non-coordinated multipoint (CoMP) transmissions. Thus, one benefit of the present systems and methods is that the best serving set of users may be selected so that the transmitter beams reduce the interference to other users.

Simulations to evaluate the benefit of each coordinated multipoint (CoMP) transmission method under different scenarios assuming only a fixed coordinated multipoint (CoMP) transmission method is used in all cells have shown significant improvement on cell edge user equipments (UEs). Since each coordinated multipoint (CoMP) transmission method has its own advantages and disadvantages, the best system performance may be achieved when coordinated multipoint (CoMP) transmission is configured and the coordinated multipoint (CoMP) transmission method is selected appropriately based on the channel conditions observed at each user equipment (UE) in the network. Thus, each user equipment (UE) may collect channel condition information and provide this information to the serving eNode B. The serving eNode B may then select whether coordinated multipoint (CoMP) transmission is enabled, and a specific coordinated multipoint (CoMP) transmission method used when coordinated multipoint (CoMP) transmission is enabled.

FIG. 1 is a block diagram illustrating a wireless communication system 100 that may utilize coordinated multipoint (CoMP) transmission. The wireless communication system 100 may include a first point 102a in communication with a user equipment (UE) 104 and a second point 102b in communication with the user equipment (UE) 104. Additional points 102 may also be in communication with the user equipment (UE) 104.

As used herein, a serving point 102 (or set of serving points 102) refers to one or more points 102 that are serving the user equipment (UE) 104 (i.e., by providing the physical broadcast channel (PBCH)). In LTE, the serving point 102 is the point from which the user equipment (UE) 104 receives control and security information. For simplicity, reference is made herein to only a single serving point 102, even though there may be multiple serving points 102. All points 102 communicating with a user equipment (UE) 104 (including the serving point 102) may be referred to as transmission points 102. For simplicity, reference is also made herein to only a single transmission point 102, even though there may be multiple transmission points 102. There may be a communication link 105 between each of the points 102.

As used herein, a cooperating set refers to a set of geographically separated points 102 directly and/or indirectly participating in data transmission to a user equipment (UE) 104 in a time-frequency resource. The cooperating set may or may not be transparent to the user equipment (UE) 104. Thus, the set of transmission points 102 is a subset of the cooperating set.

A point 102 may be controlled by a base station. A base station may be referred to as an access point, a Node B, an eNode B, a serving point 102 or some other terminology. Likewise, a user equipment (UE) 104 may be referred to as a mobile station, a subscriber station, an access terminal, a remote station, a user terminal, a terminal, a handset, a subscriber unit, a wireless communication device or some other terminology.

Communication between a user equipment (UE) 104 and a point 102 may be accomplished using transmissions over a wireless link, including an uplink 108a-b and a downlink 106a-b. The uplink 108 refers to communications sent from a user equipment (UE) 104 to one or more points 102 (referred to as reception points 102). The downlink 106 refers to communications sent from one or more points 102 (referred to as transmission points 102) to a user equipment (UE) 104. The set of reception points 102 may include none, some or all of the points 102 in the set of transmission points 102. Likewise, the set of transmission points 102 may include none, some or all of the points 102 in the set of reception points 102.

In general, the communication link may be established using a single-input and single-output (SISO), multiple-input and single-output (MISO), single-input and multiple-output (SIMO) or a multiple-input and multiple-output (MIMO) system. A MIMO system may include both a transmitter and a receiver equipped with multiple transmit and receive antennas. Thus, a point 102 may have multiple antennas and a user equipment (UE) 104 may have multiple antennas (not shown). In this way, a point 102 and a user equipment (UE) 104 may each operate as either a transmitter or a receiver in a MIMO system. One benefit of a MIMO system is improved performance if the additional dimensionalities created by the multiple transmit and receive antennas are utilized.

There has recently been a lot of interest in coordinated multipoint (CoMP) transmission schemes where multiple transmission points 102 cooperate. There has also been discussion on how to improve the feedback scheme for both coordinated multipoint (CoMP) transmission and multiuser MIMO schemes. The coordinated multipoint (CoMP) transmission operation and coordinated multipoint (CoMP) transmission method used are user equipment (UE)-specific problems. The serving point 102 may make a decision concerning the use of coordinated multipoint (CoMP) transmission and the coordinated multipoint (CoMP) transmission method used based on feedback from the user equipment (UE) 104. Depending on the channel conditions observed by a user equipment (UE) 104, coordinated multipoint (CoMP) transmission operation and the coordinated multipoint (CoMP) transmission method of each cell may be configured dynamically and independently.

The user equipment (UE) 104 may gather information that may be useful to a serving eNode B about a point 102 that is determining whether to enable coordinated multipoint (CoMP) transmission for the user equipment (UE) 104 and what coordinated multipoint (CoMP) transmission method to use. In general, coordinated multipoint (CoMP) transmission operation should be used when the signals transmitted from points 102 has equal or close to equal receive power at the user equipment (UE) 104. Therefore, the relative signal strength between the signals received at the user equipment (UE) 104 from the first point 102a and the signals received at the user equipment (UE) 104 from the second point 102b may be used to determine if coordinated multipoint (CoMP) transmission should be applied in the downlink 106 for the user equipment (UE) 104.

The user equipment (UE) 104 may include a measurement module 112. As stated above, the user equipment (UE) 104 may receive downlink 106 signals from multiple points 102. The measurement module 112 may determine a relative phase 120 between the downlink 106 signals of two points 102 and the relative amplitude 122 between the downlink 106 signals of two points 102.

In a MIMO system, precoding is applied before each symbol is transmitted. At the receiver, each transmitted symbol may be represented by a complex number. In a system with coordinated multipoint (CoMP) transmission, all transmission points 102 may transmit the same symbol on the same time and frequency resources (after applying precoding) to the user equipment (UE) 104. Similar to MIMO, the received symbol may be represented by the sum of two complex numbers at the receiver (assuming there are two cooperating transmissions). There may be more than two cooperating transmission points 102. In this case, the relative amplitude and the relative phase may be measured with respect to one of the transmission points 102 (referred to as the baseline point 102). The performance of the system may be improved if the two complex numbers (representing the received signals at the user equipment (UE) 104 that were transmitted from the transmission points 102) have a similar phase and amplitude so that transmissions by all the transmission points 102 are coherently combined at the receiver. In other words, the transmitted signals by all the transmission points 102 may reinforce one another at the receiver.

These complex numbers may have infinitely many values in a continuous interval. To represent these complex numbers and send them as feedback to the serving eNode B, the user equipment (UE) 104 may use a quantizer. A quantizer may be defined by a set of both a partition and a codebook. One benefit of using a quantizer is that an accurate representation of these complex numbers may be fed back to the serving eNode B.

The measurement module 112 may provide the relative phase 120 and the relative amplitude 122 to a quantizing module 124. The relative phase 120 is the phase between any pair of transmission points 102. The relative amplitude 122 to be quantized is discussed in additional detail below in relation to FIG. 6. The quantizing module 124 may then generate a quantized relative phase 128 and a quantized relative amplitude 130. The quantized relative phase 128 may include a partition and a codebook corresponding to the relative phase 120. Likewise, the quantized relative amplitude 130 may include a partition and a codebook corresponding to the relative amplitude 122. The quantizing module 124 may use one or more lookup tables 126 to determine the quantized relative phase 128 and the quantized relative amplitude 130. A lookup table (not shown) may also be used to determine which lookup tables 126 to use for determining the quantized relative phase 128 and the quantized relative amplitude 130. All of the lookup tables 126 may exist on both the user equipment (UE) 104 and an eNode B. In one configuration, all the lookup tables 126 may be indexed and a lookup table (not shown) may define the index of the lookup table 126 to be used with respect to the number of transmit antennas. Quantizing is discussed in additional detail below in relation to FIG. 4.

For example, if the relative phase 120 is between a threshold k and a threshold k+1 (i.e., the relative phase 120 belongs to the $k^{th}$ partition. The quantized relative phase 120 is then represented by ck, the $k^{th}$ codeword. Thus, ck is the quantized relative phase 120 that is sent back to the serving eNode B.

The lookup tables 126 may include the partition thresholds and the codewords. Depending on system parameters, the lookup table 126 used may be agreed upon in advance between a user equipment (UE) 104 and a serving eNode B. Different lookup tables 126 may be used to obtain the quantized relative phase 128 than are used to obtain the quantized relative amplitude 130. The generation of these lookup tables 126 for different specifications is discussed below in relation to FIG. 7 and FIG. 8.

The quantized relative phase 128 may be between one and five bits. Likewise, the quantized relative amplitude 130 may be between one and five bits. The relative amplitude 122 may be quantized by applying receiver combining based on the combined channel or by applying receiver combining based on the channels corresponding to each of the transmission points 102.

In receiver combining, the received signals on different antennas may be combined with each other at the receiver. Thus, receiver combining is in general a weighted sum of received signals on the receive antennas. In a single link communication, there may be only one channel (this channel may be scalar, vector or matrix corresponding to SISO, SIMO/MISO and MIMO systems) between the transmitter and the receiver and hence, the combining weights may be derived from the channel realization. In coordinated multipoint (CoMP), there may be two or more transmitters. Thus, there may be multiple channel realizations; one channel realization between each transmitter and the receiver. Therefore, there are many ways to combine the receive signals on the receive antennas. A combined channel may consider the interaction of all the channels, whereas combining based on a transmission point 102 channel only considers the computation of combining weights based on the channel between that transmission point 102 and the receiver. The relative phase 120 may be quantized by applying receiver combining based on the combined channel.

The quantized relative phase 128 and the quantized relative amplitude 130 may be provided to a feedback module 132. The feedback module 132 may then feedback the quantized relative phase 128 and the quantized relative amplitude 130 to the serving eNode B as part of a channel state information (CSI) report. The serving eNode B may share the information in the channel state information (CSI) report with other eNode Bs. The user equipment (UE) 104 may be configured to feedback the relative phase 120 or relative amplitude 122 dynamically on the downlink control channel (e.g., the physical downlink control channel (PDCCH) in LTE) or semi-dynamically via radio resource control (RRC) signaling.

The serving eNode B has full control over the coordinated multipoint (CoMP) transmission method selection. For example, the serving eNode B may choose joint transmission (JT) even if the interference level with coordinated scheduling/coordinated beamforming (CS/CB) is acceptable when increasing user equipment (UE) 104 throughput is more desirable and/or the serving eNode B cannot schedule a suitable user equipment (UE) 104 in a coordinated multipoint (CoMP) transmission cell to perform the coordinated scheduling/coordinated beamforming (CS/CB).

There may be one reference signal transmitted per downlink antenna port. An antenna port may be defined such that the channel over which a symbol on the antenna port is conveyed can be inferred from the channel over which another symbol on the same antenna port is conveyed. There may be one resource grid (time-frequency) per antenna port.

Figure 2:
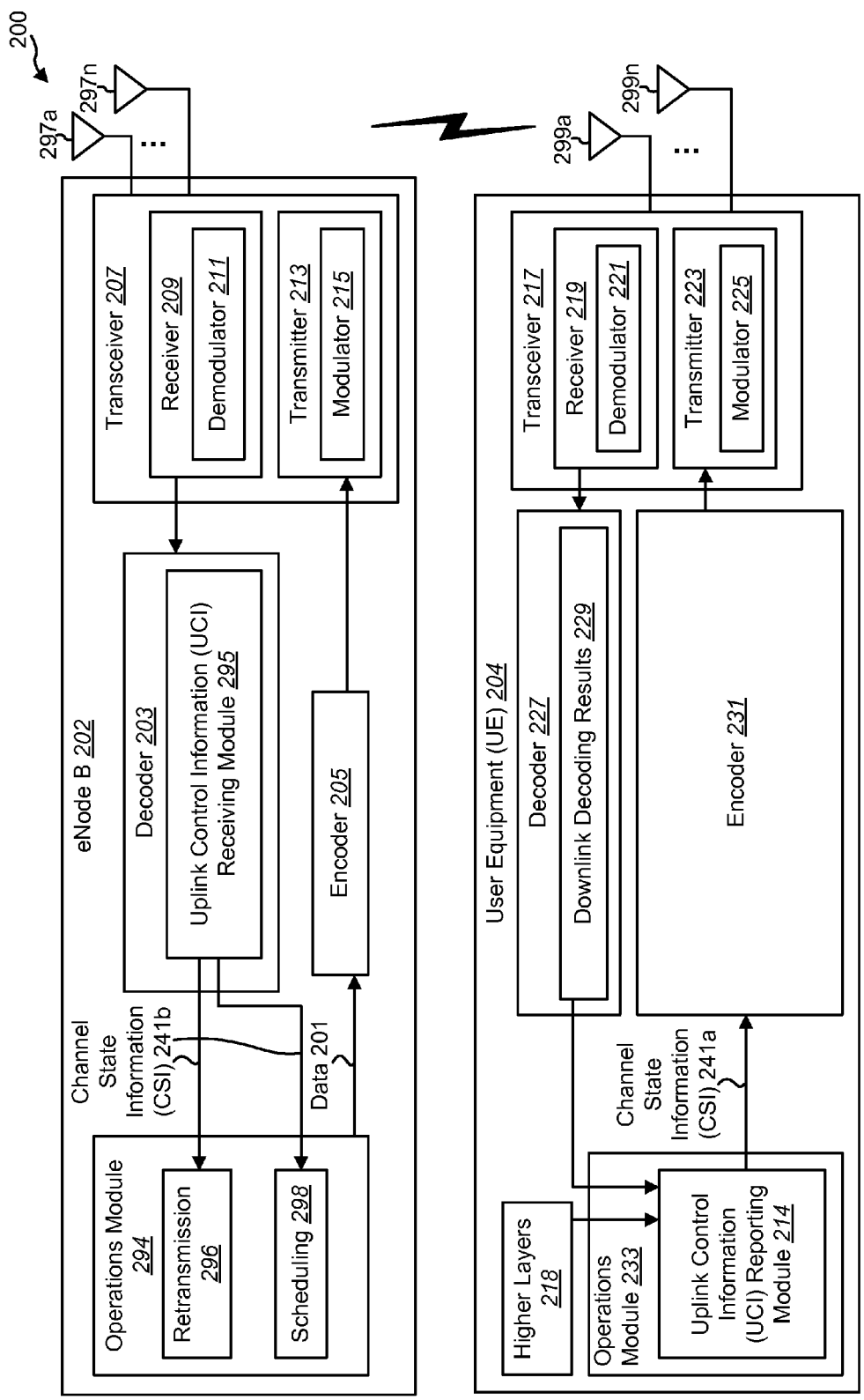
FIG. 2 is a block diagram illustrating a wireless communication system using uplink control information (UCI) multiplexing.

FIG. 2 is a block diagram illustrating a wireless communication system 200 using uplink control information (UCI) multiplexing. An eNode B 202 may be in wireless communication with one or more user equipments (UEs) 204. Each of the antennas 297*a-n* used by the eNode B 202 may be the point 102 or points 102 of FIG. 1. One of the points 102 may be collocated with the eNode B 202. In one configuration, the eNode B 202 may be a serving eNode B. The user equipment (UE) 204 of FIG. 2 may be one configuration of the user equipment (UE) 104 of FIG. 1.

The user equipment (UE) 204 communicates with the eNode B 202 using one or more antennas 299*a-n*. The user equipment (UE) 204 may include a transceiver 217, a decoder 227, an encoder 231 and an operations module 233. The transceiver 217 may include a receiver 219 and a transmitter 223. The receiver 219 may receive signals from the eNode B 202 using one or more antennas 299*a-n*. For example, the receiver 219 may receive and demodulate received signals using a demodulator 221. The transmitter 223 may transmit signals to the eNode B 202 using one or more antennas 299*a-n*. For example, the transmitter 223 may modulate signals using a modulator 225 and transmit the modulated signals.

The receiver 219 may provide a demodulated signal to the decoder 227. The user equipment (UE) 204 may use the decoder 227 to decode signals and make downlink decoding results 229. The downlink decoding results 229 may indicate whether data was received correctly. For example, the downlink decoding results 229 may indicate whether a packet was correctly or erroneously received (i.e., positive acknowledgement, negative acknowledgement or discontinuous transmission (no signal)).

The operations module 233 may be a software and/or hardware module used to control user equipment (UE) 204 communications. For example, the operations module 233 may determine when the user equipment (UE) 204 requires resources to communicate with an eNode B 202. The operations module 233 may receive instructions from higher layers 218.

The user equipment (UE) 204 may transmit uplink control information (UCI) to an eNode B 202 on the uplink. The uplink control information (UCI) may include channel state information (CSI) 241*a* in a channel state information (CSI) report, as discussed above in relation to FIG. 1. The uplink control information (UCI) may be transmitted on either the physical uplink control channel (PUCCH) or the physical uplink shared channel (PUSCH). The configuration of the transmission of the uplink control information (UCI) on the physical uplink control channel (PUCCH) and the physical uplink shared channel (PUSCH) may need to be transmitted on the downlink to the user equipment (UE) 204. The configuration/scheduling of the uplink control information (UCI) transmission in the uplink may be performed either dynamically on the physical downlink control channel (PDCCH) or semi-statically via radio resource control (RRC) signaling, which is transmitted to the user equipment (UE) 204 via the physical downlink shared channel (PDSCH). The uplink control information (UCI) may be reported from a user equipment (UE) 204 to an eNode B 202 either periodically or aperiodically.

The channel state information (CSI) 241*a* may be generated by the uplink control information (UCI) reporting module 214 and transferred to an encoder 231. The encoder 231 may generate uplink control information (UCI) using backwards compatible physical uplink control channel (PUCCH) formats and physical uplink shared channel (PUSCH) formats. Backwards compatible physical uplink control channel (PUCCH) formats are those formats that may be used by Release-10 user equipments (UEs) 204 as well as Release-8/9 user equipments (UEs) 204.

The time and frequency resources may be quantized to create a grid known as the Time-Frequency grid. In the time domain, 10 milliseconds (ms) is referred to as one radio frame. One radio frame may include 10 subframes, each with a duration of one ms, which is the duration of transmission in the uplink and/or downlink. Every subframe may be divided into two slots, each with a duration of 0.5 ms. Each slot may be divided into seven symbols. The frequency domain may be divided into bands with a 15 kilohertz (kHz) width, referred to as a subcarrier. One resource element has a duration of one symbol in the time domain and the bandwidth of one subcarrier in the frequency domain.

The minimum amount of resource that can be allocated for the transmission of information in the uplink or downlink in any given subframe is two resource blocks (RBs), one RB at each slot. One RB has a duration of 0.5 ms (seven symbols or one slot) in the time domain and a bandwidth of 12 subcarriers (180 kHz) in the frequency domain. At any given subframe, a maximum of two RBs (one RB at each slot) can be used by a given user equipment (UE) 204 for the transmission of uplink control information (UCI) in the physical uplink control channel (PUCCH).

An eNode B 202 may include a transceiver 207 that includes a receiver 209 and a transmitter 213. An eNode B 202 may additionally include a decoder 203, an encoder 205 and an operations module 294. An eNode B 202 may receive uplink control information (UCI) using multiple antennas 297*a-n* and a receiver 209. The receiver 209 may use the demodulator 211 to demodulate the uplink control information (UCI).

The decoder 203 may include an uplink control information (UCI) receiving module 295. An eNode B 202 may use the uplink control information (UCI) receiving module 295 to decode and interpret the uplink control information (UCI) received by the eNode B 202. The eNode B 202 may use the decoded uplink control information (UCI) to perform certain operations, such as retransmit one or more packets based on scheduled communication resources for the user equipment (UE) 204. The uplink control information (UCI) may include channel state information (CSI) 241*b* such as that discussed above in relation to FIG. 1.

The operations module 294 may include a retransmission module 296 and a scheduling module 298. The retransmission module 296 may determine which packets to retransmit (if any) based on the uplink control information (UCI). The scheduling module 298 may be used by the eNode B 202 to schedule communication resources (e.g., bandwidth, time slots, frequency channels, spatial channels, etc.). The scheduling module 298 may use the uplink control information (UCI) to determine whether (and when) to schedule communication resources for the user equipment (UE) 204.

The operations module 294 may provide data 201 to the encoder 205. For example, the data 201 may include packets for retransmission and/or a scheduling grant for the user equipment (UE) 204. The encoder 205 may encode the data 201, which may then be provided to the transmitter 213. The transmitter 213 may modulate the encoded data using the modulator 215. The transmitter 213 may transmit the modulated data to the user equipment (UE) 204 using the antennas 297*a-d*.

Figure 3:
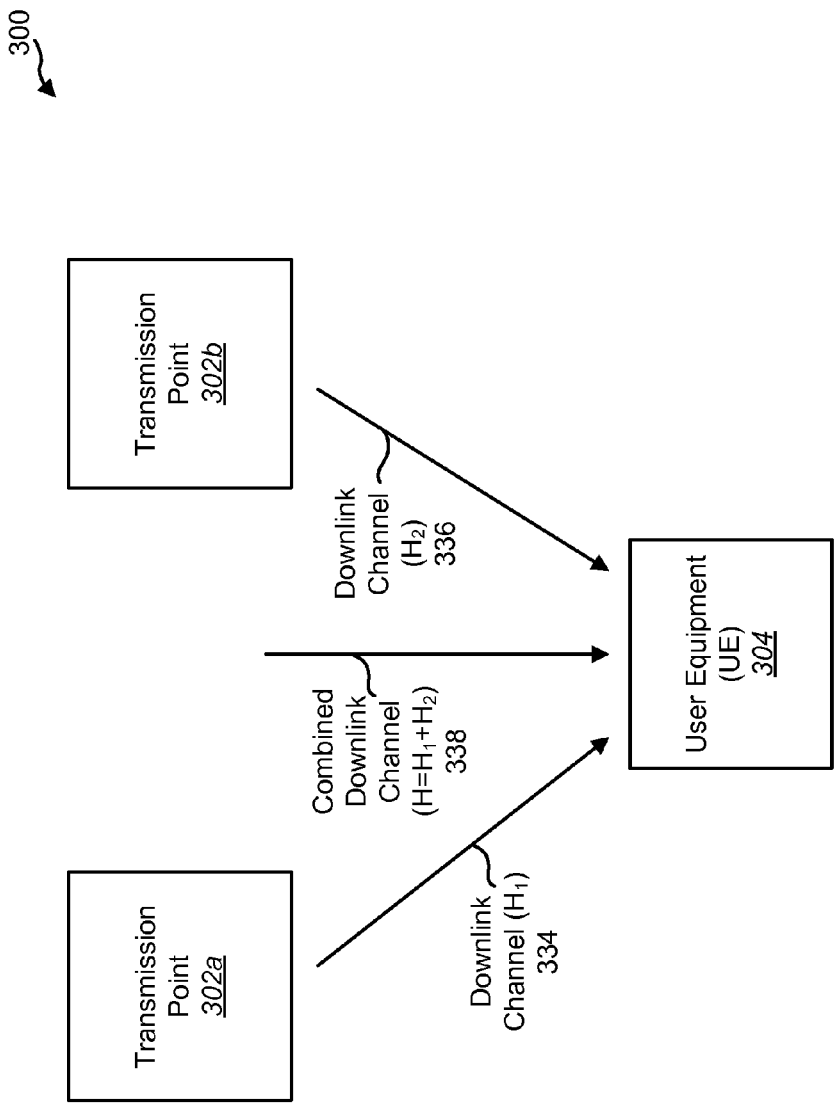
FIG. 3 shows an example of a wireless communication system where coordinated multipoint (CoMP) transmission may be implemented.

FIG. 3 shows an example of a wireless communication system 300 where coordinated multipoint (CoMP) transmission may be implemented. The wireless communication system 300 includes a first transmission point 302*a*, a second transmission point 302*b* and a user equipment (UE) 304. The first transmission point 302*a* and the second transmission point 302*b* may be near the user equipment (UE) 304. Both the first transmission point 302*a* and the second transmission point 302*b* may be geographically separated antennas on one or more eNode Bs 202. Both the first transmission point 302*a* and the second transmission point 302*b* may provide communication coverage for particular geographic areas. An eNode B 202 may control multiple transmission points 302. The transmission points 302 may belong to the same cell or different cells. Zero, one or both of the transmission points 302 may be serving points 102.

In one configuration, the wireless communication system 300 may include more than two transmission points 302. The additional transmission points (not shown) may also be serving points. The functionality associated to a serving point makes the point act as a serving point, a control point and/or a transmission point. For example, if the information being transmitted by a point 102 is the physical broadcast channel (PBCH), the point 102 may be a serving point 102. If the information being transmitted by a point 102 is UE-specific control information, the point 102 may be a control point. If the information being transmitted by a point 102 is neither the physical broadcast channel (PBCH) or UE-specific control information, the point 102 may be a transmission point 302. Thus, a point 102 may be a serving point 102 and/or a control point 102 and/or a transmission point 302.

The downlink channel 334 between a first transmission point 302*a* (or set of antenna ports) and the user equipment (UE) 304 may be referred to as $H_1$. The downlink channel 336 between a second transmission point 302*b* (or set of antenna ports) and the user equipment (UE) 304 may be referred to as $H_2$. The combined downlink channel 338 from the transmission points 302 to the user equipment (UE) 304 may be referred to as $H=H_1+H_2$. It is assumed that the first transmission point 302*a* and the second transmission point 302*b* are each equipped with n antennas and the user equipment (UE) 304 is equipped with m antennas. The received signal at the user equipment (UE) 304 may be written using Equation (1):

$$Y=H_1X+H_2X+S. \qquad (1)$$

In Equation (1), $H_1$ and $H_2$ are the n×m channel matrices, X is the m×1 transmitted signal and S is the n×1 vector of additive white Gaussian noise.

The user equipment (UE) 304 may be capable of communicating with multiple transmission points 302. For example, the user equipment (UE) 304 in FIG. 3 may communicate with both the first transmission point 302*a* and the second transmission point 302*b*. When the user equipment (UE) 304 is capable of communicating with multiple transmission points 302, coordinated multipoint (CoMP) transmission may be enabled. The enabling of coordinated multipoint (CoMP) transmission may be exclusively decided by the serving eNode B 202 and communicated to the user equipment (UE) 304 through one or more transmission points 302. The serving eNode B 202 may also select a coordinated multipoint (CoMP) transmission method. Coordinated multipoint (CoMP) transmission methods include joint transmission (JT) and coordinated scheduling/coordinated beamforming (CS/CB) as discussed below.

In a first scenario, the transmission points 302 may be controlled by the same eNode B 202 (referred to as the serving eNode B 202) as is controlling the serving point 102 or set of points 102. In this case, the serving eNode B 202 may control and schedule all the transmission points 302. In a second scenario, one or more of the transmission points 302 may be controlled by one or more different eNode Bs 202 than the serving eNode B 202. The serving point 102 or points 102 for a user equipment (UE) 304 may not be the same as the serving point 102 or points 102 for another user equipment (UE) 304.

All the measurements performed by the user equipment (UE) 304 may be sent to the serving eNode B 202. The serving eNode B 202 and the different eNode Bs 202 may coordinate the transmissions to the user equipment (UE) 304 with each other. Because the serving eNode B 202 and the different eNode Bs 202 are geographically separated, this coordination may occur via a back haul link.

In the coordinated multipoint (CoMP) transmission method coordinated scheduling/coordinated beamforming (CS/CB), the user equipment (UE) 304 may receive a downlink coordinated multipoint (CoMP) transmission from only one of the transmission points 302 (e.g., the first transmission point 302a). The other transmission point 302 (e.g., the second transmission point 302b) may schedule transmissions with beamforming that minimize interference to the user equipment (UE) 304. In the coordinated multipoint (CoMP) transmission method joint transmission (JT), a first downlink coordinated multipoint (CoMP) transmission is transmitted to the user equipment (UE) 304 from the first transmission point 302a and one or more secondary downlink coordinated multipoint (CoMP) transmissions are transmitted to the user equipment (UE) 304 from one or more other transmission points 302. The first downlink coordinated multipoint (CoMP) transmission and the secondary downlink coordinated multipoint (CoMP) transmissions may use the same time and frequency radio resources. If joint processing (JP) with dynamic point selection (DPS) is used, the data may be transmitted by only one transmission point 302 to the user equipment (UE) 304.

Figure 4:
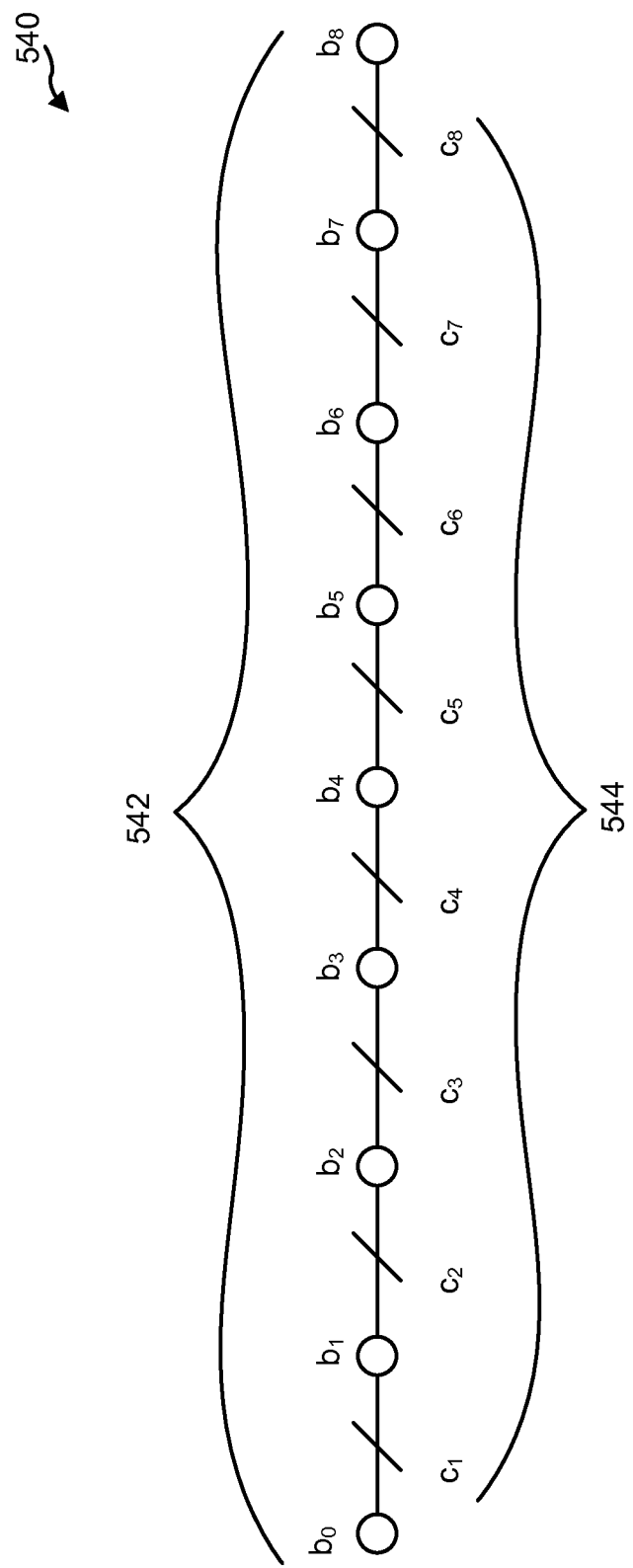
FIG. 4 illustrates a quantizer for use in the present systems and methods.

FIG. 4 illustrates a quantizer 540 for use in the present systems and methods. The quantizer 540 shown has eight bins (three bits) but other size quantizers 540 may also be used. A quantizer 540 may be used for a parameter η that takes many more (possibly infinitely many more) values in an interval [MinValue, MaxValue], which is a continuous interval of real numbers larger than MinValue and smaller than MaxValue. MinValue may be as small as negative infinity and MaxValue may be as large as plus infinity.

Representing η in binary format may require a large number of bits (possibly an infinite number of bits). When only a smaller number of bits than $\log_2(\text{cardinality}(\eta))$ are available for representing η, a quantizer 540 may be used. Each quantizer 540 may be determined by defining a set of boundary (or border or threshold) values B and a set of representation (or codebook) values C. The B partitions 542 [MinValue, MaxValue] may be set into non overlapping intervals. Then, in each partition 542 an element 544 may be selected as representative of the partition 542. The collection of the representative elements forms the set C.

For example, if there are three bits available for representing $\eta \in [\text{MinValue}, \text{MaxValue}]$, then the [MinValue, MaxValue] can be divided into $2^3=8$ partitions 542. If $b_{L-1} \leq \eta \leq b_i$, then η may be represented by a single value $c_i$ for $0 \leq i \leq 8$, where $b_{i-1} \leq c_i \leq b_i$. The number of partitions 542 depends on the number of bits available. In general, if there are L bits available for representing the quantized parameter, then the quantizer 540 has $2^L$ many partitions 542 (or bins). Therefore, the set B has $2^L+1$ elements (or partitions 542) ($b_0$=MinValue and $b_{2^L}$=MaxValue) and the codebook set C has $2^L$ codewords 544 (or elements).

Performance of a quantizer 540 may be measured by the quantization error. The quantization error may be defined using Equation (2):

$$\text{Error}(B, C) = \sum_{i=1}^{2^L} d(ci, C) Pr(b_{i-1} \leq C \leq b^i). \qquad (2)$$

In Equation (2), d(.,.) is the distance used for measuring error. For the mean square error (referred to as the L2 norm), $d(c_i,C)=(c_i-C)^2$. For the absolute value of error (referred to as the L1 norm), $d(c_i,C)=|c_i-C|$. To design a quantizer 540, $$\min_{B,C} \text{Error}(B, C)$$

may be solved, which finds the sets B and C such that the quantization error is minimized. In other words, the optimal quantizer 540 has a minimum quantization error that improves performance by providing more accurate information about the channel to the transmitters.

If the distribution of parameter η is known, the error function of Equation (2) above may be expressed as a function of $b_j \in B$, $0 \leq j \leq 2^L$ and $c_i \in C$, $1 \leq i \leq 2^L$. If the distribution of parameter η is not known, then a sample data of η is needed. The sample data may be used in recursive algorithms such as a Lloyd-Max algorithm to obtain the sets B and C.

Figure 5:
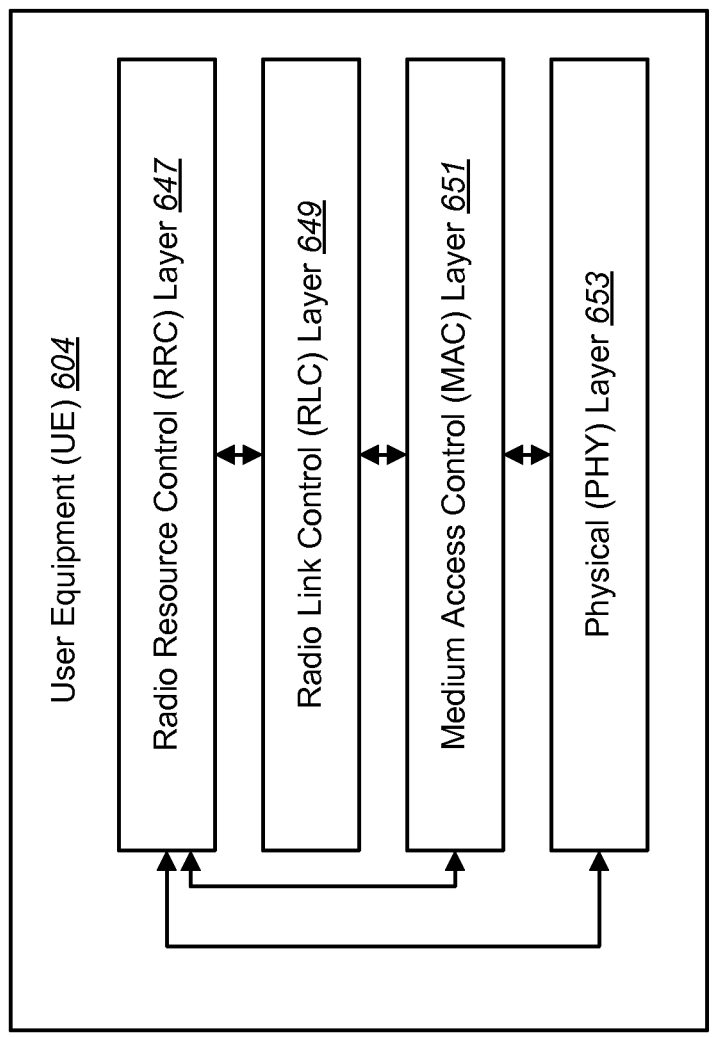
FIG. 5 is a block diagram illustrating the layers used by a user equipment (UE)

FIG. 5 is a block diagram illustrating the layers used by a user equipment (UE) 604. The user equipment (UE) 604 of FIG. 5 may be one configuration of the user equipment (UE) 104 of FIG. 1. The user equipment (UE) 604 may include a radio resource control (RRC) layer 647, a radio link control (RLC) layer 649, a medium access control (MAC) layer 651 and a physical (PHY) layer 653. These layers may be referred to as higher layers 218. The user equipment (UE) 604 may include additional layers not shown in FIG. 5.

Figure 6:
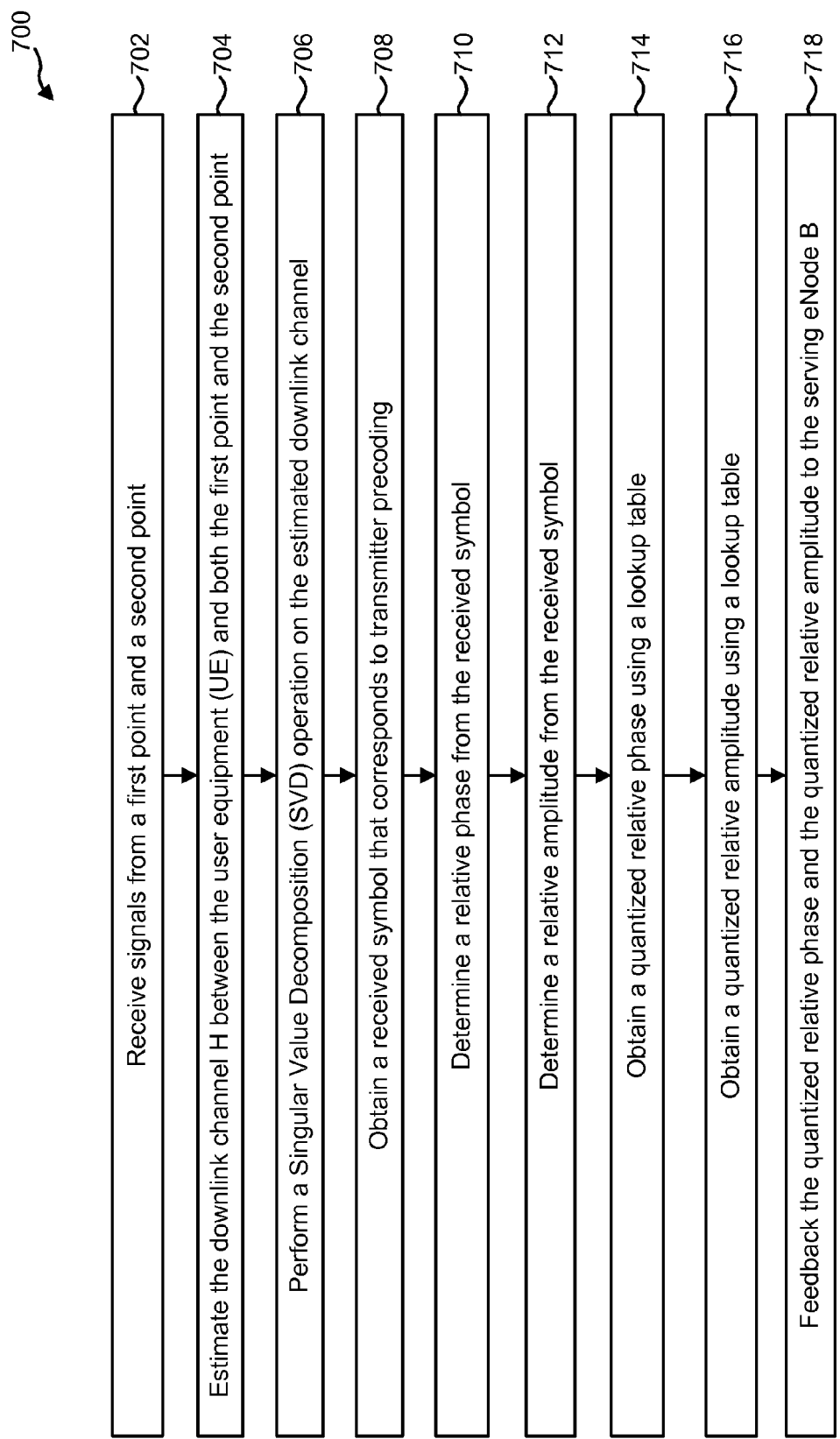
FIG. 6 is a flow diagram of a method for quantizing relative phase and relative amplitude.

FIG. 6 is a flow diagram of a method 700 for quantizing relative phase 120 and relative amplitude 122. The method 700 may be performed by a user equipment (UE) 104. The user equipment (UE) 104 may receive 702 signals from a first point 102a and a second point 102b. In one configuration, the first point 102a may be a serving point 102 and the second point 102b may be a transmission point 102. In another configuration, the first point 102a and the second point 102b may both be transmission points 102.

In one configuration, the first point 102a and/or the second point 102b may be part of a coordinated multipoint (CoMP) cooperating set. The coordinated multipoint (CoMP) cooperating set may refer to a set of geographically separated points 102 directly and/or indirectly participating in data transmission to a user equipment (UE) 104 in a time-frequency resource. The coordinated multipoint (CoMP) cooperating set may or may not be transparent to the UE. The coordinated multipoint (CoMP) cooperating set may define the coordination area in Annex A. A point 102 that has direct participation is actually transmitting data in the time-frequency resource. A point 102 that has indirect participation does not transmit data but may contribute in making decisions on the user scheduling/beamforming in the time-frequency resource.

In one configuration, the first point 102a and/or the second point 102b may be part of a coordinated multipoint (CoMP) transmission set. The coordinated multipoint (CoMP) transmission set includes one or more points 102 that are transmitting data to a user equipment (UE) 104. The coordinated multipoint (CoMP) transmission set is a subset of the coordinated multipoint (CoMP) cooperating set.

For joint transmission (JT), multiple points 102 (all or a subset of the points 102) in the coordinated multipoint (CoMP) cooperating set are the coordinated multipoint (CoMP) transmission points at every subframe for a certain frequency resource. For coordinated scheduling/coordinated beamforming (CS/CB), dynamic point selection (DPS) and semi static point selection (SSPS), a single point 102 in the coordinated multipoint (CoMP) cooperating set is the coordinated multipoint (CoMP) transmission point 102 at every subframe for a certain frequency resource. For dynamic point selection (DPS), the coordinated multipoint (CoMP) transmission point 102 may change dynamically within the coordinated multipoint (CoMP) cooperating set. For semi static point selection (SSPS), the coordinated multipoint (CoMP) transmission point 102 may change semi-statically within the coordinated multipoint (CoMP) cooperating set.

In yet another configuration, the first point 102a and/or the second point 102b may be part of a coordinated multipoint (CoMP) measurement set. The coordinated multipoint (CoMP) measurement set is a set of points about which channel state/statistical information related to their link to the user equipment (UE) 104 is measured and/or reported. The coordinated multipoint (CoMP) measurement set includes, and may be the same as, the coordinated multipoint (CoMP) cooperating set. The user equipment (UE) 104 reports may down-select points 102 for which actual feedback information is transmitted.

The first point 102a and/or the second point 102b may also be part of a radio resource management (RRM) set. The radio resource management (RRM) set is a set of cells for which the radio resource management (RRM) measurements are performed. Additional radio resource management (RRM) measurement methods can be considered (such as separating different points 102 belonging to the same logical cell entity).

The user equipment (UE) 104 may estimate 704 the downlink channel H 338 between the user equipment (UE) 704 and both the first point 102a and the second point 102b. In general, there may be more than two points 102. One point 102 may be selected as the baseline and the relative amplitude and relative phase of other transmission points 102 may be measured with respect to the baseline point 102. In one configuration, the user equipment (UE) 104 may estimate the downlink channel $H_1$ 334 between the user equipment (UE) 104 and the first point 102a and the downlink channel $H_2$ 336 between the user equipment (UE) 104 and the second point 102b separately. In another configuration, the user equipment (UE) 104 may estimate the combined channel $H=H_1+H_2$ 338. The user equipment (UE) 104 may perform 706 a Singular Value Decomposition (SVD) operation on the estimated downlink channel H 338 using Equation (3):

$$H = UDV^*. \quad (3)$$

Equation (3) uses the conjugate-transpose operator (*), also known as the Hermitian operator. If $u_1$ is the first column of U from Equation (3), when the transmitted signal X is one dimensional (rank one transmission or single layer transmission), then $u_1$ is used at the receiver as the combining vector by performing Equation (4):

$$r = u_1^* Y. \quad (4)$$

In order to align the transmission to the direction of a channel, a precoding operation is performed at the transmitter. For a rank one transmission, the precoding operation may be modeled using Equation (5):

$$X = Wx. \quad (5)$$

In Equation (5), W is the precoding vector and x is the transmitted symbol. The user equipment (UE) 104 may obtain 708 a received symbol that corresponds to the transmitter precoding (i.e., that takes into account the transmitter precoding). The received symbol may be written using Equation (6):

$$r = u_1^* Y \quad (6)$$
$$= U_1^*(H_1 W_1 x + H_2 W_2 x).$$
$$= Z_1 + Z_2$$

In Equation (6), $Z_1$ and $Z_2$ are complex numbers that represent the received signals from the first cell and the second cell, respectively. The complex numbers may be represented in polar form using Equation (7):

$$r = \rho_1 e^{j\theta_1} + \rho_2 e^{j\theta_2}. \quad (7)$$

The user equipment (UE) 104 may then determine 710 a relative phase 120 from the received symbol. The relative phase 120 to be quantized is $\theta_1 - \theta_2$ from Equation (7). The user equipment (UE) 104 may also determine 712 a relative amplitude 122 from the received symbol. The relative amplitude 122 may be one of $y_1$, $y_2$, $y_3$ or $y_4$ from Equation (8) through Equation (11) below, depending on the fixed system parameter. Only one of $y_1$, $y_2$, $y_3$ or $y_4$ may be used.

$$y_1 = \frac{\rho_1}{\rho_2}. \quad (8)$$

$$y_2 = \left(\frac{\rho_1}{\rho_2}\right)^2. \quad (9)$$

$$y_3 = \frac{\min(\rho_1, \rho_2)}{\max(\rho_1, \rho_2)}. \quad (10)$$

$$y_4 = \left(\frac{\min(\rho_1, \rho_2)}{\max(\rho_1, \rho_2)}\right)^2. \quad (11)$$

In Equation (8), Equation (9), Equation (10) and Equation (11), $\rho_1$ is the amplitude of the received signal from the first cell and $\rho_2$ is the amplitude of the received signal from the second cell.

As discussed above, a quantizer 540 is defined by a set of a partition and a codebook. For a k bit quantizer, there are $L=2^k$ quantization intervals (or partitions 542) and $2^k+1$ values $(b_0, b_1, \ldots, b_L)$ defining the boundaries of these intervals. The quantization intervals may be denoted as $\{[b_0,b_1],[b_1,b_2],\ldots,[b_{L-1},b_L]\}$. The set $\{b_0,b_1,\ldots,b_L\}$ is the partition 542 set. If the parameter to be quantized is in the interval $[b_{i-1},b_i]$, where $1 \leq i \leq L$, then the parameter may be represented by the codeword $c_i$ 544 from the codebook $\{c_1, c_2, \ldots, c_L\}$.

The user equipment (UE) 104 may obtain 714 a quantized relative phase 128 for the relative phase 120 using a lookup table 126. The user equipment (UE) 104 may also obtain 716 a quantized relative amplitude 130 for the relative amplitude 122 using a lookup table 126. In one configuration, a Lloyd-Max algorithm may be used to obtain the quantized relative phase 128 and the quantized relative amplitude 130. In another configuration, the quantizer partitions and quantization codebooks may be obtained directly by knowing the distribution of the relative phase 120 and the relative amplitude 122.

For channel matrices with complex Gaussian entries, $$\left(\frac{\rho_1}{\rho_2}\right)^2$$

has an F-distribution of degrees of freedom depending on the number of transmit and receive antennas (or dimensions of the channel matrix). Since $\rho_1$ and $\rho_2$ are both positive numbers, $$\frac{\rho_1}{\rho_2}$$

also has an F-distribution. These distributions may be used to either directly obtain the quantized relative amplitude 130 for each of $y_1$, $y_2$, $y_3$ and $y_4$ or as training data for a Lloyd-Max algorithm.

The quantizers 540 used for the relative phase 120 and the relative amplitude 122 may be obtained based on a Lloyd-Max algorithm for a scalar quantizer. These quantizers 540 may be optimal. The benefits of using the quantizers 540 discussed herein instead of uniform quantizers is a reduced quantization error, a more accurate representation of the relative phase 120 and the relative amplitude 122 and a larger received signal-to-noise ratio (SNR).

The user equipment (UE) 104 may then feedback 718 the quantized relative phase 128 and the quantized relative amplitude 130 to the serving eNode B 202. The feedback of the quantizers 540 may be one transmission for a pair of points 102 (either measurement points 102 or transmission points 102). In other words, one feedback of the quantized relative phase 128 and the quantized relative amplitude 130 may be sent to the serving eNode B 202 for any given pair of points 102.

Figure 7:
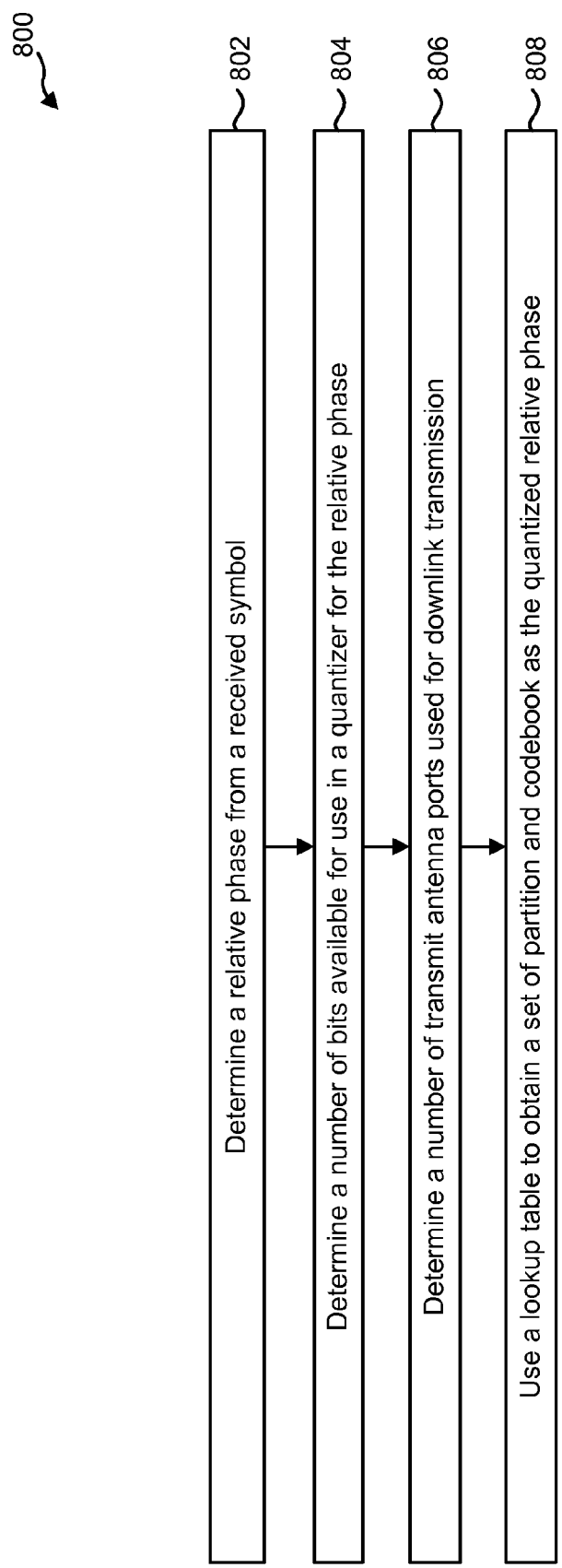
FIG. 7 is a flow diagram of a method for quantizing a relative phase.

FIG. 7 is a flow diagram of a method 800 for quantizing a relative phase 120. The method 800 may be performed by a user equipment (UE) 104. The user equipment (UE) 104 may determine 802 a relative phase 120 from a received symbol. As discussed above, the relative phase 120 may be $\theta_1 - \theta_2$ from Equation (7). The user equipment (UE) 104 may then determine 804 a number of bits available for use in a quantizer 540 for the relative phase 120 (i.e., the quantized relative phase 128). The number of bits available may be between one and five bits.

The user equipment (UE) 104 may determine 806 a number of transmit antenna ports used for downlink transmission (i.e., how many antenna ports are used and not the index of an antenna port). The number of transmit antenna ports used for downlink transmission may not be transparent to the user equipment (UE) 104. Instead, the number of transmit antenna ports used for downlink transmission may be conveyed to the user equipment (UE) 104 via control signaling. Thus, in one configuration determining 806 a number of transmit antenna ports used for downlink transmission may include receiving reference signal configurations used by antenna ports from an eNode B 202. The eNode B 202 may send the reference signal configurations to the user equipment (UE) 104 so that the user equipment (UE) 104 can perform channel estimation. The user equipment (UE) 104 may know that a first set of antenna ports and reference signal configurations are associated with the downlink channel $H_1$ 334 and a second set of antenna ports and reference signal configurations are associated with the downlink channel $H_2$ 336. The user equipment (UE) 104 may not be aware of the association between each downlink channel (e.g., $H_1$ 334 and $H_2$ 336) and the transmission points 302.

There may be two, four or eight transmit antenna ports used for downlink transmissions. The user equipment (UE) 104 may use 808 a lookup table 126 to obtain a set of partition 542 and codebook 544 as the quantized relative phase 128. The lookup table 126 used may be dependent on the number of bits available and the number of transmit antenna ports used for downlink transmission. The lookup table 126 used may also be dependent on whether the mean squared error (L2 norm) or the absolute value of error (L1) norm is used as the metric for evaluating the quantization error.

Table 1 through Table 15 below illustrate examples of different lookup tables 126 with the codebooks 544 and partitions 542 for indexes to obtain the quantized relative phase 128 when the user equipment (UE) 104 uses the mean squared error (L2 norm) as the metric for evaluating the quantization error. These tables may be obtained using a Lloyd-Max algorithm. A lookup table 126 used may also be selected based on the number of bits available and the number of transmit antenna ports used for downlink transmissions to the user equipment (UE) 104.

TABLE 1

1 bit, 2 Antenna, L2 norm

| Index i | Partition | Codebook |
|---|---|---|
| 0 | $-\pi$ | |
| 1 | 0 | $-1.23595627840631$ |
| 2 | $\pi$ | $1.23863116641321$ |

TABLE 2

2 bits, 2 Antenna, L2 norm

| Index i | Partition | Codebook |
|---|---|---|
| 0 | $-\pi$ | |
| 1 | $-1.41138509464738$ | $-2.15922145919903$ |
| 2 | $-0.00294215346561727$ | $-0.663548730095727$ |
| 3 | $1.40671858626695$ | $0.657664423164492$ |
| 4 | $\pi$ | $2.15577274936942$ |

TABLE 3

3 bits, 2 Antenna, L2 norm

| Index i | Partition | Codebook |
|---|---|---|
| 0 | $-\pi$ | |
| 1 | $-2.21445299374826$ | $-2.65455774723764$ |
| 2 | $-1.39825582099768$ | $-1.77434824025889$ |
| 3 | $-0.678747688247023$ | $-1.02216340173646$ |

TABLE 3-continued 3 bits, 2 Antenna, L2 norm

| Index i | Partition | Codebook |
|---|---|---|
| 4 | −0.00210324892478303 | −0.335331974757586 |
| 5 | 0.673450394802436 | 0.331125476908020 |
| 6 | 1.39185156752924 | 1.01577531269685 |
| 7 | 2.20899044891975 | 1.76792782236163 |
| 8 | π | 2.65005307547787 |

TABLE 4

4 bits, 2 Antenna, L2 norm

| Index i | Partition | Codebook |
|---|---|---|
| 0 | −π | |
| 1 | −2.66507190630106 | −2.90008035719259 |
| 2 | −2.21000378151950 | −2.43006345540953 |
| 3 | −1.78757021706594 | −1.98994410762947 |
| 4 | −1.39536396395490 | −1.58519632650242 |
| 5 | −1.02548278328869 | −1.20553160140739 |
| 6 | −0.673313799891758 | −0.845433965169985 |
| 7 | −0.332035226793302 | −0.501193634613531 |
| 8 | 0.00418008729072697 | −0.162876818973074 |
| 9 | 0.338963829187542 | 0.171236993554528 |
| 10 | 0.677532707370748 | 0.506690664820557 |
| 11 | 1.02571089943191 | 0.848374749920939 |
| 12 | 1.39248698741686 | 1.20304704894287 |
| 13 | 1.78368171996913 | 1.58192692589085 |
| 14 | 2.20406623391151 | 1.98543651404740 |
| 15 | 2.65912757914106 | 2.42269595377563 |
| 16 | π | 2.89555920450648 |

TABLE 5

5 bits, 2 Antenna, L2 norm

| Index i | Partition | Codebook |
|---|---|---|
| 0 | −π | |
| 1 | −2.90167652551881 | −3.021341124 |
| 2 | −2.66354524206991 | −2.782011927 |
| 3 | −2.43036612939198 | −2.545078557 |
| 4 | −2.20507960815207 | −2.315653702 |
| 5 | −1.98925362309120 | −2.094505514 |
| 6 | −1.78344006471768 | −1.884001732 |
| 7 | −1.58543687945889 | −1.682878398 |
| 8 | −1.39212334588418 | −1.487995361 |
| 9 | −1.20280887750219 | −1.296251331 |
| 10 | −1.01735646467297 | −1.109366424 |
| 11 | −0.836267561040762 | −0.925346505 |
| 12 | −0.660093592692425 | −0.747188617 |
| 13 | −0.486900208900719 | −0.572998568 |
| 14 | −0.315341704219257 | −0.40080185 |
| 15 | −0.145484892018096 | −0.229881559 |
| 16 | 0.0233575038488809 | −0.061088225 |
| 17 | 0.192580249453674 | 0.107803233 |
| 18 | 0.363117526119779 | 0.277357266 |
| 19 | 0.534730389414899 | 0.448877786 |
| 20 | 0.706483045394948 | 0.620582993 |
| 21 | 0.879827627184457 | 0.792383098 |
| 22 | 1.05521011992864 | 0.967272156 |
| 23 | 1.23351684632562 | 1.143148084 |
| 24 | 1.41746832361074 | 1.323885609 |
| 25 | 1.60684325956811 | 1.511051038 |
| 26 | 1.80279809489075 | 1.702635481 |
| 27 | 2.00792644575031 | 1.902960709 |
| 28 | 2.22175986404069 | 2.112892183 |
| 29 | 2.44212750762253 | 2.330627545 |
| 30 | 2.66865310260036 | 2.55362747 |
| 31 | 2.90201767397170 | 2.783678735 |
| 32 | π | 3.020356613 |

TABLE 6

1 bit, 4 Antenna, L2 norm

| Index i | Partition | Codebook |
|---|---|---|
| 0 | −π | |
| 1 | 0 | −1.18597283510365 |
| 2 | π | 1.18159259638981 |

TABLE 7

2 bits, 4 Antenna, L2 norm

| Index i | Partition | Codebook |
|---|---|---|
| 0 | −π | |
| 1 | −1.40245081317487 | −2.17734984476927 |
| 2 | 0.00007149716869 | −0.62755178158046 |
| 3 | 1.39956726144518 | 0.62769477591784 |
| 4 | π | 2.17143974697251 |

TABLE 8

3 bits, 4 Antenna, L2 norm

| Index i | Partition | Codebook |
|---|---|---|
| 0 | −π | |
| 1 | −2.212033541844 | −2.661253134546070 |
| 2 | −1.377281000674 | −1.762813949141900 |
| 3 | −0.656963080258 | −0.991748052205588 |
| 4 | −0.004361255330 | −0.322178108310595 |
| 5 | 0.648229574956 | 0.313455597651228 |
| 6 | 1.368918083668 | 0.983003552260775 |
| 7 | 2.206605198652 | 1.754832615075270 |
| 8 | π | 2.658377782228720 |

TABLE 9

4 bits, 4 Antenna, L2 norm

| Index i | Partition | Codebook |
|---|---|---|
| 0 | −π | |
| 1 | −2.675651482964160 | −2.907152303448010 |
| 2 | −2.222528729556650 | −2.444150662480310 |
| 3 | −1.791592789022180 | −2.000906796632990 |
| 4 | −1.389612883041270 | −1.582278781411370 |
| 5 | −1.020196569403590 | −1.196946984671170 |
| 6 | −0.676524913921812 | −0.843446154136000 |
| 7 | −0.348189534369778 | −0.509603673707624 |
| 8 | −0.027233801878343 | −0.186775395031932 |
| 9 | 0.293603871870966 | 0.132307791275245 |
| 10 | 0.622084799855749 | 0.454899952466687 |
| 11 | 0.968241701103100 | 0.789269647244810 |
| 12 | 1.341305830571310 | 1.147213754961390 |
| 13 | 1.747693752287920 | 1.535397906181220 |
| 14 | 2.189301850336400 | 1.959989598394630 |
| 15 | 2.659098618350450 | 2.418614102278170 |
| 16 | π | 2.899583134422720 |

TABLE 10

5 bits, 4 Antenna, L2 norm

| Index i | Partition | Codebook |
|---|---|---|
| 0 | −π | |
| 1 | −2.90167652551881 | −2.899771254742700 |
| 2 | −2.66354524206991 | −2.659237658484510 |
| 3 | −2.43036612939198 | −2.423285319993800 |
| 4 | −2.20507960815207 | −2.194543562817020 |

TABLE 10-continued 5 bits, 4 Antenna, L2 norm

| Index i | Partition | Codebook |
|---|---|---|
| 5 | −1.98925362309120 | −1.973608550086380 |
| 6 | −1.78344006471768 | −1.759624840071010 |
| 7 | −1.58543687945889 | −1.553638020855820 |
| 8 | −1.39211234588418 | −1.355199416080470 |
| 9 | −1.20280887750219 | −1.164354915612280 |
| 10 | −1.01735646467297 | −0.982001691764710 |
| 11 | −0.836267561040762 | −0.806183668052024 |
| 12 | −0.660093592692425 | −0.636860135460366 |
| 13 | −0.486900208900719 | −0.472776097388504 |
| 14 | −0.315341704219257 | −0.311714354619032 |
| 15 | −0.145484892018096 | −0.151749392447980 |
| 16 | 0.0233575038488809 | 0.009268795390242 |
| 17 | 0.192580249453674 | 0.172083321732193 |
| 18 | 0.363117526119779 | 0.336456563068126 |
| 19 | 0.534730389414899 | 0.502635643266643 |
| 20 | 0.706483045394948 | 0.671235929278204 |
| 21 | 0.879827627184465 | 0.843665859781465 |
| 22 | 1.05521011992864 | 1.021450544951370 |
| 23 | 1.23351684632562 | 1.204579755132230 |
| 24 | 1.41746832361074 | 1.393888742278190 |
| 25 | 1.60684325956811 | 1.590373268957980 |
| 26 | 1.80279809489075 | 1.792961087628060 |
| 27 | 2.00792644575031 | 2.002027996936980 |
| 28 | 2.22175986404069 | 2.219136091342080 |
| 29 | 2.44212750762253 | 2.442815505533160 |
| 30 | 2.66865310260036 | 2.672002406629790 |
| 31 | 2.90201767397170 | 2.906338374508240 |
| 32 | $\pi$ | −2.899771254742700 |

TABLE 11

1 bit, 8 Antenna, L2 norm

| Index i | Partition | Codebook |
|---|---|---|
| 0 | −$\pi$ | |
| 1 | 0 | −1.21908408282960 |
| 2 | $\pi$ | 1.20941664457322 |

TABLE 12

2 bits, 8 Antenna, L2 norm

| Index i | Partition | Codebook |
|---|---|---|
| 0 | −$\pi$ | |
| 1 | −1.41199373541433 | −2.89977125474270 |
| 2 | −0.00092346693994 | −2.65923765848451 |
| 3 | 1.41131051133869 | −2.42328531999380 |
| 4 | $\pi$ | −2.19454356281702 |

TABLE 13

3 bits, 8 Antenna, L2 norm

| Index i | Partition | Codebook |
|---|---|---|
| 0 | −$\pi$ | |
| 1 | −2.211075193949290 | −2.659501421295930 |
| 2 | −1.375951318327980 | −1.762648966602650 |
| 3 | −0.650677440959337 | −0.989253670053316 |
| 4 | 0.010979275336330 | −0.312101211865357 |
| 5 | 0.673135778352297 | 0.334059762538018 |
| 6 | 1.397171066170180 | 1.012211794166580 |
| 7 | 2.225047147027220 | 1.782130338173780 |
| 8 | $\pi$ | 2.667963955880650 |

TABLE 14

4 bits, 8 Antenna, L2 norm

| Index i | Partition | Codebook |
|---|---|---|
| 0 | −$\pi$ | |
| 1 | −2.661934966594260 | −2.898416876703870 |
| 2 | −2.199967799725050 | −2.425453056484650 |
| 3 | −1.766729593738070 | −1.974482542965450 |
| 4 | −1.367949059414700 | −1.558976644510700 |
| 5 | −0.999485540564762 | −1.176921474318710 |
| 6 | −0.653081804251356 | −0.822049606810819 |
| 7 | −0.320434280989969 | −0.484114001691894 |
| 8 | 0.005562028122208 | −0.156754560288045 |
| 9 | 0.331866283381156 | 0.167878616532460 |
| 10 | 0.665824846482692 | 0.495853950229851 |
| 11 | 1.015031646907180 | 0.835795742735533 |
| 12 | 1.386851655606480 | 1.194267551078830 |
| 13 | 1.785670222057300 | 1.579435760134140 |
| 14 | 2.213787120304240 | 1.991904683980460 |
| 15 | 2.670284025915170 | 2.435669556628030 |
| 16 | $\pi$ | 2.904898495202310 |

TABLE 15

5 bits, 8 Antenna, L2 norm

| Index i | Partition | Codebook |
|---|---|---|
| 0 | −$\pi$ | |
| 1 | −2.908500753797590 | −3.025635784183380 |
| 2 | −2.675041654083890 | −2.791365723411800 |
| 3 | −2.445972984679390 | −2.558717584755980 |
| 4 | −2.222837478565040 | −2.333228384602790 |
| 5 | −2.005015360464200 | −2.112446572527280 |
| 6 | −1.794423676256980 | −1.897584148401120 |
| 7 | −1.592606783353210 | −1.691263204112840 |
| 8 | −1.398650688760650 | −1.493950362593580 |
| 9 | −1.211702761325980 | −1.303351014927710 |
| 10 | −1.032294929650290 | −1.120054507724240 |
| 11 | −0.858358232582577 | −0.944535351576334 |
| 12 | −0.687628418757141 | −0.772181113588820 |
| 13 | −0.518325228877272 | −0.603075723925462 |
| 14 | −0.349501768189215 | −0.433574733829083 |
| 15 | −0.182605214523405 | −0.265428802549347 |
| 16 | −0.016931227784496 | −0.099781626497464 |
| 17 | 0.149644376847969 | 0.065919170928473 |
| 18 | 0.317010776073091 | 0.233369582767466 |
| 19 | 0.485120473138119 | 0.400651969378717 |
| 20 | 0.655377738958219 | 0.569588976897522 |
| 21 | 0.830011581516358 | 0.741166501018915 |
| 22 | 1.010139154894960 | 0.918856662013801 |
| 23 | 1.196476311444580 | 1.101421647776120 |
| 24 | 1.389501455721800 | 1.291530975113050 |
| 25 | 1.588149073304600 | 1.487741936330540 |
| 26 | 1.791366693835750 | 1.688826210278660 |
| 27 | 2.000490315276320 | 1.893907177392840 |
| 28 | 2.217545704433180 | 2.107073453159810 |
| 29 | 2.440495744216910 | 2.328017955706550 |
| 30 | 2.669403133232640 | 2.552973532727280 |
| 31 | 2.904768473003190 | 2.785832733738000 |
| 32 | $\pi$ | 3.023704212268390 |

Table 16 through Table 30 below illustrate examples of different lookup tables 126 with the codebooks 544 and partitions 542 for indexes to obtain the quantized relative phase 128 when the user equipment (UE) 104 uses the absolute value of error (L1 norm) as the metric for evaluating the quantization error. These tables may be obtained using a Lloyd-Max algorithm. A lookup table 126 used may also be selected based on the number of bits available and the number of transmit antenna ports used for downlink transmissions to the user equipment (UE) 104. One of the lookup tables 126 for a given number of bits may be used for a different number of antenna configurations.

TABLE 16

1 bit, 2 Antenna, L1 norm

| Index i | Partition | Codebook |
|---|---|---|
| 0 | $-\pi$ | |
| 1 | 0 | −1.09367129494458 |
| 2 | $\pi$ | 1.09501053585619 |

TABLE 17

2 bits, 2 Antenna, L1 norm

| Index i | Partition | Codebook |
|---|---|---|
| 0 | $-\pi$ | |
| 1 | −1.31452792785297 | −2.02407924399854 |
| 2 | 0.00111355419000 | −0.60497661170740 |
| 3 | 1.31869444774850 | 0.60720372008740 |
| 4 | $\pi$ | 2.03018517540961 |

TABLE 18

3 bits, 2 Antenna, L1 norm

| Index i | Partition | Codebook |
|---|---|---|
| 0 | $-\pi$ | |
| 1 | −2.134078735947670 | −2.593068684398100 |
| 2 | −1.310625689106230 | −1.675088787497240 |
| 3 | −0.624143736774304 | −0.946162590715217 |
| 4 | 0.005605771326203 | −0.302124882833392 |
| 5 | 0.633428555898710 | 0.313336425485799 |
| 6 | 1.316027161991320 | 0.953520686311622 |
| 7 | 2.136856517671260 | 1.678533637671030 |
| 8 | $\pi$ | 2.595179397671490 |

TABLE 19

4 bits, 2 Antenna, L1 norm

| Index i | Partition | Codebook |
|---|---|---|
| 0 | $-\pi$ | |
| 1 | −2.631052155773350 | −2.880772086080920 |
| 2 | −2.155434664652970 | −2.381332225465790 |
| 3 | −1.728736598618900 | −1.929537103840150 |
| 4 | −1.344633688195950 | −1.527936093397650 |
| 5 | −0.989749559060169 | −1.161331282994260 |
| 6 | −0.656141987511864 | −0.818167835126083 |
| 7 | −0.334825512824686 | −0.494116139897645 |
| 8 | −0.019336009569187 | −0.175534885751726 |
| 9 | 0.292827817435732 | 0.136862866613352 |
| 10 | 0.609178146568413 | 0.448792768258113 |
| 11 | 0.941423855925844 | 0.769563524878713 |
| 12 | 1.300228856997490 | 1.113284186972980 |
| 13 | 1.689081646188740 | 1.487173527022000 |
| 14 | 2.122138798985630 | 1.890989765355480 |
| 15 | 2.611185185711550 | 2.353287832615790 |
| 16 | $\pi$ | 2.869082538807300 |

TABLE 20

5 bits, 2 Antenna, L1 norm

| Index i | Partition | Codebook |
|---|---|---|
| 0 | $-\pi$ | |
| 1 | −2.878389717356630 | −3.008172942633420 |
| 2 | −2.624615026952760 | −2.748606492079850 |
| 3 | −2.380529883120020 | −2.500623561825660 |
| 4 | −2.144730400739970 | −2.260436204414370 |

TABLE 20-continued

5 bits, 2 Antenna, L1 norm

| Index i | Partition | Codebook |
|---|---|---|
| 5 | −1.920891704297190 | −2.029024597065570 |
| 6 | −1.711449694465320 | −1.812758811528810 |
| 7 | −1.514391769231580 | −1.610140577401830 |
| 8 | −1.327227903625630 | −1.418642961061330 |
| 9 | −1.147039288607930 | −1.235812846189930 |
| 10 | −0.971333469306988 | −1.058265731025930 |
| 11 | −0.798568024626500 | −0.884401207588047 |
| 12 | −0.629323865972329 | −0.712734841664953 |
| 13 | −0.464685367622036 | −0.545912890279706 |
| 14 | −0.302639031734839 | −0.383457844964365 |
| 15 | −0.141169153897514 | −0.221820218505313 |
| 16 | 0.019851511807936 | −0.060518089289716 |
| 17 | 0.179567752473454 | 0.100221112905587 |
| 18 | 0.338742953294528 | 0.258914392041321 |
| 19 | 0.497938143464582 | 0.418571514547735 |
| 20 | 0.657002728503046 | 0.577304772381429 |
| 21 | 0.818440759191131 | 0.736700684624664 |
| 22 | 0.984663317771397 | 0.900180833757969 |
| 23 | 1.157262698590130 | 1.069145801784820 |
| 24 | 1.339925328023050 | 1.245379595395440 |
| 25 | 1.533560816546550 | 1.434471060650660 |
| 26 | 1.735555261169340 | 1.632650572442440 |
| 27 | 1.947023815318000 | 1.838459949896230 |
| 28 | 2.168978185981020 | 2.055587680739760 |
| 29 | 2.399698213284540 | 2.282368691222280 |
| 30 | 2.639348105631140 | 2.517027735346810 |
| 31 | 2.886384997070900 | 2.761668475915460 |
| 32 | $\pi$ | 3.011101518226340 |

TABLE 21

1 bit, 4 Antenna, L1 norm

| Index i | Partition | Codebook |
|---|---|---|
| 0 | $-\pi$ | |
| 1 | 0 | −0.998204445201816 |
| 2 | $\pi$ | 0.999496638015904 |

TABLE 22

2 bits, 4 Antenna, L1 norm

| Index i | Partition | Codebook |
|---|---|---|
| 0 | $-\pi$ | |
| 1 | −1.31569425394291 | −2.06323079222109 |
| 2 | −0.00362874782800 | −0.56815771566474 |
| 3 | 1.30179463889535 | 0.56090022000874 |
| 4 | $\pi$ | 2.04268905778197 |

TABLE 23

3 bits, 4 Antenna, L1 norm

| Index i | Partition | Codebook |
|---|---|---|
| 0 | $-\pi$ | |
| 1 | −2.123692295302810 | −2.601689923327290 |
| 2 | −1.273378454002580 | −1.645694667278340 |
| 3 | −0.592834001000400 | −0.901062240726810 |
| 4 | 0.002724174445301 | −0.284605761273990 |
| 5 | 0.597804367344322 | 0.290054110164592 |
| 6 | 1.278534406023140 | 0.905554624524053 |
| 7 | 2.126827346754730 | 1.651514187522230 |
| 8 | $\pi$ | 2.602140505987230 |

TABLE 24

4 bits, 4 Antenna, L1 norm

| Index i | Partition | Codebook |
|---|---|---|
| 0 | $-\pi$ | |
| 1 | -2.644913111066800 | -2.890508897475710 |
| 2 | -2.170063664612810 | -2.399317324657900 |
| 3 | -1.733167478594280 | -1.940810004567730 |
| 4 | -1.340225687402210 | -1.525524952620830 |
| 5 | -0.988318474428589 | -1.154926422183580 |
| 6 | -0.666697497775529 | -0.821710526673596 |
| 7 | -0.363147123027696 | -0.511684468877462 |
| 8 | -0.068398882985252 | -0.214609777177929 |
| 9 | 0.227007470633786 | 0.077812011207425 |
| 10 | 0.533594844106205 | 0.376202930060147 |
| 11 | 0.862439606886043 | 0.690986758152263 |
| 12 | 1.224767540055790 | 1.033892455619820 |
| 13 | 1.630501470240080 | 1.415642624491760 |
| 14 | 2.090629779986100 | 1.845360315988400 |
| 15 | 2.602388375029590 | 2.335899243983800 |
| 16 | $\pi$ | 2.868877506075380 |

TABLE 25

5 bits, 4 Antenna, L1 norm

| Index i | Partition | Codebook |
|---|---|---|
| 0 | $-\pi$ | |
| 1 | -2.886030133972080 | -3.014426787681570 |
| 2 | -2.631132755222210 | -2.757633480262580 |
| 3 | -2.382351949558630 | -2.504632030181840 |
| 4 | -2.143399076728280 | -2.260071869355420 |
| 5 | -1.912284339875370 | -2.026726284521140 |
| 6 | -1.691310041526930 | -1.797842395229600 |
| 7 | -1.485776469645820 | -1.584777687824260 |
| 8 | -1.291646707205890 | -1.386775251467390 |
| 9 | -1.105882243668580 | -1.196518162944400 |
| 10 | -0.929461374898553 | -1.015246324392770 |
| 11 | -0.762253804174256 | -0.843676425404339 |
| 12 | -0.604285118810082 | -0.680831182944173 |
| 13 | -0.451991377205697 | -0.527739054675990 |
| 14 | -0.302734332567433 | -0.376243699735403 |
| 15 | -0.154497124564833 | -0.229224965399463 |
| 16 | -0.005198605391636 | -0.079769283730203 |
| 17 | 0.145435003740759 | 0.069372072946930 |
| 18 | 0.296482917936633 | 0.221497934534588 |
| 19 | 0.447919217601628 | 0.371467901338678 |
| 20 | 0.602431306423012 | 0.524370533864578 |
| 21 | 0.762281742397963 | 0.680492079981447 |
| 22 | 0.929440392656358 | 0.844071405814479 |
| 23 | 1.104350624459880 | 1.014809379498240 |
| 24 | 1.288509171147950 | 1.193891869421520 |
| 25 | 1.481268513093650 | 1.383126472874380 |
| 26 | 1.684301064669110 | 1.579410553312920 |
| 27 | 1.900710952877860 | 1.789191576025290 |
| 28 | 2.128266872544170 | 2.012230329730430 |
| 29 | 2.367947360839880 | 2.244303415357900 |
| 30 | 2.618505256323180 | 2.491591306321870 |
| 31 | 2.877861769036940 | 2.745419206324500 |
| 32 | $\pi$ | 3.010304331749390 |

TABLE 26

1 bit, 8 Antenna, L1 norm

| Index i | Partition | Codebook |
|---|---|---|
| 0 | $-\pi$ | |
| 1 | 0 | -1.04753304109621 |
| 2 | $\pi$ | 1.03611118205479 |

TABLE 27

2 bits, 8 Antenna, L1 norm

| Index i | Partition | Codebook |
|---|---|---|
| 0 | $-\pi$ | |
| 1 | -1.32886932776099 | -2.06955560154442 |
| 2 | -0.00758003855515 | -0.58818305397756 |
| 3 | 1.31720467632936 | 0.57302297686726 |
| 4 | $\pi$ | 2.06138637579147 |

TABLE 28

3 bits, 8 Antenna, L1 norm

| Index i | Partition | Codebook |
|---|---|---|
| 0 | $-\pi$ | |
| 1 | -2.133199513307000 | -2.605629058583020 |
| 2 | -1.283989470213710 | -1.660769968030980 |
| 3 | -0.591821752980070 | -0.907208972396436 |
| 4 | 0.018717991347806 | -0.276434533563705 |
| 5 | 0.628295660327452 | 0.313870516259317 |
| 6 | 1.316379523261330 | 0.942720804395587 |
| 7 | 2.153780061714520 | 1.690038242127080 |
| 8 | $\pi$ | 2.617521881301960 |

TABLE 29

4 bits, 8 Antenna, L1 norm

| Index i | Partition | Codebook |
|---|---|---|
| 0 | $-\pi$ | |
| 1 | -2.618005063441120 | -2.873724785529820 |
| 2 | -2.125092819389010 | -2.362285341352410 |
| 3 | -1.676653768000270 | -1.887900297425610 |
| 4 | -1.275351585964420 | -1.465407238574920 |
| 5 | -0.916373810881244 | -1.085295933353910 |
| 6 | -0.591826780723955 | -0.747451688408576 |
| 7 | -0.286646071789804 | -0.436201873039334 |
| 8 | 0.010430029075501 | -0.137090270540273 |
| 9 | 0.306570187624687 | 0.157950328691274 |
| 10 | 0.611193966097604 | 0.455190046558100 |
| 11 | 0.936546128568093 | 0.767197885637108 |
| 12 | 1.293793366587160 | 1.105894371499080 |
| 13 | 1.690199071153520 | 1.481692361675250 |
| 14 | 2.132787866438670 | 1.898705780631790 |
| 15 | 2.623582483318950 | 2.366869952245550 |
| 16 | $\pi$ | 2.880295014392350 |

TABLE 30

5 bits, 8 Antenna, L1 norm

| Index i | Partition | Codebook |
|---|---|---|
| 0 | $-\pi$ | |
| 1 | -2.884096636842090 | -3.012426449663740 |
| 2 | -2.630741645671490 | -2.755766824020440 |
| 3 | -2.383889247740960 | -2.505716467322540 |
| 4 | -2.144407386247920 | -2.262062028159390 |
| 5 | -1.916783475932400 | -2.026752744336460 |
| 6 | -1.699448407305070 | -1.806814207528350 |
| 7 | -1.492351409493820 | -1.592082607081790 |
| 8 | -1.296364525810830 | -1.392620211905850 |
| 9 | -1.107556870867660 | -1.200108839715800 |
| 10 | -0.928612030772058 | -1.015004902019520 |
| 11 | -0.757603632918427 | -0.842219159524594 |
| 12 | -0.592045438625180 | -0.672988106312261 |
| 13 | -0.434890988316303 | -0.511102770938099 |
| 14 | -0.283875254373756 | -0.358679205694507 |
| 15 | -0.134638669316917 | -0.209071303053005 |
| 16 | 0.015333742477626 | -0.060206035580829 |

TABLE 30-continued 5 bits, 8 Antenna, L1 norm

| Index i | Partition | Codebook |
|---|---|---|
| 17 | 0.167822507170290 | 0.090873520536082 |
| 18 | 0.322320872388125 | 0.244771493804498 |
| 19 | 0.478610141822056 | 0.399870250971751 |
| 20 | 0.636005516140489 | 0.557350032672361 |
| 21 | 0.795891503995905 | 0.714660999608616 |
| 22 | 0.960986329781958 | 0.877122008383194 |
| 23 | 1.132099774969350 | 1.044850651180720 |
| 24 | 1.309352494402300 | 1.219348898757980 |
| 25 | 1.496217123910040 | 1.399356090046620 |
| 26 | 1.697361248341860 | 1.593078157773460 |
| 27 | 1.912906367110150 | 1.801644338910270 |
| 28 | 2.140619339689120 | 2.024168395310020 |
| 29 | 2.377188446261050 | 2.257070284068230 |
| 30 | 2.624392377478700 | 2.497306608453870 |
| 31 | 2.882039490733210 | 2.751478146503540 |
| 32 | π | 3.012600834962880 |

Figure 8:
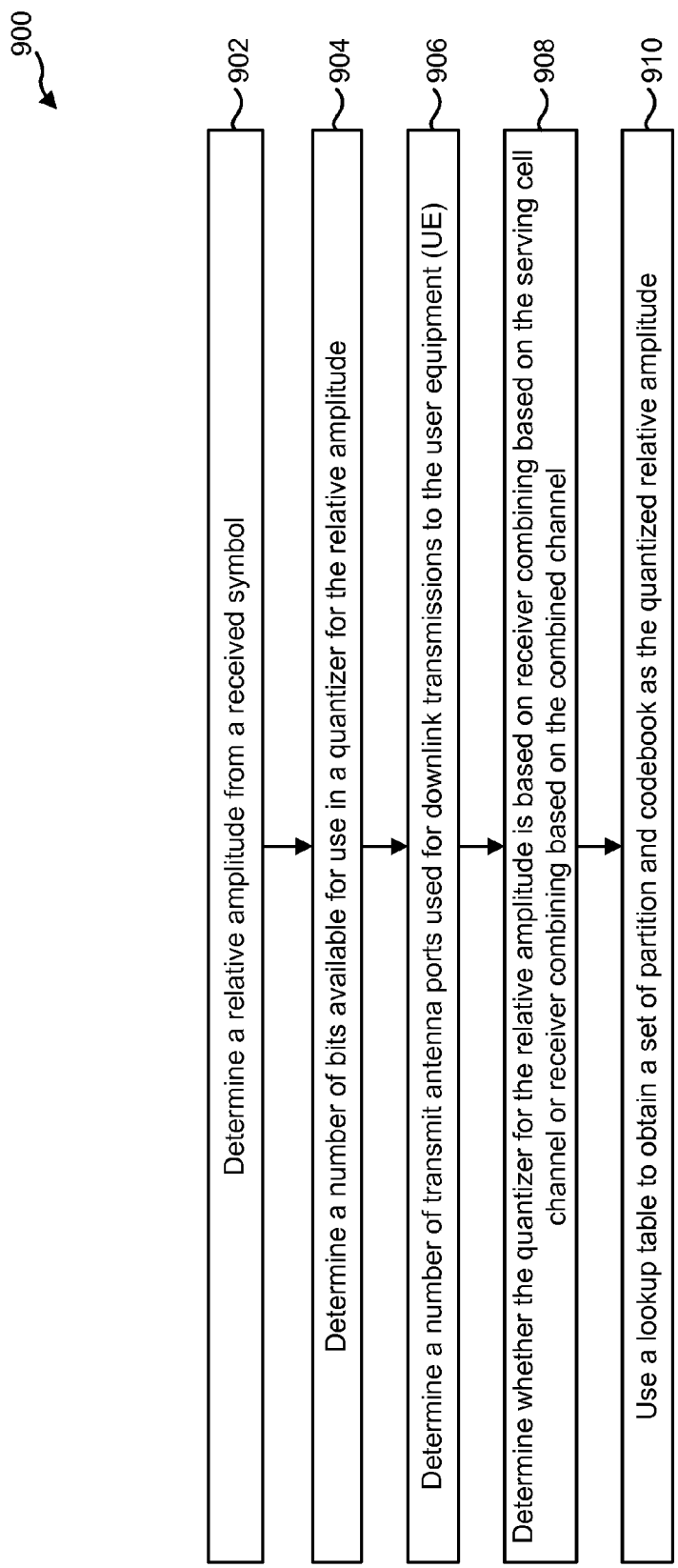
FIG. 8 is a flow diagram of a method for quantizing a relative amplitude.

FIG. 8 is a flow diagram of a method 900 for quantizing a relative amplitude 122. The method 900 may be performed by a user equipment (UE) 104. The user equipment (UE) 104 may determine 902 a relative amplitude 122 from a received symbol. The user equipment (UE) 104 may determine 902 the relative amplitude 122 from the received symbol using one of Equation (8), Equation (9), Equation (10) or Equation (11) above. The user equipment (UE) 104 may determine 904 a number of bits available for use in a quantizer 540 for the relative amplitude 122 (i.e., the quantized relative amplitude 130). The number of bits available for use in the quantizer 540 for the relative amplitude 122 may be between one and five bits.

The user equipment (UE) 104 may determine 906 a number of transmit antenna ports used for downlink transmissions to the user equipment (UE) 104 (i.e., how many antenna ports are used and not the index of an antenna port). As discussed above, the number of transmit antenna ports used for transmissions to the user equipment (UE) 104 may not be transparent to the user equipment (UE) 104. Instead, the number of transmit antenna ports used for downlink transmissions to the user equipment (UE) 104 may be conveyed to the user equipment (UE) 104 via control signaling. The user equipment (UE) 104 may know that a first set of antenna ports and reference signal configurations are associated with the downlink channel $H_1$ 334 and a second set of antenna ports and reference signal configurations are associated with the downlink channel $H_2$ 336. The user equipment (UE) 104 may not be aware of the association between each downlink channel (e.g., $H_1$ 334 and $H_2$ 336) and the transmission points 302.

The number of transmit antenna ports used for downlink transmission to the user equipment (UE) 104 may be two, four or eight. The user equipment (UE) 104 may determine 908 whether the quantizer 540 for the relative phase 120 is based on receiver combining based on the serving cell channel or receiver combining based on the combined channel. The user equipment (UE) 104 may then use 910 a lookup table 126 to obtain a set of partition 542 and codebook 544 as the quantized relative amplitude 130. The lookup table 126 used may be dependent on whether the relative amplitude 122 was determined using Equation (8), Equation (9), Equation (10) or Equation (11). The lookup table 126 used may also be dependent on the number of bits available and the number of transmit antenna ports used for downlink transmission to the user equipment (UE) 104. The lookup table 126 used may further be dependent on whether receiver combining based on the combined channel or receiver combining based on the serving cell channel is used by the user equipment (UE) 104.

Table 31 through Table 45 below illustrate examples of different lookup tables 126 with the codebooks 544 and partitions 542 for indexes to obtain the quantized relative amplitude 130 when the user equipment (UE) 104 uses receiver combining based on the serving cell 302a channel and when the relative amplitude 122 is obtained using Equation (8) above. These tables may be obtained using a Lloyd-Max algorithm. A lookup table 126 used may also be selected based on the number of bits available and the number of transmit antenna ports used for downlink transmission to the user equipment (UE) 104.

TABLE 31

1 bit, 2 Antenna, Receiver combining based on serving cell

| Index i | Partition | Codebook |
|---|---|---|
| 0 | −∞ | |
| 1 | 1.02019914819578 | 0.945910445770456 |
| 2 | ∞ | 1.09448785062111 |

TABLE 32

2 bits, 2 Antenna, Receiver combining based on serving cell

| Index i | Partition | Codebook |
|---|---|---|
| 0 | −∞ | |
| 1 | 0.91875951515965 | 0.86552686149255 |
| 2 | 1.01340114428974 | 0.97199216882674 |
| 3 | 1.11943627553331 | 1.05481011975275 |
| 4 | ∞ | 1.18406243131386 |

TABLE 33

3 bits, 2 Antenna, Receiver combining based on serving cell

| Index i | Partition | Codebook |
|---|---|---|
| 0 | −∞ | |
| 1 | 0.851788375853579 | 0.815107457180166 |
| 2 | 0.917127416841155 | 0.888469294526991 |
| 3 | 0.969122823802397 | 0.945785539155319 |
| 4 | 1.014786378694010 | 0.992460108449475 |
| 5 | 1.064042876801060 | 1.037112648938540 |
| 6 | 1.125582370759060 | 1.090973104663590 |
| 7 | 1.207499642861560 | 1.160191636854530 |
| 8 | ∞ | 1.254807648868600 |

TABLE 34

4 bits, 2 Antenna, Receiver combining based on serving cell

| Index i | Partition | Codebook |
|---|---|---|
| 0 | −∞ | |
| 1 | 0.804591167178699 | 0.780091272391713 |
| 2 | 0.848936449753581 | 0.829091061965684 |
| 3 | 0.885738397436554 | 0.868781837541479 |
| 4 | 0.917776424636988 | 0.902694957331629 |
| 5 | 0.946235950768816 | 0.932857891942347 |
| 6 | 0.971971433025337 | 0.959614009595285 |
| 7 | 0.995974120035211 | 0.984328856455390 |
| 8 | 1.019700019480570 | 1.007619383615030 |
| 9 | 1.044811526572030 | 1.031780655346120 |
| 10 | 1.072486285277430 | 1.057842397797940 |
| 11 | 1.103886045973220 | 1.087130172756930 |
| 12 | 1.139445642489040 | 1.120641919189510 |
| 13 | 1.179676827120370 | 1.158249365788570 |

TABLE 34-continued 4 bits, 2 Antenna, Receiver combining based on serving cell

| Index i | Partition | Codebook |
|---|---|---|
| 14 | 1.225826253187790 | 1.201104288452170 |
| 15 | 1.281919194514770 | 1.250548217923410 |
| 16 | ∞ | 1.313290171106130 |

TABLE 35

5 bits, 2 Antenna, Receiver combining based on serving cell

| Index i | Partition | Codebook |
|---|---|---|
| 0 | −∞ | |
| 1 | 0.774604425993139 | 0.757179712558105 |
| 2 | 0.805588179786550 | 0.792029139428172 |
| 3 | 0.830987706421272 | 0.819147220144928 |
| 4 | 0.853449411286545 | 0.842828192697617 |
| 5 | 0.874012712071547 | 0.864070629875474 |
| 6 | 0.893285838945170 | 0.883954794267621 |
| 7 | 0.911310275909999 | 0.902616883622720 |
| 8 | 0.927624410115915 | 0.920003668197277 |
| 9 | 0.942391822064453 | 0.935245152034553 |
| 10 | 0.956385955452413 | 0.949538492094354 |
| 11 | 0.969780759107783 | 0.963233418810473 |
| 12 | 0.982673915918342 | 0.976328099405094 |
| 13 | 0.995132445437304 | 0.989019732431590 |
| 14 | 1.007381130504400 | 1.001245158443020 |
| 15 | 1.019719930949430 | 1.013517102565780 |
| 16 | 1.032207956065220 | 1.025922759333080 |
| 17 | 1.045157529055720 | 1.038493152797370 |
| 18 | 1.058768390113700 | 1.051821905314070 |
| 19 | 1.073202743159510 | 1.065714874913340 |
| 20 | 1.088789014400850 | 1.080690611405670 |
| 21 | 1.105644738069060 | 1.096884174396020 |
| 22 | 1.123335246053260 | 1.114402058742090 |
| 23 | 1.141769887467310 | 1.132268433364430 |
| 24 | 1.160923597803630 | 1.151271341570190 |
| 25 | 1.180823177552430 | 1.170575854037070 |
| 26 | 1.202301204010970 | 1.191070501067800 |
| 27 | 1.225736530510410 | 1.213531906954140 |
| 28 | 1.250705457471880 | 1.237941154066680 |
| 29 | 1.277241076049470 | 1.263469760877080 |
| 30 | 1.306129537201810 | 1.291012391221850 |
| 31 | 1.340467434569720 | 1.321246683181770 |
| 32 | ∞ | 1.359688185957680 |

TABLE 36

1 bit, 4 Antenna, Receiver combining based on serving cell

| Index i | Partition | Codebook |
|---|---|---|
| 0 | −∞ | |
| 1 | 1.01789695572437 | 0.923037508407651 |
| 2 | ∞ | 1.11275640304108 |

TABLE 37

2 bits, 4 Antenna, Receiver combining based on serving cell

| Index i | Partition | Codebook |
|---|---|---|
| 0 | −∞ | |
| 1 | 0.91033696549047 | 0.85359595242451 |
| 2 | 1.02070673169954 | 0.96707797855642 |
| 3 | 1.14182289798572 | 1.07433548484266 |
| 4 | ∞ | 1.20931031112878 |

TABLE 38

3 bits, 4 Antenna, Receiver combining based on serving cell

| Index i | Partition | Codebook |
|---|---|---|
| 0 | −∞ | |
| 1 | 0.838082165213739 | 0.799648748495399 |
| 2 | 0.907245467635922 | 0.876515581932079 |
| 3 | 0.966344931439730 | 0.937975353339764 |
| 4 | 1.023694660629170 | 0.994714509539696 |
| 5 | 1.084343004490900 | 1.052674811718640 |
| 6 | 1.154416335301810 | 1.116011197263150 |
| 7 | 1.247060147335850 | 1.192821473340460 |
| 8 | ∞ | 1.301298821331250 |

TABLE 39

4 bits, 4 Antenna, Receiver combining based on serving cell

| Index i | Partition | Codebook |
|---|---|---|
| 0 | −∞ | |
| 1 | 0.786187515066912 | 0.757300964132565 |
| 2 | 0.835996062890415 | 0.815074066001258 |
| 3 | 0.874995134797845 | 0.856918059779571 |
| 4 | 0.909028652229698 | 0.893072209816120 |
| 5 | 0.940116063855879 | 0.924985094643275 |
| 6 | 0.970091456760404 | 0.955247033068484 |
| 7 | 0.999504621793492 | 0.984935880452324 |
| 8 | 1.028782997137900 | 1.014073363134660 |
| 9 | 1.058775698587870 | 1.043492631141140 |
| 10 | 1.090311672845090 | 1.074058766034600 |
| 11 | 1.124121373902640 | 1.106564579655580 |
| 12 | 1.161511195881370 | 1.141678168149700 |
| 13 | 1.204981695327150 | 1.181344223613030 |
| 14 | 1.258269905454820 | 1.228619167041260 |
| 15 | 1.330074122096870 | 1.287920643868370 |
| 16 | ∞ | 1.372227600325360 |

TABLE 40

5 bits, 4 Antenna, Receiver combining based on serving cell

| Index i | Partition | Codebook |
|---|---|---|
| 0 | −∞ | |
| 1 | 0.735776746497333 | 0.712796658157577 |
| 2 | 0.774940026364654 | 0.758756834837089 |
| 3 | 0.803940842156958 | 0.791051217892219 |
| 4 | 0.827981757601700 | 0.816830466421696 |
| 5 | 0.849324333247359 | 0.839133048781705 |
| 6 | 0.869107027183808 | 0.859515617713013 |
| 7 | 0.887897629640903 | 0.878698436654602 |
| 8 | 0.905604601213261 | 0.897096822627204 |
| 9 | 0.922297896965421 | 0.914112379799317 |
| 10 | 0.938545029661467 | 0.930483414131525 |
| 11 | 0.954459642686580 | 0.946606645191409 |
| 12 | 0.970241368267750 | 0.962312640181751 |
| 13 | 0.986031950611836 | 0.978170096353749 |
| 14 | 1.001789326298560 | 0.993893804869922 |
| 15 | 1.017621611066350 | 1.009684847727190 |
| 16 | 1.033540417761120 | 1.025558374405500 |
| 17 | 1.049624499039010 | 1.041522461116750 |
| 18 | 1.065893978807110 | 1.057726536961270 |
| 19 | 1.082593996669610 | 1.074061420652960 |
| 20 | 1.099806673310230 | 1.091126572686250 |
| 21 | 1.117388868696390 | 1.108486773934200 |
| 22 | 1.135897674998910 | 1.126290999858590 |
| 23 | 1.155479952355770 | 1.145504350139230 |
| 24 | 1.175876472484740 | 1.165455554572310 |
| 25 | 1.197924904504570 | 1.186297390397170 |
| 26 | 1.222337086636050 | 1.209552418611960 |
| 27 | 1.249093614405180 | 1.235121754660140 |
| 28 | 1.278828565301270 | 1.263065474150210 |
| 29 | 1.313040704619200 | 1.294591656452330 |
| 30 | 1.352719514532050 | 1.331489752786080 |

TABLE 40-continued 5 bits, 4 Antenna, Receiver combining based on serving cell

| Index i | Partition | Codebook |
|---|---|---|
| 31 | 1.408436397606580 | 1.373949276278010 |
| 32 | ∞ | 1.442923518935150 |

TABLE 41

1 bit, 8 Antenna, Receiver combining based on serving cell

| Index i | Partition | Codebook |
|---|---|---|
| 0 | −∞ | |
| 1 | 1.02894419039932 | 0.910533717572790 |
| 2 | ∞ | 1.14735466322584 |

TABLE 42

2 bits, 8 Antenna, Receiver combining based on serving cell

| Index i | Partition | Codebook |
|---|---|---|
| 0 | −∞ | |
| 1 | 0.89662043839200 | 0.82756094816540 |
| 2 | 1.03240072618383 | 0.96567992861861 |
| 3 | 1.18496046971274 | 1.09912152374905 |
| 4 | ∞ | 1.27079941567643 |

TABLE 43

3 bits, 8 Antenna, Receiver combining based on serving cell

| Index i | Partition | Codebook |
|---|---|---|
| 0 | −∞ | |
| 1 | 0.808094245747202 | 0.761601868629187 |
| 2 | 0.892171308908252 | 0.854586622865216 |
| 3 | 0.965211596403550 | 0.929755994951288 |
| 4 | 1.036799783412310 | 1.000667197855810 |
| 5 | 1.112712174131610 | 1.072932368968800 |
| 6 | 1.200306807340700 | 1.152491979294420 |
| 7 | 1.317686343830520 | 1.248121635386980 |
| 8 | ∞ | 1.387251052274070 |

TABLE 44

4 bits, 8 Antenna, Receiver combining based on serving cell

| Index i | Partition | Codebook |
|---|---|---|
| 0 | −∞ | |
| 1 | 0.744700628971757 | 0.710914206910108 |
| 2 | 0.803582544126974 | 0.778487051033407 |
| 3 | 0.850260386704480 | 0.828678037220542 |
| 4 | 0.891271581270194 | 0.871842736188419 |
| 5 | 0.929627472856574 | 0.910700426351969 |
| 6 | 0.967184764205028 | 0.948554519361180 |
| 7 | 1.004561780835300 | 0.985815009048877 |
| 8 | 1.042567384462120 | 1.023308552621720 |
| 9 | 1.082180807752740 | 1.061826216302530 |
| 10 | 1.124591804937470 | 1.102535399202940 |
| 11 | 1.170882045990520 | 1.146648210672010 |
| 12 | 1.222077666693580 | 1.195115881309030 |
| 13 | 1.281709795672090 | 1.249039452078130 |
| 14 | 1.356933217743400 | 1.314380139266050 |
| 15 | 1.463514070146760 | 1.399486296220750 |
| 16 | ∞ | 1.527541844072760 |

TABLE 45

5 bits, 8 Antenna, Receiver combining based on serving cell

| Index i | Partition | Codebook |
|---|---|---|
| 0 | −∞ | |
| 1 | 0.694074073253549 | 0.667681678845737 |
| 2 | 0.739929997738929 | 0.720466467661361 |
| 3 | 0.775552763642212 | 0.759393527816498 |
| 4 | 0.805890602800526 | 0.791711999467927 |
| 5 | 0.832790358242753 | 0.820069206133126 |
| 6 | 0.857526137632507 | 0.845511510352379 |
| 7 | 0.880580721263425 | 0.869540764912635 |
| 8 | 0.901964348641808 | 0.891620677614214 |
| 9 | 0.922646853685798 | 0.912308019669402 |
| 10 | 0.943108055743024 | 0.932985687702195 |
| 11 | 0.963173284156215 | 0.953230423783854 |
| 12 | 0.983051819461621 | 0.973116144528577 |
| 13 | 1.003018817166040 | 0.992987494394666 |
| 14 | 1.023092678479630 | 1.013050139937420 |
| 15 | 1.043381721191690 | 1.033135217021830 |
| 16 | 1.063865705628160 | 1.053628225361540 |
| 17 | 1.084750981637480 | 1.074103185894780 |
| 18 | 1.106087917580460 | 1.095398777380180 |
| 19 | 1.127802793327870 | 1.116777057780740 |
| 20 | 1.150210996695840 | 1.138828528875000 |
| 21 | 1.173490826556200 | 1.161593464516680 |
| 22 | 1.198100571193800 | 1.185388188595730 |
| 23 | 1.223863019551330 | 1.210812953791880 |
| 24 | 1.251005443561060 | 1.236913085310780 |
| 25 | 1.280329181069560 | 1.265097801811330 |
| 26 | 1.312603467599730 | 1.295560560327790 |
| 27 | 1.348155901814340 | 1.329646374871660 |
| 28 | 1.389198604818690 | 1.366665428757020 |
| 29 | 1.438253824481850 | 1.411731780880360 |
| 30 | 1.501335426938960 | 1.464775868083340 |
| 31 | 1.588658670861300 | 1.537894985794570 |
| 32 | ∞ | 1.639422355928020 |

Table 46 through Table 60 below illustrate examples of different lookup tables 126 with the codebooks 544 and partitions 542 for indexes to obtain the quantized relative amplitude 130 when the user equipment (UE) 104 uses receiver combining based on the serving cell 302a channel and when the relative amplitude 122 is obtained using Equation (9) above. These tables may be obtained using a Lloyd-Max algorithm. A lookup table 126 used may also be selected based on the number of bits available and the number of transmit antenna ports used for downlink transmission to the user equipment (UE) 104.

TABLE 46

1 bit, 2 Antenna, Receiver combining based on serving cell

| Index i | Partition | Codebook |
|---|---|---|
| 0 | −∞ | |
| 1 | 1.08007596533138 | 0.918252960045954 |
| 2 | ∞ | 1.24189897061681 |

TABLE 47

2 bits, 2 Antenna, Receiver combining based on serving cell

| Index i | Partition | Codebook |
|---|---|---|
| 0 | −∞ | |
| 1 | 0.87238741808655 | 0.77345519117348 |
| 2 | 1.06049383616583 | 0.97131964499961 |
| 3 | 1.29638683978059 | 1.14966802733205 |
| 4 | ∞ | 1.44310565222912 |

TABLE 48

3 bits, 2 Antenna, Receiver combining based on serving cell

| Index i | Partition | Codebook |
|---|---|---|
| 0 | $-\infty$ | |
| 1 | 0.751493645681719 | 0.683831706765693 |
| 2 | 0.871320950277787 | 0.819155584597745 |
| 3 | 0.968422970282761 | 0.923486315957829 |
| 4 | 1.061529648459380 | 1.013359624607690 |
| 5 | 1.171836811511160 | 1.109699672311060 |
| 6 | 1.314598134456070 | 1.233973950711250 |
| 7 | 1.505863031120600 | 1.395222318200900 |
| 8 | $\infty$ | 1.616503744040300 |

TABLE 49

4 bits, 2 Antenna, Receiver combining based on serving cell

| Index i | Partition | Codebook |
|---|---|---|
| 0 | $-\infty$ | |
| 1 | 0.667931191700027 | 0.623971421058709 |
| 2 | 0.747991734179879 | 0.711890962341345 |
| 3 | 0.815699888419324 | 0.784092506018414 |
| 4 | 0.874030520670937 | 0.847307270820235 |
| 5 | 0.925009620050926 | 0.900753770521638 |
| 6 | 0.972093733659464 | 0.949265469580215 |
| 7 | 1.017625864531720 | 0.994921997738714 |
| 8 | 1.064680074015320 | 1.040329731324730 |
| 9 | 1.116700160740120 | 1.089030416705910 |
| 10 | 1.176326995734640 | 1.144369904774330 |
| 11 | 1.244235272243130 | 1.208284086694940 |
| 12 | 1.322475983569340 | 1.280186457791320 |
| 13 | 1.413807790360510 | 1.364765509347360 |
| 14 | 1.521760521579490 | 1.462850071373650 |
| 15 | 1.658992327921210 | 1.580670971785320 |
| 16 | $\infty$ | 1.737313684057090 |

TABLE 50

5 bits, 2 Antenna, Receiver combining based on serving cell

| Index i | Partition | Codebook |
|---|---|---|
| 0 | $-\infty$ | |
| 1 | 0.614134196887090 | 0.583794055139047 |
| 2 | 0.668758588886727 | 0.644474338635132 |
| 3 | 0.714934370755270 | 0.693042839138322 |
| 4 | 0.756625499207994 | 0.736825902372219 |
| 5 | 0.794487816893248 | 0.776425096043768 |
| 6 | 0.829305487717374 | 0.812550537742728 |
| 7 | 0.860847093834034 | 0.846060437692020 |
| 8 | 0.889463085058321 | 0.875633749976047 |
| 9 | 0.916498992190610 | 0.903292420140595 |
| 10 | 0.942332233741815 | 0.929705564240624 |
| 11 | 0.967342952654989 | 0.954958903243007 |
| 12 | 0.991674286303365 | 0.979727002066972 |
| 13 | 1.015599578159530 | 1.003621570539760 |
| 14 | 1.039772688305150 | 1.027577585779310 |
| 15 | 1.064358713472150 | 1.051967790830990 |
| 16 | 1.089904312647240 | 1.076749636113310 |
| 17 | 1.116924054203160 | 1.103058989181180 |
| 18 | 1.145832631657560 | 1.130789119225130 |
| 19 | 1.176988076397240 | 1.160876144089990 |
| 20 | 1.210579015011560 | 1.193100008704490 |
| 21 | 1.246009865656780 | 1.228058021318620 |
| 22 | 1.283035900976530 | 1.263961709994940 |
| 23 | 1.323080957724340 | 1.302110091958110 |
| 24 | 1.366479079691040 | 1.344051823490570 |
| 25 | 1.413002566825760 | 1.388906335891500 |
| 26 | 1.461980603737360 | 1.437098797760030 |
| 27 | 1.515538308157460 | 1.486862409714700 |
| 28 | 1.574983247744050 | 1.544214206600230 |
| 29 | 1.639523571899030 | 1.605752288887870 |
| 30 | 1.710627178748200 | 1.673294854910180 |

TABLE 50-continued

5 bits, 2 Antenna, Receiver combining based on serving cell

| Index i | Partition | Codebook |
|---|---|---|
| 31 | 1.798721192959750 | 1.747959502586220 |
| 32 | $\infty$ | 1.849482883333290 |

TABLE 51

1 bit, 4 Antenna, Receiver combining based on serving cell

| Index i | Partition | Codebook |
|---|---|---|
| 0 | $-\infty$ | |
| 1 | 1.07388377583985 | 0.875034040838070 |
| 2 | $\infty$ | 1.27273351084163 |

TABLE 52

2 bits, 4 Antenna, Receiver combining based on serving cell

| Index i | Partition | Codebook |
|---|---|---|
| 0 | $-\infty$ | |
| 1 | 0.86245479172125 | 0.75328491155490 |
| 2 | 1.08463957120290 | 0.97162467188761 |
| 3 | 1.35339808329960 | 1.19765447051819 |
| 4 | $\infty$ | 1.50914169608100 |

TABLE 53

3 bits, 4 Antenna, Receiver combining based on serving cell

| Index i | Partition | Codebook |
|---|---|---|
| 0 | $-\infty$ | |
| 1 | 0.731712183890334 | 0.662215275105251 |
| 2 | 0.860025435370142 | 0.801209092675417 |
| 3 | 0.976271904013975 | 0.918841778064868 |
| 4 | 1.094823029800000 | 1.033702029963080 |
| 5 | 1.225582855543080 | 1.155944029636920 |
| 6 | 1.383249025788010 | 1.295221681449240 |
| 7 | 1.605299770760850 | 1.471276370126780 |
| 8 | $\infty$ | 1.739323171394930 |

TABLE 54

4 bits, 4 Antenna, Receiver combining based on serving cell

| Index i | Partition | Codebook |
|---|---|---|
| 0 | $-\infty$ | |
| 1 | 0.631804723262803 | 0.584402822674933 |
| 2 | 0.715930179054050 | 0.679206623850673 |
| 3 | 0.785702919538252 | 0.752653734257426 |
| 4 | 0.849553386597566 | 0.818752104819078 |
| 5 | 0.910281284534281 | 0.880354668376054 |
| 6 | 0.970037131021188 | 0.940207900692508 |
| 7 | 1.030677954968350 | 0.999866361349867 |
| 8 | 1.093105059364320 | 1.061489548586840 |
| 9 | 1.158125558871710 | 1.124720570141790 |
| 10 | 1.228044672002060 | 1.191530547601630 |
| 11 | 1.306328267023840 | 1.264558796402500 |
| 12 | 1.395210346188270 | 1.348097737645180 |
| 13 | 1.499096898818460 | 1.442322954731360 |
| 14 | 1.631625573972300 | 1.555870842905560 |
| 15 | 1.817943775374150 | 1.707380705039050 |
| 16 | $\infty$ | 1.928506845709250 |

TABLE 55

5 bits, 4 Antenna, Receiver combining based on serving cell

| Index i | Partition | Codebook |
|---|---|---|
| 0 | −∞ | |
| 1 | 0.571316151051761 | 0.535936924398964 |
| 2 | 0.634158905436934 | 0.606695377704558 |
| 3 | 0.684500832436437 | 0.661622433169309 |
| 4 | 0.728033051263684 | 0.707379231703564 |
| 5 | 0.767897540099749 | 0.748686870823804 |
| 6 | 0.804790034145574 | 0.787108209375695 |
| 7 | 0.839826691187611 | 0.822471858915454 |
| 8 | 0.873635984596875 | 0.857181523459769 |
| 9 | 0.906130063217553 | 0.890090445733981 |
| 10 | 0.938374694980887 | 0.922169680701125 |
| 11 | 0.970735183661473 | 0.954579709260650 |
| 12 | 1.003088230839170 | 0.986890658062295 |
| 13 | 1.035551393598550 | 1.019285803616040 |
| 14 | 1.068242602043280 | 1.051816983581050 |
| 15 | 1.101401000602350 | 1.084668220505500 |
| 16 | 1.134878963173790 | 1.118133780699200 |
| 17 | 1.169276874680670 | 1.151624145648370 |
| 18 | 1.205292748975430 | 1.186929603712960 |
| 19 | 1.242791378858730 | 1.223655894237890 |
| 20 | 1.282255312825300 | 1.261926863479570 |
| 21 | 1.323297171059560 | 1.302580162171040 |
| 22 | 1.365532040475150 | 1.344014179948090 |
| 23 | 1.410141196787170 | 1.387049901002210 |
| 24 | 1.458504174530870 | 1.433232492572140 |
| 25 | 1.511998298688460 | 1.483775856489590 |
| 26 | 1.573571150830230 | 1.540220740887330 |
| 27 | 1.643875686505170 | 1.606921560773130 |
| 28 | 1.723639932602550 | 1.680829812237200 |
| 29 | 1.815088042708380 | 1.766450052967900 |
| 30 | 1.931381534562240 | 1.863726032448850 |
| 31 | 2.080593009690010 | 1.999037036675630 |
| 32 | ∞ | 2.162148982704390 |

TABLE 56

1 bit, 8 Antenna, Receiver combining based on serving cell

| Index i | Partition | Codebook |
|---|---|---|
| 0 | −∞ | |
| 1 | 1.11979082122579 | 0.864321360765301 |
| 2 | ∞ | 1.37526028168628 |

TABLE 57

2 bits, 8 Antenna, Receiver combining based on serving cell

| Index i | Partition | Codebook |
|---|---|---|
| 0 | −∞ | |
| 1 | 0.85921336681756 | 0.72333832515101 |
| 2 | 1.14174240671918 | 0.99508840848411 |
| 3 | 1.49591726941290 | 1.28839640495426 |
| 4 | ∞ | 1.70343813387154 |

TABLE 58

3 bits, 8 Antenna, Receiver combining based on serving cell

| Index i | Partition | Codebook |
|---|---|---|
| 0 | −∞ | |
| 1 | 0.699709209529083 | 0.615984160803556 |
| 2 | 0.856874034948462 | 0.783434258254611 |
| 3 | 1.004491654060330 | 0.930313811642313 |
| 4 | 1.159948632752550 | 1.078669496478360 |
| 5 | 1.337011454126200 | 1.241227769026750 |
| 6 | 1.554286618028660 | 1.432795139225650 |

TABLE 58-continued 3 bits, 8 Antenna, Receiver combining based on serving cell

| Index i | Partition | Codebook |
|---|---|---|
| 7 | 1.865901940755720 | 1.675778096831670 |
| 8 | ∞ | 2.056025784679770 |

TABLE 59

4 bits, 8 Antenna, Receiver combining based on serving cell

| Index i | Partition | Codebook |
|---|---|---|
| 0 | −∞ | |
| 1 | 0.586726111541603 | 0.530503287702621 |
| 2 | 0.687586555820509 | 0.642948935380585 |
| 3 | 0.772190856232376 | 0.732224176260434 |
| 4 | 0.850426616038301 | 0.812157536204318 |
| 5 | 0.926061237271152 | 0.888695695872284 |
| 6 | 1.001456356215450 | 0.963426778670020 |
| 7 | 1.079162618599590 | 1.039485933760880 |
| 8 | 1.161114669285050 | 1.118839303438290 |
| 9 | 1.248809857576140 | 1.203390035131820 |
| 10 | 1.344018078656680 | 1.294229680020460 |
| 11 | 1.450624819071510 | 1.393806477292910 |
| 12 | 1.575299989316300 | 1.507443160850110 |
| 13 | 1.728342849946660 | 1.643156817782480 |
| 14 | 1.931652115988140 | 1.813528882110840 |
| 15 | 2.248237932289080 | 2.049775349865440 |
| 16 | ∞ | 2.446700514712730 |

TABLE 60

5 bits, 8 Antenna, Receiver combining based on serving cell

| Index i | Partition | Codebook |
|---|---|---|
| 0 | −∞ | |
| 1 | 0.514807191472649 | 0.474012693264556 |
| 2 | 0.587657153884736 | 0.555601689680742 |
| 3 | 0.647331576493441 | 0.619712618088730 |
| 4 | 0.699712645349905 | 0.674950534898152 |
| 5 | 0.748204085341074 | 0.724474755801658 |
| 6 | 0.794806882348858 | 0.771933414880490 |
| 7 | 0.840315627623449 | 0.817680349817227 |
| 8 | 0.884834222697897 | 0.862950905429671 |
| 9 | 0.928041335827343 | 0.906717539966122 |
| 10 | 0.970693503629939 | 0.949365131688563 |
| 11 | 1.013444013281540 | 0.992021875571314 |
| 12 | 1.056651283024330 | 1.034866150991770 |
| 13 | 1.100108687801400 | 1.078170415056890 |
| 14 | 1.144377743419250 | 1.122046960545900 |
| 15 | 1.189243426116440 | 1.166708526292600 |
| 16 | 1.235131878260700 | 1.211778325940270 |
| 17 | 1.282817088095530 | 1.258485430581120 |
| 18 | 1.332411130587870 | 1.307148745609940 |
| 19 | 1.383775629743620 | 1.357673515565800 |
| 20 | 1.437659168523190 | 1.409877743921440 |
| 21 | 1.493696826304810 | 1.465440593124930 |
| 22 | 1.552455946114560 | 1.521953059484690 |
| 23 | 1.616239701854000 | 1.582958832744440 |
| 24 | 1.685802206647560 | 1.649520570963560 |
| 25 | 1.761023665753510 | 1.722083842331560 |
| 26 | 1.842292633996660 | 1.799963489175470 |
| 27 | 1.933501034109750 | 1.884621778817850 |
| 28 | 2.038414386078490 | 1.982380289401650 |
| 29 | 2.164420845066040 | 2.094448482755330 |
| 30 | 2.336665034855730 | 2.234439207376750 |
| 31 | 2.582736999731490 | 2.438936862334710 |
| 32 | ∞ | 2.726537137128270 |

Table 61 through Table 75 below illustrate examples of different lookup tables 126 with the codebooks 544 and partitions 542 for indexes to obtain the quantized relative amplitude 130 when the user equipment (UE) 104 uses receiver combining based on the serving cell 302a channel and when the relative amplitude 122 is obtained using Equation (10) above. These tables may be obtained using a Lloyd-Max algorithm. A lookup table 126 used may also be selected based on the number of bits available and the number of transmit antenna ports used for downlink transmission to the user equipment (UE) 104.

TABLE 61

1 bit, 2 Antenna,
Receiver combining based on serving cell

| Index i | Partition | Codebook |
|---|---|---|
| 0 | −∞ | |
| 1 | 0.910882952718996 | 0.859532734116159 |
| 2 | ∞ | 0.962233171321834 |

TABLE 62

2 bits, 2 Antenna,
Receiver combining based on serving cell

| Index i | Partition | Codebook |
|---|---|---|
| 0 | −∞ | |
| 1 | 0.84600276807731 | 0.81070982893873 |
| 2 | 0.90874824616286 | 0.88129570721589 |
| 3 | 0.95812733711676 | 0.93620078510983 |
| 4 | ∞ | 0.98005388912369 |

TABLE 63

3 bits, 2 Antenna,
Receiver combining based on serving cell

| Index i | Partition | Codebook |
|---|---|---|
| 0 | −∞ | |
| 1 | 0.799485542298702 | 0.776394640314872 |
| 2 | 0.840854705618416 | 0.822576444282531 |
| 3 | 0.875064587742674 | 0.859132966954301 |
| 4 | 0.905452117289007 | 0.890996208531048 |
| 5 | 0.932552447021499 | 0.919908026046966 |
| 6 | 0.956680134707127 | 0.945196867996031 |
| 7 | 0.978918974521607 | 0.968163401418223 |
| 8 | ∞ | 0.989674547624991 |

TABLE 64

4 bits, 2 Antenna,
Receiver combining based on serving cell

| Index i | Partition | Codebook |
|---|---|---|
| 0 | −∞ | |
| 1 | 0.771040142030284 | 0.755159997358656 |
| 2 | 0.798891431713188 | 0.786920286701912 |
| 3 | 0.821082748328619 | 0.810862576724464 |
| 4 | 0.840722230627168 | 0.831302919932773 |
| 5 | 0.858554005197890 | 0.850141541321563 |
| 6 | 0.874886315536419 | 0.866966469074216 |
| 7 | 0.890227539240101 | 0.882806161998621 |
| 8 | 0.904875907257632 | 0.897648916481580 |
| 9 | 0.918902269451455 | 0.912102898033684 |
| 10 | 0.932111414463694 | 0.925701640869226 |
| 11 | 0.944556373949228 | 0.938521188058162 |
| 12 | 0.956389147608227 | 0.950591559840294 |
| 13 | 0.967700431573237 | 0.962186735376160 |
| 14 | 0.978619868450008 | 0.973214127770313 |
| 15 | 0.989363738828431 | 0.984025609129703 |
| 16 | ∞ | 0.994701868527159 |

TABLE 65

5 bits, 2 Antenna,
Receiver combining based on serving cell

| Index i | Partition | Codebook |
|---|---|---|
| 0 | −∞ | |
| 1 | 0.742898197301845 | 0.734246966596869 |
| 2 | 0.758376552607523 | 0.751549428006821 |
| 3 | 0.771494877838914 | 0.765203677208224 |
| 4 | 0.783536241496634 | 0.777786078469605 |
| 5 | 0.794813684722666 | 0.789286404523663 |
| 6 | 0.805600050792531 | 0.800340964921669 |
| 7 | 0.815930984826257 | 0.810859136663393 |
| 8 | 0.825861987766954 | 0.821002832989121 |
| 9 | 0.835280149095836 | 0.830721142544787 |
| 10 | 0.844233584415922 | 0.839839155646886 |
| 11 | 0.852819247956531 | 0.848628013184958 |
| 12 | 0.861239824030668 | 0.857010482728103 |
| 13 | 0.869584210454234 | 0.865469165333232 |
| 14 | 0.877622877934863 | 0.873699255575237 |
| 15 | 0.885400241828859 | 0.881546500294490 |
| 16 | 0.893032349762869 | 0.889253983363229 |
| 17 | 0.900559549549305 | 0.896810716162509 |
| 18 | 0.907928840238891 | 0.904308382936101 |
| 19 | 0.914977428381356 | 0.911549297541682 |
| 20 | 0.921825217006019 | 0.918405559221031 |
| 21 | 0.928745443795352 | 0.925244874791007 |
| 22 | 0.935719490923103 | 0.932246012799698 |
| 23 | 0.942588446344383 | 0.939192969046508 |
| 24 | 0.949312705480672 | 0.945983923642259 |
| 25 | 0.955923982237407 | 0.952641487319085 |
| 26 | 0.962440141999221 | 0.959206477155730 |
| 27 | 0.968831127656591 | 0.965673806842713 |
| 28 | 0.975135442881324 | 0.971988448470469 |
| 29 | 0.981421461466127 | 0.978282437292179 |
| 30 | 0.987692306174714 | 0.984560485640074 |
| 31 | 0.993869313678577 | 0.990824126709354 |
| 32 | ∞ | 0.996914500647801 |

TABLE 66

1 bit, 4 Antenna,
Receiver combining based on serving cell

| Index i | Partition | Codebook |
|---|---|---|
| 0 | −∞ | |
| 1 | 0.898449778247095 | 0.845337602682869 |
| 2 | ∞ | 0.951561953811322 |

TABLE 67

2 bits, 4 Antenna,
Receiver combining based on serving cell

| Index i | Partition | Codebook |
|---|---|---|
| 0 | −∞ | |
| 1 | 0.82688439025877 | 0.79056769560321 |
| 2 | 0.89211665553653 | 0.86320108491433 |
| 3 | 0.94749198165649 | 0.92103222615873 |
| 4 | ∞ | 0.97395173715426 |

TABLE 68

3 bits, 4 Antenna,
Receiver combining based on serving cell

| Index i | Partition | Codebook |
|---|---|---|
| 0 | −∞ | |
| 1 | 0.775542849899057 | 0.748584995875921 |
| 2 | 0.821860857740559 | 0.802500703922194 |

TABLE 68-continued 3 bits, 4 Antenna,
Receiver combining based on serving cell

| Index i | Partition | Codebook |
|---|---|---|
| 3 | 0.857562999948601 | 0.841221011558923 |
| 4 | 0.888869333055005 | 0.873904988338279 |
| 5 | 0.918005382846941 | 0.903833677771730 |
| 6 | 0.945869234105357 | 0.932177087922152 |
| 7 | 0.973055458174059 | 0.959561380288562 |
| 8 | ∞ | 0.986549536059556 |

TABLE 69

4 bits, 4 Antenna,
Receiver combining based on serving cell

| Index i | Partition | Codebook |
|---|---|---|
| 0 | −∞ | |
| 1 | 0.728347088134995 | 0.706898806318079 |
| 2 | 0.764793490492618 | 0.749795369951911 |
| 3 | 0.792138488315503 | 0.779791611033325 |
| 4 | 0.814786152915184 | 0.804485365597681 |
| 5 | 0.834455513019511 | 0.825086940232687 |
| 6 | 0.852408770614653 | 0.843824085806335 |
| 7 | 0.869204409584167 | 0.860993455422971 |
| 8 | 0.885439966028775 | 0.877415363745363 |
| 9 | 0.901024678611717 | 0.893464568312188 |
| 10 | 0.915798557559933 | 0.908584788911246 |
| 11 | 0.930103381316124 | 0.923012326208621 |
| 12 | 0.944170388338523 | 0.937194436423627 |
| 13 | 0.957983675486668 | 0.951146340253419 |
| 14 | 0.971819978509078 | 0.964821010719918 |
| 15 | 0.985874976236414 | 0.978818946298238 |
| 16 | ∞ | 0.992931006174590 |

TABLE 70

5 bits, 4 Antenna,
Receiver combining based on serving cell

| Index i | Partition | Codebook |
|---|---|---|
| 0 | −∞ | |
| 1 | 0.691587227603903 | 0.677243485315308 |
| 2 | 0.711084355896521 | 0.705930969892498 |
| 3 | 0.736474736051005 | 0.728237741900543 |
| 4 | 0.751842689626700 | 0.744711730201467 |
| 5 | 0.765476766159824 | 0.758973649051933 |
| 6 | 0.778204200651843 | 0.771979883267715 |
| 7 | 0.790363945913184 | 0.784428518035971 |
| 8 | 0.801827094050558 | 0.796299373790397 |
| 9 | 0.812454107126777 | 0.807354814310720 |
| 10 | 0.822448334499675 | 0.817553399942834 |
| 11 | 0.832084413415178 | 0.827343269056515 |
| 12 | 0.841426371971520 | 0.836825557773840 |
| 13 | 0.850394724443182 | 0.846027186169200 |
| 14 | 0.859030000598558 | 0.854762258717164 |
| 15 | 0.867496570967530 | 0.863297742479952 |
| 16 | 0.875814657425633 | 0.871695399455107 |
| 17 | 0.884004204678409 | 0.879933915396159 |
| 18 | 0.892079176449069 | 0.888074493960660 |
| 19 | 0.900036792023230 | 0.896083858937479 |
| 20 | 0.907995990914907 | 0.903989725108982 |
| 21 | 0.915905750505549 | 0.912002256720832 |
| 22 | 0.923573627714785 | 0.919809262290266 |
| 23 | 0.931157537965428 | 0.927337993139304 |
| 24 | 0.938862158535301 | 0.934977082791552 |
| 25 | 0.946619522042190 | 0.942747234279050 |
| 26 | 0.954348574095755 | 0.950491809805330 |
| 27 | 0.962042213480678 | 0.958205538386180 |
| 28 | 0.969729471928998 | 0.965879088575177 |
| 29 | 0.977401393434900 | 0.973579855282820 |
| 30 | 0.984986121605442 | 0.981222931586981 |

TABLE 70-continued 5 bits, 4 Antenna,
Receiver combining based on serving cell

| Index i | Partition | Codebook |
|---|---|---|
| 31 | 0.992476426058411 | 0.988749311623902 |
| 32 | ∞ | 0.996203540492919 |

TABLE 71

1 bit, 8 Antenna,
Receiver combining based on serving cell

| Index i | Partition | Codebook |
|---|---|---|
| 0 | −∞ | |
| 1 | 0.877887833408201 | 0.814306792643152 |
| 2 | ∞ | 0.941468874173249 |

TABLE 72

2 bits, 8 Antenna,
Receiver combining based on serving cell

| Index i | Partition | Codebook |
|---|---|---|
| 0 | −∞ | |
| 1 | 0.79253442183098 | 0.74949751740546 |
| 2 | 0.87011964921897 | 0.83557132625650 |
| 3 | 0.93649347703566 | 0.90466797218144 |
| 4 | ∞ | 0.96831898188989 |

TABLE 73

3 bits, 8 Antenna,
Receiver combining based on serving cell

| Index i | Partition | Codebook |
|---|---|---|
| 0 | −∞ | |
| 1 | 0.728938188081470 | 0.697426614448104 |
| 2 | 0.783695892481512 | 0.760449761714835 |
| 3 | 0.826535631795173 | 0.806942023248190 |
| 4 | 0.864145442751343 | 0.846129240342156 |
| 5 | 0.899200214685086 | 0.882161645160530 |
| 6 | 0.933018863757531 | 0.916238784209642 |
| 7 | 0.966477728944514 | 0.949798943305420 |
| 8 | ∞ | 0.983156514583608 |

TABLE 74

4 bits, 8 Antenna,
Receiver combining based on serving cell

| Index i | Partition | Codebook |
|---|---|---|
| 0 | −∞ | |
| 1 | 0.677781062265837 | 0.652183452744698 |
| 2 | 0.721245109757055 | 0.703378671786976 |
| 3 | 0.753514119788768 | 0.739111547727134 |
| 4 | 0.780188954428893 | 0.767916691850402 |
| 5 | 0.803572348405133 | 0.792461217007384 |
| 6 | 0.824761508804440 | 0.814683479802882 |
| 7 | 0.844523327481154 | 0.834839537805998 |
| 8 | 0.863574700697779 | 0.854207117156310 |
| 9 | 0.881838469842576 | 0.872942284239249 |
| 10 | 0.899322036764909 | 0.890734655445903 |
| 11 | 0.916430259030453 | 0.907909048083915 |
| 12 | 0.933322221598683 | 0.924951099976991 |
| 13 | 0.949991477584756 | 0.941693343220375 |
| 14 | 0.966601953268832 | 0.958289611949137 |

TABLE 74-continued 4 bits, 8 Antenna,
Receiver combining based on serving cell

| Index i | Partition | Codebook |
|---|---|---|
| 15 | 0.983246571929541 | 0.974914294588528 |
| 16 | ∞ | 0.991578849270554 |

TABLE 75

5 bits, 8 Antenna,
Receiver combining based on serving cell

| Index i | Partition | Codebook |
|---|---|---|
| 0 | −∞ | |
| 1 | 0.628546358598496 | 0.612272279995681 |
| 2 | 0.657608113086868 | 0.644820437201312 |
| 3 | 0.680710801399536 | 0.670395788972425 |
| 4 | 0.699824746979935 | 0.691025813826647 |
| 5 | 0.716616439499631 | 0.708623680133222 |
| 6 | 0.732052217572811 | 0.724609198866041 |
| 7 | 0.745881649605453 | 0.739495236279581 |
| 8 | 0.758479070973375 | 0.752268062931324 |
| 9 | 0.770563259360905 | 0.764690079015425 |
| 10 | 0.782094402428660 | 0.776436439706385 |
| 11 | 0.793249514342392 | 0.787752365150935 |
| 12 | 0.804132177092423 | 0.798746663533850 |
| 13 | 0.814688716310071 | 0.809517690650996 |
| 14 | 0.824882331183570 | 0.819859741969146 |
| 15 | 0.834895455368310 | 0.829904920397994 |
| 16 | 0.844819204506152 | 0.839885990338627 |
| 17 | 0.854674467869719 | 0.849752418673678 |
| 18 | 0.864530677527431 | 0.859596517065760 |
| 19 | 0.874290596859903 | 0.869464837989103 |
| 20 | 0.884083819500636 | 0.879116355730704 |
| 21 | 0.894046138656560 | 0.889051283270569 |
| 22 | 0.903908538608975 | 0.899040994042552 |
| 23 | 0.913583286822620 | 0.908740713175398 |
| 24 | 0.923268452894211 | 0.918425860469843 |
| 25 | 0.932934710385937 | 0.928111045318579 |
| 26 | 0.942610215936525 | 0.937758375453295 |
| 27 | 0.952383537721551 | 0.947462056419755 |
| 28 | 0.962171053381839 | 0.957305019023348 |
| 29 | 0.971737511040443 | 0.967037087740330 |
| 30 | 0.981127106030353 | 0.976437934340557 |
| 31 | 0.990545893221839 | 0.985816277720148 |
| 32 | ∞ | 0.995275508723529 |

Table 76 through Table 90 below illustrate examples of different lookup tables 126 with the codebooks 544 and partitions 542 for indexes to obtain the quantized relative amplitude 130 when the user equipment (UE) 104 uses receiver combining based on the serving cell 302a channel and when the relative amplitude 122 is obtained using Equation (11) above. These tables may be obtained using a Lloyd-Max algorithm. A lookup table 126 used may also be selected based on the number of bits available and the number of transmit antenna ports used for downlink transmission to the user equipment (UE) 104.

TABLE 76

1 bit, 2 Antenna, Receiver combining based on serving cell

| Index i | Partition | Codebook |
|---|---|---|
| 0 | −∞ | |
| 1 | 0.837579008056389 | 0.746104352206102 |
| 2 | ∞ | 0.929053663906676 |

TABLE 77

2 bits, 2 Antenna, Receiver combining based on serving cell

| Index i | Partition | Codebook |
|---|---|---|
| 0 | −∞ | |
| 1 | 0.72466724776087 | 0.66437960962355 |
| 2 | 0.83365210536142 | 0.78495488589820 |
| 3 | 0.92253641044720 | 0.88234932482463 |
| 4 | ∞ | 0.96272349606978 |

TABLE 78

3 bits, 2 Antenna, Receiver combining based on serving cell

| Index i | Partition | Codebook |
|---|---|---|
| 0 | −∞ | |
| 1 | 0.647282445866516 | 0.608979783775614 |
| 2 | 0.716993793804108 | 0.685585107957418 |
| 3 | 0.775998669476035 | 0.748402479650798 |
| 4 | 0.828994754692716 | 0.803594859301272 |
| 5 | 0.876951744393903 | 0.854394650084160 |
| 6 | 0.920334930708810 | 0.899508838703645 |
| 7 | 0.960963974805634 | 0.941161022713975 |
| 8 | ∞ | 0.980766926897294 |

TABLE 79

4 bits, 2 Antenna, Receiver combining based on serving cell

| Index i | Partition | Codebook |
|---|---|---|
| 0 | −∞ | |
| 1 | 0.596911957192272 | 0.571579445329512 |
| 2 | 0.642381181403504 | 0.622244469055031 |
| 3 | 0.679676840876851 | 0.662517893751976 |
| 4 | 0.712658719716776 | 0.696835788001727 |
| 5 | 0.743131670764928 | 0.728481651431825 |
| 6 | 0.771527946334694 | 0.757781690098030 |
| 7 | 0.798523756297315 | 0.785274202571358 |
| 8 | 0.824621979565925 | 0.811773310023272 |
| 9 | 0.849468182418744 | 0.837470649108579 |
| 10 | 0.873047060900466 | 0.861465715728909 |
| 11 | 0.895642743210579 | 0.884628406072022 |
| 12 | 0.917350872100151 | 0.906657080349135 |
| 13 | 0.938331276177927 | 0.928044663851167 |
| 14 | 0.958861826139653 | 0.948617888504688 |
| 15 | 0.979395998315738 | 0.969105763774618 |
| 16 | ∞ | 0.989686232856859 |

TABLE 80

5 bits, 2 Antenna, Receiver combining based on serving cell

| Index i | Partition | Codebook |
|---|---|---|
| 0 | −∞ | |
| 1 | 0.552230649404391 | 0.539393199857583 |
| 2 | 0.575381390658063 | 0.565068098951199 |
| 3 | 0.595496368874256 | 0.585694682364927 |
| 4 | 0.614362360366303 | 0.605298055383585 |
| 5 | 0.632345775978398 | 0.623426665349020 |
| 6 | 0.649887889109715 | 0.641264886607776 |
| 7 | 0.666770452293360 | 0.658510891611653 |
| 8 | 0.683119585617409 | 0.675030012975067 |
| 9 | 0.699026202040922 | 0.691209158259750 |
| 10 | 0.714423302078016 | 0.706843245822095 |
| 11 | 0.729163877990587 | 0.722003358333937 |
| 12 | 0.743552359739343 | 0.736324397647237 |
| 13 | 0.757821098224675 | 0.750780321831449 |
| 14 | 0.771536866697438 | 0.764861874617900 |
| 15 | 0.784882283327993 | 0.778211858776975 |
| 16 | 0.798343541200530 | 0.791552707879012 |

TABLE 80-continued 5 bits, 2 Antenna, Receiver combining based on serving cell

| Index i | Partition | Codebook |
|---|---|---|
| 17 | 0.811988494226075 | 0.805134374522049 |
| 18 | 0.825595916912597 | 0.818842613930101 |
| 19 | 0.838753597717265 | 0.832349219895092 |
| 20 | 0.851377460274494 | 0.845157975539437 |
| 21 | 0.863925136404883 | 0.857596945009550 |
| 22 | 0.876548419560836 | 0.870253327800215 |
| 23 | 0.889105856235406 | 0.882843511321456 |
| 24 | 0.901615601541248 | 0.895368201149355 |
| 25 | 0.914115285661236 | 0.907863001933141 |
| 26 | 0.926599236404748 | 0.920367569389330 |
| 27 | 0.938967455546280 | 0.932830903420165 |
| 28 | 0.951193068634874 | 0.945104007672395 |
| 29 | 0.963386452026471 | 0.957282129597352 |
| 30 | 0.975661556608307 | 0.969490774455591 |
| 31 | 0.987856598567516 | 0.981832338761023 |
| 32 | ∞ | 0.993880858374009 |

TABLE 81

1 bit, 4 Antenna, Receiver combining based on serving cell

| Index i | Partition | Codebook |
|---|---|---|
| 0 | −∞ | |
| 1 | 0.816910080155528 | 0.723185903563695 |
| 2 | ∞ | 0.910634256747361 |

TABLE 82

2 bits, 4 Antenna, Receiver combining based on serving cell

| Index i | Partition | Codebook |
|---|---|---|
| 0 | −∞ | |
| 1 | 0.69661789801729 | 0.63571511203656 |
| 2 | 0.80777494692103 | 0.75752068399802 |
| 3 | 0.90526661872645 | 0.85802920984403 |
| 4 | ∞ | 0.95250402760887 |

TABLE 83

3 bits, 4 Antenna, Receiver combining based on serving cell

| Index i | Partition | Codebook |
|---|---|---|
| 0 | −∞ | |
| 1 | 0.611501781128001 | 0.568534843504149 |
| 2 | 0.687007923808838 | 0.654468718751854 |
| 3 | 0.748027591414935 | 0.719547128865821 |
| 4 | 0.802470852969039 | 0.776508053964049 |
| 5 | 0.853337962606895 | 0.828433651974028 |
| 6 | 0.902631472053072 | 0.878242273239762 |
| 7 | 0.951330891817028 | 0.927020670866383 |
| 8 | ∞ | 0.975641112767673 |

TABLE 84

4 bits, 4 Antenna, Receiver combining based on serving cell

| Index i | Partition | Codebook |
|---|---|---|
| 0 | −∞ | |
| 1 | 0.540760887875699 | 0.509636174953516 |
| 2 | 0.595047715668525 | 0.571885600797883 |
| 3 | 0.637815061512448 | 0.618209830539168 |
| 4 | 0.674529390475358 | 0.657420292485728 |
| 5 | 0.707290291860836 | 0.691638488464989 |

TABLE 84-continued 4 bits, 4 Antenna, Receiver combining based on serving cell

| Index i | Partition | Codebook |
|---|---|---|
| 6 | 0.737658697010961 | 0.722942095256683 |
| 7 | 0.766352982433612 | 0.752375298765239 |
| 8 | 0.793665509773602 | 0.780330666101986 |
| 9 | 0.820211162239798 | 0.807000353445218 |
| 10 | 0.846450872034455 | 0.833421971034378 |
| 11 | 0.872389413994268 | 0.859479773034533 |
| 12 | 0.898135209656856 | 0.885299054954003 |
| 13 | 0.923553032686937 | 0.910971364359708 |
| 14 | 0.948814538009174 | 0.936134701014167 |
| 15 | 0.974293357867878 | 0.961494375004182 |
| 16 | ∞ | 0.987092340731575 |

TABLE 85

5 bits, 4 Antenna, Receiver combining based on serving cell

| Index i | Partition | Codebook |
|---|---|---|
| 0 | −∞ | |
| 1 | 0.480253379190867 | 0.458843792506815 |
| 2 | 0.519843814772151 | 0.501662965874919 |
| 3 | 0.551612811945561 | 0.538024663669383 |
| 4 | 0.577544638951018 | 0.565200960221738 |
| 5 | 0.601081368043615 | 0.589888317680297 |
| 6 | 0.622182191529502 | 0.612274418406932 |
| 7 | 0.641230862122495 | 0.632089964652072 |
| 8 | 0.658853986732527 | 0.650371759592918 |
| 9 | 0.675517423191837 | 0.667336213872137 |
| 10 | 0.691595430345938 | 0.683698632511538 |
| 11 | 0.707285857146831 | 0.699492228180339 |
| 12 | 0.722495488843333 | 0.715079486113322 |
| 13 | 0.737199729312784 | 0.729911491573343 |
| 14 | 0.751641288378075 | 0.744487967052225 |
| 15 | 0.765650051186299 | 0.758794609703924 |
| 16 | 0.779247131669417 | 0.772505492668674 |
| 17 | 0.792634904998885 | 0.785988770670161 |
| 18 | 0.805886567518617 | 0.799281039327608 |
| 19 | 0.819315717255169 | 0.812492095709626 |
| 20 | 0.832728244343108 | 0.826139338800712 |
| 21 | 0.846080405529104 | 0.839317149885504 |
| 22 | 0.859726457203036 | 0.852843661172704 |
| 23 | 0.873318819770486 | 0.866609253233368 |
| 24 | 0.886875754509384 | 0.880028386307604 |
| 25 | 0.900737562303043 | 0.893723122711164 |
| 26 | 0.914714395224996 | 0.907752001894922 |
| 27 | 0.928651861873495 | 0.921676788555069 |
| 28 | 0.942694846189006 | 0.935626935191921 |
| 29 | 0.956935622462159 | 0.949762757186092 |
| 30 | 0.971281435229908 | 0.964108487738227 |
| 31 | 0.985586295017201 | 0.978454382721589 |
| 32 | ∞ | 0.992718207312813 |

TABLE 86

1 bit, 8 Antenna, Receiver combining based on serving cell

| Index i | Partition | Codebook |
|---|---|---|
| 0 | −∞ | |
| 1 | 0.783833409638012 | 0.674277687729816 |
| 2 | ∞ | 0.893389131546208 |

TABLE 87

2 bits, 8 Antenna, Receiver combining based on serving cell

| Index i | Partition | Codebook |
|---|---|---|
| 0 | −∞ | |
| 1 | 0.64624506058056 | 0.57683369101707 |

TABLE 87-continued 2 bits, 8 Antenna, Receiver combining based on serving cell

| Index i | Partition | Codebook |
|---|---|---|
| 2 | 0.77410830743532 | 0.71565643014405 |
| 3 | 0.88804456109885 | 0.83256018472658 |
| 4 | ∞ | 0.94352893747111 |

TABLE 88

3 bits, 8 Antenna, Receiver combining based on serving cell

| Index i | Partition | Codebook |
|---|---|---|
| 0 | −∞ | |
| 1 | 0.550951397582008 | 0.502768720466758 |
| 2 | 0.636418214242270 | 0.599134074697258 |
| 3 | 0.706511514263609 | 0.673702353787282 |
| 4 | 0.769509684945635 | 0.739320674739936 |
| 5 | 0.828467560191892 | 0.799698695151334 |
| 6 | 0.885518668068452 | 0.857236425232450 |
| 7 | 0.942315968098412 | 0.913800910904454 |
| 8 | ∞ | 0.970831025292370 |

TABLE 89

4 bits, 8 Antenna, Receiver combining based on serving cell

| Index i | Partition | Codebook |
|---|---|---|
| 0 | −∞ | |
| 1 | 0.470833754468603 | 0.435904795692222 |
| 2 | 0.531602088924984 | 0.505762713244985 |
| 3 | 0.579489085689229 | 0.557441464604982 |
| 4 | 0.621083489463361 | 0.601536706773475 |
| 5 | 0.658692804573490 | 0.640630272153248 |
| 6 | 0.693782355978444 | 0.676755336993733 |
| 7 | 0.727035784785935 | 0.710809374963154 |
| 8 | 0.758989599228601 | 0.743262194608716 |
| 9 | 0.790358799277079 | 0.774717003848485 |
| 10 | 0.821014985748946 | 0.806000594705672 |
| 11 | 0.851059769017883 | 0.836029376792221 |
| 12 | 0.880715618566849 | 0.866090161243545 |
| 13 | 0.910057328435740 | 0.895341075890153 |
| 14 | 0.939736192230557 | 0.924773580981327 |
| 15 | 0.969722611396496 | 0.954698803479786 |
| 16 | ∞ | 0.984746419313206 |

TABLE 90

5 bits, 8 Antenna, Receiver combining based on serving cell

| Index i | Partition | Codebook |
|---|---|---|
| 0 | −∞ | |
| 1 | 0.410488843262584 | 0.386304816748309 |
| 2 | 0.452159072026961 | 0.434672869776859 |
| 3 | 0.483472094339273 | 0.469645274277063 |
| 4 | 0.509971140647501 | 0.497298914401484 |
| 5 | 0.534492925125300 | 0.522643366893518 |
| 6 | 0.556490384031419 | 0.546342483357081 |
| 7 | 0.576504505328810 | 0.566638284705758 |
| 8 | 0.595731813280609 | 0.586370725951862 |
| 9 | 0.614269216331408 | 0.605092900609356 |
| 10 | 0.632236304687372 | 0.623445532053459 |
| 11 | 0.649571322604011 | 0.641027077321285 |
| 12 | 0.666413129698365 | 0.658115567886737 |
| 13 | 0.682912417925066 | 0.674710691509993 |
| 14 | 0.699301507897403 | 0.691114144340139 |
| 15 | 0.715664653276807 | 0.707488871454668 |
| 16 | 0.732130817743130 | 0.723840435098946 |
| 17 | 0.748811223023284 | 0.740421200387314 |
| 18 | 0.765554915076088 | 0.757201245659254 |

TABLE 90-continued 5 bits, 8 Antenna, Receiver combining based on serving cell

| Index i | Partition | Codebook |
|---|---|---|
| 19 | 0.782496990813652 | 0.773908584492922 |
| 20 | 0.799702097960934 | 0.791085397134383 |
| 21 | 0.816741508476599 | 0.808318798787485 |
| 22 | 0.833603695634338 | 0.825164218165714 |
| 23 | 0.850473654291961 | 0.842043173102962 |
| 24 | 0.867431885509026 | 0.858904135480959 |
| 25 | 0.884400258846983 | 0.875959635537094 |
| 26 | 0.901080692988118 | 0.892840882156873 |
| 27 | 0.917347293739972 | 0.909320503819363 |
| 28 | 0.933485652758603 | 0.925374083660581 |
| 29 | 0.949861838152366 | 0.941597221856625 |
| 30 | 0.966458968246854 | 0.958126454448107 |
| 31 | 0.983209579376229 | 0.974791482045600 |
| 32 | ∞ | 0.991627676706857 |

Table 91 through Table 105 below illustrate examples of different lookup tables 126 with the codebooks 544 and partitions 542 for indexes to obtain the quantized relative amplitude 130 when the user equipment (UE) 104 uses receiver combining based on the combined channel and when the relative amplitude 122 is obtained using Equation (8) above. These tables may be obtained using a Lloyd-Max algorithm. A lookup table 126 used may also be selected based on the number of bits available and the number of transmit antenna ports used for downlink transmission to the user equipment (UE) 104.

TABLE 91

1 bit, 2 Antenna, Receiver combining based on combined channel

| Index i | Partition | Codebook |
|---|---|---|
| 0 | −∞ | |
| 1 | 1.01986931869095 | 0.945008748412819 |
| 2 | ∞ | 1.09472988896909 |

TABLE 92

2 bits, 2 Antenna, Receiver combining based on combined channel

| Index i | Partition | Codebook |
|---|---|---|
| 0 | −∞ | |
| 1 | 0.91973382022068 | 0.86662671773347 |
| 2 | 1.01468945196823 | 0.97284092270789 |
| 3 | 1.12072899759086 | 1.05653798122857 |
| 4 | ∞ | 1.18492001395314 |

TABLE 93

3 bits, 2 Antenna, Receiver combining based on combined channel

| Index i | Partition | Codebook |
|---|---|---|
| 0 | −∞ | |
| 1 | 0.853548678667885 | 0.815982906578003 |
| 2 | 0.919657079497600 | 0.891114450757767 |
| 3 | 0.971504748211820 | 0.948199708237434 |
| 4 | 1.017471332078240 | 0.994809788186207 |
| 5 | 1.067021056126750 | 1.040132875970270 |
| 6 | 1.128868069811680 | 1.093909236283220 |
| 7 | 1.210929982214120 | 1.163826903340140 |
| 8 | ∞ | 1.258033061088100 |

TABLE 94

4 bits, 2 Antenna, Receiver combining based on combined channel

| Index i | Partition | Codebook |
|---|---|---|
| 0 | −∞ | |
| 1 | 0.804084656466882 | 0.779120080903202 |
| 2 | 0.848825035124633 | 0.829049232030562 |
| 3 | 0.885573100521208 | 0.868600838218705 |
| 4 | 0.917230689720738 | 0.902545362823711 |
| 5 | 0.944721073672420 | 0.931916016617765 |
| 6 | 0.969288832650802 | 0.957526130727076 |
| 7 | 0.992357514637411 | 0.981051534574529 |
| 8 | 1.015201066294570 | 1.003663494700290 |
| 9 | 1.039314251214010 | 1.026738637888850 |
| 10 | 1.065778997852100 | 1.051889864539180 |
| 11 | 1.095372132048570 | 1.079668131165010 |
| 12 | 1.129016255404570 | 1.111076132932130 |
| 13 | 1.167344887307160 | 1.146956377877020 |
| 14 | 1.213605471896500 | 1.187733396737300 |
| 15 | 1.271794947563420 | 1.239477547055700 |
| 16 | ∞ | 1.304112348071140 |

TABLE 95

5 bits, 2 Antenna, Receiver combining based on combined channel

| Index i | Partition | Codebook |
|---|---|---|
| 0 | −∞ | |
| 1 | 0.774997140188109 | 0.758251939917571 |
| 2 | 0.805324564655011 | 0.791742340458647 |
| 3 | 0.830595691769130 | 0.818906788851375 |
| 4 | 0.852584164048063 | 0.842284594686885 |
| 5 | 0.872443854672463 | 0.862883733409241 |
| 6 | 0.890810670952851 | 0.882003975935685 |
| 7 | 0.907723800905978 | 0.899617365970016 |
| 8 | 0.923359131672696 | 0.915830235841941 |
| 9 | 0.937906004395412 | 0.930888027503452 |
| 10 | 0.951622687066442 | 0.944923981287372 |
| 11 | 0.964714399674137 | 0.958321392845512 |
| 12 | 0.977251312992942 | 0.971107406502762 |
| 13 | 0.989436874518216 | 0.983395219483123 |
| 14 | 1.001362616124790 | 0.995478529553309 |
| 15 | 1.013391710265370 | 1.007246702696260 |
| 16 | 1.025871300340710 | 1.019536717834480 |
| 17 | 1.038861953162790 | 1.032205882846930 |
| 18 | 1.051684319051470 | 1.045118023478650 |
| 19 | 1.065319437511080 | 1.058250614624300 |
| 20 | 1.079954267634560 | 1.072388260397870 |
| 21 | 1.095481075313820 | 1.087520274871250 |
| 22 | 1.111927543548330 | 1.103441875756390 |
| 23 | 1.129155109624880 | 1.120413211340270 |
| 24 | 1.147114516875960 | 1.137897007909490 |
| 25 | 1.166217482856480 | 1.156332025842440 |
| 26 | 1.186718206422920 | 1.176102939870520 |
| 27 | 1.209296070901170 | 1.197333472975330 |
| 28 | 1.233281158120710 | 1.221258668827000 |
| 29 | 1.258678639406650 | 1.245303647414410 |
| 30 | 1.288466708182460 | 1.272053631398900 |
| 31 | 1.324974923088160 | 1.304879784966010 |
| 32 | ∞ | 1.345070061210300 |

TABLE 96

1 bit, 4 Antenna, Receiver combining based on combined channel

| Index i | Partition | Codebook |
|---|---|---|
| 0 | −∞ | |
| 1 | 1.01797640807373 | 0.923070921364912 |
| 2 | ∞ | 1.11288189478255 |

TABLE 97

2 bits, 4 Antenna, Receiver combining based on combined channel

| Index i | Partition | Codebook |
|---|---|---|
| 0 | −∞ | |
| 1 | 0.91116528143058 | 0.85535644723858 |
| 2 | 1.02004020624439 | 0.96697411562259 |
| 3 | 1.14024803775811 | 1.07310629686620 |
| 4 | ∞ | 1.20738977865002 |

TABLE 98

3 bits, 4 Antenna, Receiver combining based on combined channel

| Index i | Partition | Codebook |
|---|---|---|
| 0 | −∞ | |
| 1 | 0.840429884983718 | 0.801929868675813 |
| 2 | 0.909113631171770 | 0.878929901291622 |
| 3 | 0.967473199520339 | 0.939297361051919 |
| 4 | 1.024378866133890 | 0.995649037988759 |
| 5 | 1.084570694529880 | 1.053108694279020 |
| 6 | 1.153843051959980 | 1.116032694780740 |
| 7 | 1.245126612922250 | 1.191653409139230 |
| 8 | ∞ | 1.298599816705280 |

TABLE 99

4 bits, 4 Antenna, Receiver combining based on combined channel

| Index i | Partition | Codebook |
|---|---|---|
| 0 | −∞ | |
| 1 | 0.778730596388499 | 0.750562816658033 |
| 2 | 0.827927082839710 | 0.806898376118966 |
| 3 | 0.866799266897061 | 0.848955789560454 |
| 4 | 0.900516711444757 | 0.884642744233669 |
| 5 | 0.931511961342207 | 0.916390678655845 |
| 6 | 0.961493912056229 | 0.946633244028568 |
| 7 | 0.991375887973285 | 0.976354580083890 |
| 8 | 1.021626523548850 | 1.006397195862680 |
| 9 | 1.052474411261630 | 1.036855851235010 |
| 10 | 1.084972122927250 | 1.068092971288240 |
| 11 | 1.120355797987550 | 1.101851274566260 |
| 12 | 1.159123169583740 | 1.138860321408850 |
| 13 | 1.203342244200420 | 1.179386017758630 |
| 14 | 1.258141850387400 | 1.227984706422210 |
| 15 | 1.333968386599920 | 1.288985230132590 |
| 16 | ∞ | 1.378951543067260 |

TABLE 100

5 bits, 4 Antenna, Receiver combining based on combined channel

| Index i | Partition | Codebook |
|---|---|---|
| 0 | −∞ | |
| 1 | 0.738126955976624 | 0.715866912441747 |
| 2 | 0.775997964364850 | 0.760386999511501 |
| 3 | 0.803966408817881 | 0.791608929218200 |
| 4 | 0.827422439260690 | 0.816323888417563 |
| 5 | 0.848924775950852 | 0.838520990103816 |
| 6 | 0.869232924310713 | 0.859328561797888 |
| 7 | 0.888462211631945 | 0.879137286823538 |
| 8 | 0.906635810003309 | 0.897787136440352 |
| 9 | 0.924045246441265 | 0.915484483566266 |
| 10 | 0.940870408980587 | 0.932606009316263 |
| 11 | 0.957355274945187 | 0.949134808644911 |
| 12 | 0.973427931403658 | 0.965575741245463 |
| 13 | 0.989091096820399 | 0.981280121561852 |
| 14 | 1.004813774188990 | 0.996902072078947 |
| 15 | 1.020531122036770 | 1.012725476299040 |
| 16 | 1.035893664062630 | 1.028336767774500 |

TABLE 100-continued 5 bits, 4 Antenna, Receiver combining based on combined channel

| Index i | Partition | Codebook |
|---|---|---|
| 17 | 1.051344492318420 | 1.043450560350750 |
| 18 | 1.067448558754490 | 1.059238424286090 |
| 19 | 1.084140712336670 | 1.075658693222900 |
| 20 | 1.101486949785700 | 1.092262731450440 |
| 21 | 1.119701021100730 | 1.110351168120970 |
| 22 | 1.138856359290160 | 1.129050874080490 |
| 23 | 1.158789669902520 | 1.148661844499820 |
| 24 | 1.179769551691440 | 1.168917495305210 |
| 25 | 1.202386775762560 | 1.190621608077660 |
| 26 | 1.227015337170460 | 1.214151943447470 |
| 27 | 1.254338054366660 | 1.239878730893450 |
| 28 | 1.285289798425400 | 1.268797377839870 |
| 29 | 1.321945421181510 | 1.301782219010930 |
| 30 | 1.370172977443850 | 1.342108623352080 |
| 31 | 1.443424640831880 | 1.398237331535610 |
| 32 | ∞ | 1.488611950128140 |

TABLE 101

1 bit, 8 Antenna, Receiver combining based on combined channel

| Index i | Partition | Codebook |
|---|---|---|
| 0 | −∞ | |
| 1 | 1.02678003259388 | 0.910827519025792 |
| 2 | ∞ | 1.14273254616197 |

TABLE 102

2 bits, 8 Antenna, Receiver combining based on combined channel

| Index i | Partition | Codebook |
|---|---|---|
| 0 | −∞ | |
| 1 | 0.89592810045327 | 0.82797892140734 |
| 2 | 1.02942643129913 | 0.96387727949920 |
| 3 | 1.17959366996156 | 1.09497558309907 |
| 4 | ∞ | 1.26421175682406 |

TABLE 103

3 bits, 8 Antenna, Receiver combining based on combined channel

| Index i | Partition | Codebook |
|---|---|---|
| 0 | −∞ | |
| 1 | 0.811140905775452 | 0.765516553741231 |
| 2 | 0.893520654557676 | 0.856765257809673 |
| 3 | 0.964710529845496 | 0.930276051305680 |
| 4 | 1.034115045025410 | 0.999145008385312 |
| 5 | 1.108127870672260 | 1.069085081665510 |
| 6 | 1.194921408146990 | 1.147170659679010 |
| 7 | 1.311143256315670 | 1.242672156614970 |
| 8 | ∞ | 1.379614356016370 |

TABLE 104

4 bits, 8 Antenna, Receiver combining based on combined channel

| Index i | Partition | Codebook |
|---|---|---|
| 0 | −∞ | |
| 1 | 0.751541525597197 | 0.718197170242781 |
| 2 | 0.809596560917947 | 0.784885880951612 |
| 3 | 0.856137077737504 | 0.834307240884282 |
| 4 | 0.897651076378538 | 0.877966914590726 |
| 5 | 0.935891806774255 | 0.917335238166350 |

TABLE 104-continued 4 bits, 8 Antenna, Receiver combining based on combined channel

| Index i | Partition | Codebook |
|---|---|---|
| 6 | 0.972757031592555 | 0.954448375382159 |
| 7 | 1.008993813260840 | 0.991065687802951 |
| 8 | 1.045050195294310 | 1.026921938718740 |
| 9 | 1.082215040902040 | 1.063178451869870 |
| 10 | 1.121165011020680 | 1.101251629934210 |
| 11 | 1.163358197926600 | 1.141078392107140 |
| 12 | 1.210894212073380 | 1.185638003746060 |
| 13 | 1.265976751503450 | 1.236150420400700 |
| 14 | 1.333944548280910 | 1.295803082606200 |
| 15 | 1.430262268808590 | 1.372086013955620 |
| 16 | ∞ | 1.488438523661570 |

TABLE 105

5 bits, 8 Antenna, Receiver combining based on combined channel

| Index i | Partition | Codebook |
|---|---|---|
| 0 | −∞ | |
| 1 | 0.706445393941510 | 0.680281841997247 |
| 2 | 0.751643669105723 | 0.732608945885772 |
| 3 | 0.786008836154066 | 0.770678392325675 |
| 4 | 0.815008731497523 | 0.801339279982457 |
| 5 | 0.841474800452951 | 0.828678183012589 |
| 6 | 0.866184455979141 | 0.854271417893314 |
| 7 | 0.889200420427318 | 0.878097494064968 |
| 8 | 0.910913723615258 | 0.900303346789668 |
| 9 | 0.931521648786278 | 0.921524100440848 |
| 10 | 0.951233674703891 | 0.941519197131708 |
| 11 | 0.970621703419816 | 0.960948152276074 |
| 12 | 0.989814725272528 | 0.980295254563559 |
| 13 | 1.008808605484300 | 0.999334195981497 |
| 14 | 1.028092829855990 | 1.018283014987100 |
| 15 | 1.047580943338490 | 1.037902644724870 |
| 16 | 1.066954385692860 | 1.057259241952110 |
| 17 | 1.086662599532070 | 1.076649529433610 |
| 18 | 1.106763835169190 | 1.096675669630530 |
| 19 | 1.127157939470080 | 1.116852000707860 |
| 20 | 1.148262676057140 | 1.137463878232310 |
| 21 | 1.170116231502150 | 1.159061473881970 |
| 22 | 1.192854624887370 | 1.181170989122320 |
| 23 | 1.216822854870360 | 1.204538260652410 |
| 24 | 1.242392702283720 | 1.229107449088310 |
| 25 | 1.269929526740960 | 1.255677955479140 |
| 26 | 1.299497981982420 | 1.284181098002780 |
| 27 | 1.332579732941480 | 1.314814865962050 |
| 28 | 1.371938986826790 | 1.350344599920910 |
| 29 | 1.420416824616800 | 1.393533373732680 |
| 30 | 1.481104808221280 | 1.447300275500920 |
| 31 | 1.569059226079610 | 1.514909340941640 |
| 32 | ∞ | 1.623209111217590 |

Table 106 through Table 120 below illustrate examples of different lookup tables 126 with the codebooks 544 and partitions 542 for indexes to obtain the quantized relative amplitude 130 when the user equipment (UE) 104 uses receiver combining based on the combined channel and when the relative amplitude 122 is obtained using Equation (9) above. These tables may be obtained using a Lloyd-Max algorithm. A lookup table 126 used may also be selected based on the number of bits available and the number of transmit antenna ports used for downlink transmission to the user equipment (UE) 104.

TABLE 106

1 bit, 2 Antenna, Receiver combining based on combined channel

| Index i | Partition | Codebook |
|---|---|---|
| 0 | −∞ | |
| 1 | 1.07636715485320 | 0.914891701062901 |
| 2 | ∞ | 1.23784260864350 |

TABLE 107

2 bits, 2 Antenna, Receiver combining based on combined channel

| Index i | Partition | Codebook |
|---|---|---|
| 0 | −∞ | |
| 1 | 0.871970647216352 | 0.773183723184639 |
| 2 | 1.06013551021740 | 0.970757571248064 |
| 3 | 1.29444589460171 | 1.14951344918673 |
| 4 | ∞ | 1.43937834001668 |

TABLE 108

3 bits, 2 Antenna, Receiver combining based on combined channel

| Index i | Partition | Codebook |
|---|---|---|
| 0 | −∞ | |
| 1 | 0.751708063182212 | 0.683690727157294 |
| 2 | 0.871707640923125 | 0.819725399207129 |
| 3 | 0.968526975189044 | 0.923689882639120 |
| 4 | 1.06125339559474 | 1.01336406773897 |
| 5 | 1.16865007920471 | 1.10914272345052 |
| 6 | 1.30622582176557 | 1.22815743495891 |
| 7 | 1.49491418567567 | 1.38429420857223 |
| 8 | ∞ | 1.60553416277912 |

TABLE 109

4 bits, 2 Antenna, Receiver combining based on combined channel

| Index i | Partition | Codebook |
|---|---|---|
| 0 | −∞ | |
| 1 | 0.667830014480034 | 0.623091826251691 |
| 2 | 0.748359905808955 | 0.712568202708377 |
| 3 | 0.815320423562896 | 0.784151608909532 |
| 4 | 0.873517522056490 | 0.846489238216260 |
| 5 | 0.925147459250479 | 0.900545805896720 |
| 6 | 0.973246929346330 | 0.949749112604237 |
| 7 | 1.01985193279492 | 0.996744746088422 |
| 8 | 1.06797093289270 | 1.04295911950141 |
| 9 | 1.12012190701895 | 1.09298274628399 |
| 10 | 1.17855225638383 | 1.14726106775390 |
| 11 | 1.24629272136050 | 1.20984344501376 |
| 12 | 1.32456060048177 | 1.28274199770723 |
| 13 | 1.41422436356747 | 1.36637920325632 |
| 14 | 1.52211475274312 | 1.46206952387862 |
| 15 | 1.65894636516505 | 1.58215998160763 |
| 16 | ∞ | 1.73573274872247 |

TABLE 110

5 bits, 2 Antenna, Receiver combining based on combined channel

| Index i | Partition | Codebook |
|---|---|---|
| 0 | −∞ | |
| 1 | 0.619844504712153 | 0.588386260742998 |
| 2 | 0.676556790829974 | 0.651302748681308 |
| 3 | 0.723424108942701 | 0.701810832978641 |
| 4 | 0.764760958391588 | 0.745037384906760 |

TABLE 110-continued 5 bits, 2 Antenna, Receiver combining based on combined channel

| Index i | Partition | Codebook |
|---|---|---|
| 5 | 0.802838400463068 | 0.784484531876415 |
| 6 | 0.837890835450629 | 0.821192269049720 |
| 7 | 0.869700059254853 | 0.854589401851537 |
| 8 | 0.898807638262516 | 0.884810716658169 |
| 9 | 0.926055110314786 | 0.912804559866862 |
| 10 | 0.952007245908811 | 0.939305660762709 |
| 11 | 0.977211961027756 | 0.964708831054913 |
| 12 | 1.00190119303417 | 0.989715091000599 |
| 13 | 1.02684690451415 | 1.01408729506775 |
| 14 | 1.05287267334279 | 1.03960651396055 |
| 15 | 1.07982709668308 | 1.06613883272503 |
| 16 | 1.10750926405339 | 1.09351536064112 |
| 17 | 1.13670380642564 | 1.12150316746566 |
| 18 | 1.16824607391479 | 1.15190444538562 |
| 19 | 1.20170940928299 | 1.18458770244396 |
| 20 | 1.23708457515357 | 1.21883111612202 |
| 21 | 1.27403364460954 | 1.25533803418512 |
| 22 | 1.31200449727638 | 1.29272925503395 |
| 23 | 1.35106831910874 | 1.33127973951880 |
| 24 | 1.39070331875813 | 1.37085689869868 |
| 25 | 1.43150736721080 | 1.41054973881758 |
| 26 | 1.47835939557716 | 1.45246499560401 |
| 27 | 1.53276666984569 | 1.50425379555031 |
| 28 | 1.59039188236140 | 1.56127954414107 |
| 29 | 1.65252467605760 | 1.61950422058173 |
| 30 | 1.72463551943905 | 1.68554513153348 |
| 31 | 1.81357336231310 | 1.76372590734462 |
| 32 | ∞ | 1.86342081728158 |

TABLE 111

1 bit, 4 Antenna, Receiver combining based on combined channel

| Index i | Partition | Codebook |
|---|---|---|
| 0 | −∞ | |
| 1 | 1.07410700688131 | 0.875100819462988 |
| 2 | ∞ | 1.27311319429963 |

TABLE 112

2 bits, 4 Antenna, Receiver combining based on combined channel

| Index i | Partition | Codebook |
|---|---|---|
| 0 | −∞ | |
| 1 | 0.863012740972606 | 0.755121048712654 |
| 2 | 1.08275718456222 | 0.970904433232557 |
| 3 | 1.34873795756212 | 1.19460993589188 |
| 4 | ∞ | 1.50286597923235 |

TABLE 113

3 bits, 4 Antenna, Receiver combining based on combined channel

| Index i | Partition | Codebook |
|---|---|---|
| 0 | −∞ | |
| 1 | 0.733507538780920 | 0.664002126926470 |
| 2 | 0.862086167807174 | 0.803012950635369 |
| 3 | 0.979792096927467 | 0.921159384978978 |
| 4 | 1.10008467533343 | 1.03842480887596 |
| 5 | 1.23317774791283 | 1.16174454179091 |
| 6 | 1.39235527618729 | 1.30461095403475 |
| 7 | 1.61383659412821 | 1.48009959833984 |
| 8 | ∞ | 1.74757358991657 |

TABLE 114

4 bits, 4 Antenna, Receiver combining based on combined channel

| Index i | Partition | Codebook |
|---|---|---|
| 0 | −∞ | |
| 1 | 0.635620434475932 | 0.589329936098401 |
| 2 | 0.719695089485456 | 0.681190932853462 |
| 3 | 0.790504209761748 | 0.757479246117450 |
| 4 | 0.855118299853460 | 0.823529173406046 |
| 5 | 0.917238758558152 | 0.886707426300874 |
| 6 | 0.978266543027255 | 0.947770090815430 |
| 7 | 1.03935000348965 | 1.00876299523908 |
| 8 | 1.10120085758042 | 1.06993701174021 |
| 9 | 1.16620119205302 | 1.13246470342062 |
| 10 | 1.23674909675268 | 1.19993768068541 |
| 11 | 1.31490442006538 | 1.27356051281995 |
| 12 | 1.40382778140712 | 1.35624832731080 |
| 13 | 1.50765542265989 | 1.45140723550344 |
| 14 | 1.64031186304148 | 1.56390360981633 |
| 15 | 1.83533198610928 | 1.71672011626663 |
| 16 | ∞ | 1.95394385595193 |

TABLE 115

5 bits, 4 Antenna, Receiver combining based on combined channel

| Index i | Partition | Codebook |
|---|---|---|
| 0 | −∞ | |
| 1 | 0.583097497398568 | 0.545044262610822 |
| 2 | 0.647954773300646 | 0.621150732186314 |
| 3 | 0.698236629117593 | 0.674758814414978 |
| 4 | 0.742599359296002 | 0.721714443820207 |
| 5 | 0.782323492383219 | 0.763484274771797 |
| 6 | 0.818895982401253 | 0.801162709994641 |
| 7 | 0.853875136286959 | 0.836629254807865 |
| 8 | 0.887936360033875 | 0.871121017766053 |
| 9 | 0.921923030177625 | 0.904751702301697 |
| 10 | 0.956054814149896 | 0.939094358053554 |
| 11 | 0.989949614449709 | 0.973015270246239 |
| 12 | 1.02411637680146 | 1.00688395865318 |
| 13 | 1.05924406227872 | 1.04134879494974 |
| 14 | 1.09548123925157 | 1.07713932960769 |
| 15 | 1.13208354551005 | 1.11382314889545 |
| 16 | 1.16904984328255 | 1.15034394212464 |
| 17 | 1.20763051019103 | 1.18775574444047 |
| 18 | 1.24843747905884 | 1.22750527594159 |
| 19 | 1.29054607636349 | 1.26936968217610 |
| 20 | 1.33274631341470 | 1.31172247055088 |
| 21 | 1.37508305863430 | 1.35377015627852 |
| 22 | 1.41924804882708 | 1.39639596099009 |
| 23 | 1.46697166442665 | 1.44210013666407 |
| 24 | 1.51873584252998 | 1.49184319218924 |
| 25 | 1.57460214486461 | 1.54562849287071 |
| 26 | 1.63562689489066 | 1.60357579685850 |
| 27 | 1.70338032750240 | 1.66767799292281 |
| 28 | 1.78218999540351 | 1.73908266208199 |
| 29 | 1.87993378080101 | 1.82529732872502 |
| 30 | 1.99669888598707 | 1.93457023287700 |
| 31 | 2.16762979367481 | 2.05882753909713 |
| 32 | ∞ | 2.27643204825249 |

TABLE 116

1 bit, 8 Antenna, Receiver combining based on combined channel

| Index i | Partition | Codebook |
|---|---|---|
| 0 | −∞ | |
| 1 | 1.11324904351609 | 0.863977983809522 |
| 2 | ∞ | 1.36252010322265 |

TABLE 117

2 bits, 8 Antenna, Receiver combining based on combined channel

| Index i | Partition | Codebook |
|---|---|---|
| 0 | −∞ | |
| 1 | 0.855911869397609 | 0.723171698317875 |
| 2 | 1.13144689793262 | 0.988652040477344 |
| 3 | 1.47809476187910 | 1.27424175538790 |
| 4 | ∞ | 1.68194776837030 |

TABLE 118

3 bits, 8 Antenna, Receiver combining based on combined channel

| Index i | Partition | Codebook |
|---|---|---|
| 0 | −∞ | |
| 1 | 0.704449531870214 | 0.620778723303957 |
| 2 | 0.860430864682926 | 0.788120340436471 |
| 3 | 1.00550271867841 | 0.932741388929380 |
| 4 | 1.15706478693396 | 1.07826404842744 |
| 5 | 1.32761630573031 | 1.23586552544047 |
| 6 | 1.53724929986553 | 1.41936708602015 |
| 7 | 1.83784919122953 | 1.65513151371091 |
| 8 | ∞ | 2.02056686874815 |

TABLE 119

4 bits, 8 Antenna, Receiver combining based on combined channel

| Index i | Partition | Codebook |
|---|---|---|
| 0 | −∞ | |
| 1 | 0.598926996504800 | 0.542115695226419 |
| 2 | 0.701687351645837 | 0.655738297783180 |
| 3 | 0.788704761843360 | 0.747636405508494 |
| 4 | 0.868729264904978 | 0.829773118178226 |
| 5 | 0.946467079335711 | 0.907685411631729 |
| 6 | 1.02411800168911 | 0.985248747039693 |
| 7 | 1.10312071485613 | 1.06298725633852 |
| 8 | 1.18637197045398 | 1.14325417337374 |
| 9 | 1.27472497738915 | 1.22948976753422 |
| 10 | 1.36980143774841 | 1.31996018724408 |
| 11 | 1.47626651018708 | 1.41964268825275 |
| 12 | 1.59965254892455 | 1.53289033212142 |
| 13 | 1.74800942528271 | 1.66641476572768 |
| 14 | 1.94106932659824 | 1.82960408483774 |
| 15 | 2.23990082513608 | 2.05253456835874 |
| 16 | ∞ | 2.42726708191342 |

TABLE 120

5 bits, 8 Antenna, Receiver combining based on combined channel

| Index i | Partition | Codebook |
|---|---|---|
| 0 | −∞ | |
| 1 | 0.528544217943729 | 0.487946134000525 |
| 2 | 0.600777076944889 | 0.569142301886934 |
| 3 | 0.659091321042917 | 0.632411852002844 |
| 4 | 0.710395304917967 | 0.685770790082989 |
| 5 | 0.757928077172808 | 0.735019819752944 |
| 6 | 0.802031025673358 | 0.780836334592672 |
| 7 | 0.843978853473070 | 0.823225716754043 |
| 8 | 0.885356561850216 | 0.864731990192098 |
| 9 | 0.926802917285793 | 0.905981133508333 |
| 10 | 0.968739175283668 | 0.947624701063253 |
| 11 | 1.01090869131797 | 0.989853649504083 |
| 12 | 1.05381038528283 | 1.03196373313186 |
| 13 | 1.09708483035807 | 1.07565703743380 |
| 14 | 1.14003961652196 | 1.11851262328233 |
| 15 | 1.18414882812649 | 1.16156660976159 |
| 16 | 1.22966405589885 | 1.20673104649139 |

TABLE 120-continued 5 bits, 8 Antenna, Receiver combining based on combined channel

| Index i | Partition | Codebook |
|---|---|---|
| 17 | 1.27621221828078 | 1.25259706530632 |
| 18 | 1.32463911673564 | 1.29982737125524 |
| 19 | 1.37504280709499 | 1.34945086221605 |
| 20 | 1.42791817061959 | 1.40063475197393 |
| 21 | 1.48429936502035 | 1.45520158926524 |
| 22 | 1.54554468606865 | 1.51339714077546 |
| 23 | 1.61235985355338 | 1.57769223136184 |
| 24 | 1.68442374700412 | 1.64702747574491 |
| 25 | 1.76470869894512 | 1.72182001826333 |
| 26 | 1.85750307824202 | 1.80759737962692 |
| 27 | 1.96341327353660 | 1.90740877685711 |
| 28 | 2.08707856154924 | 2.01941777021608 |
| 29 | 2.24524255791690 | 2.15473935288241 |
| 30 | 2.45679057955949 | 2.33574576295139 |
| 31 | 2.74393300489147 | 2.57783539616759 |
| 32 | ∞ | 2.91003061361536 |

Table 121 through Table 135 below illustrate examples of different lookup tables 126 with the codebooks 544 and partitions 542 for indexes to obtain the quantized relative amplitude 130 when the user equipment (UE) 104 uses receiver combining based on the combined channel and when the relative amplitude 122 is obtained using Equation (10) above. These tables may be obtained using a Lloyd-Max algorithm. A lookup table 126 used may also be selected based on the number of bits available and the number of transmit antenna ports used for downlink transmission to the user equipment (UE) 104.

TABLE 121

1 bit, 2 Antenna, Receiver combining based on combined channel

| Index i | Partition | Codebook |
|---|---|---|
| 0 | −∞ | |
| 1 | 0.910456343314186 | 0.859228126426366 |
| 2 | ∞ | 0.961684560202005 |

TABLE 122

2 bits, 2 Antenna, Receiver combining based on combined channel

| Index i | Partition | Codebook |
|---|---|---|
| 0 | −∞ | |
| 1 | 0.845383033806398 | 0.810123932842761 |
| 2 | 0.908196659773228 | 0.880642134770036 |
| 3 | 0.957852112539653 | 0.935751184776421 |
| 4 | ∞ | 0.979953040302885 |

TABLE 123

3 bits, 2 Antenna, Receiver combining based on combined channel

| Index i | Partition | Codebook |
|---|---|---|
| 0 | −∞ | |
| 1 | 0.801274833783638 | 0.777871491467830 |
| 2 | 0.842866242824900 | 0.824678176099446 |
| 3 | 0.876998043279407 | 0.861054309550355 |
| 4 | 0.907075884391316 | 0.892941777008458 |
| 5 | 0.933742780759322 | 0.921209991774173 |
| 6 | 0.957573436543711 | 0.946275569744472 |

TABLE 123-continued 3 bits, 2 Antenna, Receiver combining based on combined channel

| Index i | Partition | Codebook |
|---|---|---|
| 7 | 0.979384731798614 | 0.968871303342950 |
| 8 | ∞ | 0.989898160254279 |

TABLE 124

4 bits, 2 Antenna, Receiver combining based on combined channel

| Index i | Partition | Codebook |
|---|---|---|
| 0 | −∞ | |
| 1 | 0.772689747330706 | 0.756886555458663 |
| 2 | 0.800818876423514 | 0.788492939202750 |
| 3 | 0.823633846357560 | 0.813144813644279 |
| 4 | 0.843047765770973 | 0.834122879070841 |
| 5 | 0.860386446983264 | 0.851972652471104 |
| 6 | 0.876907431543022 | 0.868800241495425 |
| 7 | 0.892650764843817 | 0.885014621590620 |
| 8 | 0.907357633796997 | 0.900286908097014 |
| 9 | 0.921164073080853 | 0.914428359496981 |
| 10 | 0.934191267369022 | 0.927899786664726 |
| 11 | 0.946338202240739 | 0.940482748073317 |
| 12 | 0.957845318515403 | 0.952193656408160 |
| 13 | 0.968932005660311 | 0.963496980622646 |
| 14 | 0.979538814562678 | 0.974367030697976 |
| 15 | 0.989832386125181 | 0.984710598427380 |
| 16 | ∞ | 0.994954173822982 |

TABLE 125

5 bits, 2 Antenna, Receiver combining based on combined channel

| Index i | Partition | Codebook |
|---|---|---|
| 0 | −∞ | |
| 1 | 0.744072015658870 | 0.734508180271827 |
| 2 | 0.760843519386549 | 0.753635851045913 |
| 3 | 0.774424934015896 | 0.768051187727186 |
| 4 | 0.786304414552598 | 0.780798680304607 |
| 5 | 0.796903323730894 | 0.791810148800589 |
| 6 | 0.806953988209372 | 0.801996498661198 |
| 7 | 0.816646794303738 | 0.811911477757546 |
| 8 | 0.826354140814855 | 0.821382110849931 |
| 9 | 0.835960274605100 | 0.831326170779779 |
| 10 | 0.845086195071599 | 0.840594378430420 |
| 11 | 0.853751828769062 | 0.849578011712778 |
| 12 | 0.862052287687205 | 0.857925645825345 |
| 13 | 0.870301088025057 | 0.866178929549064 |
| 14 | 0.878479584525647 | 0.874423246501050 |
| 15 | 0.886656947065704 | 0.882535922550243 |
| 16 | 0.894814108318678 | 0.890777971581164 |
| 17 | 0.902642661919520 | 0.898850245056193 |
| 18 | 0.910177846026161 | 0.906435078782847 |
| 19 | 0.917636845913338 | 0.913920613269475 |
| 20 | 0.924943898385057 | 0.921353078557201 |
| 21 | 0.931923688314054 | 0.928534718212913 |
| 22 | 0.938698036532489 | 0.935312658415194 |
| 23 | 0.945305858556321 | 0.942083414649784 |
| 24 | 0.951697377118483 | 0.948528302462858 |
| 25 | 0.957987732945248 | 0.954866451774107 |
| 26 | 0.964160955765451 | 0.961109014116389 |
| 27 | 0.970255754124280 | 0.967212897414514 |
| 28 | 0.976313782054880 | 0.973298610834046 |
| 29 | 0.982318049343427 | 0.979328953275715 |
| 30 | 0.988292870793123 | 0.985307145411140 |
| 31 | 0.994183256491849 | 0.991278596175106 |
| 32 | ∞ | 0.997087916808592 |

TABLE 126

1 bit, 4 Antenna, Receiver combining
based on combined channel

| Index i | Partition | Codebook |
|---|---|---|
| 0 | $-\infty$ | |
| 1 | 0.898793347812248 | 0.846041723101687 |
| 2 | $\infty$ | 0.951544972522810 |

TABLE 127

2 bits, 4 Antenna, Receiver combining
based on combined channel

| Index i | Partition | Codebook |
|---|---|---|
| 0 | $-\infty$ | |
| 1 | 0.829160293190487 | 0.793076198206100 |
| 2 | 0.893774605777300 | 0.865244388174875 |
| 3 | 0.948212641360840 | 0.922304823379726 |
| 4 | $\infty$ | 0.974120459341955 |

TABLE 128

3 bits, 4 Antenna, Receiver combining
based on combined channel

| Index i | Partition | Codebook |
|---|---|---|
| 0 | $-\infty$ | |
| 1 | 0.775365078893805 | 0.748014857978650 |
| 2 | 0.822300813122588 | 0.802715299808959 |
| 3 | 0.858443787244539 | 0.841886326436216 |
| 4 | 0.889972620651990 | 0.875001248052862 |
| 5 | 0.919101285308134 | 0.904943993251119 |
| 6 | 0.946752518473055 | 0.933258577365150 |
| 7 | 0.973499732923520 | 0.960246459580960 |
| 8 | $\infty$ | 0.986753006266081 |

TABLE 129

4 bits, 4 Antenna, Receiver combining
based on combined channel

| Index i | Partition | Codebook |
|---|---|---|
| 0 | $-\infty$ | |
| 1 | 0.732064889099049 | 0.711051283935242 |
| 2 | 0.767564585414398 | 0.753078494262856 |
| 3 | 0.793576292034840 | 0.782050676565939 |
| 4 | 0.814984012189162 | 0.805101907503741 |
| 5 | 0.833955797414269 | 0.824866116874583 |
| 6 | 0.851651420906003 | 0.843045477953954 |
| 7 | 0.868576438280130 | 0.860257363858051 |
| 8 | 0.884806290116854 | 0.876895512702209 |
| 9 | 0.900238367720072 | 0.892717067531500 |
| 10 | 0.915147624907931 | 0.907759667908644 |
| 11 | 0.929790497746901 | 0.922535581907217 |
| 12 | 0.944120690414971 | 0.937045413586585 |
| 13 | 0.958348469326788 | 0.951195967243357 |
| 14 | 0.972484328756008 | 0.965500971410220 |
| 15 | 0.986319664744416 | 0.979467686101796 |
| 16 | $\infty$ | 0.993171643387036 |

TABLE 130

5 bits, 4 Antenna, Receiver combining
based on combined channel

| Index i | Partition | Codebook |
|---|---|---|
| 0 | $-\infty$ | |
| 1 | 0.686581624909329 | 0.667774402271854 |
| 2 | 0.715758403342576 | 0.705388847546804 |
| 3 | 0.735115013864987 | 0.726127959138347 |
| 4 | 0.751790342539137 | 0.744102068591626 |
| 5 | 0.766395924385369 | 0.759478616486648 |
| 6 | 0.779739482138842 | 0.773313232284089 |
| 7 | 0.791915529884581 | 0.786165731993594 |
| 8 | 0.802882037762167 | 0.797665327775567 |
| 9 | 0.813066130861925 | 0.808098747748768 |
| 10 | 0.822842850753612 | 0.818033513975082 |
| 11 | 0.832316448870470 | 0.827652187532141 |
| 12 | 0.841537036275081 | 0.836980710208798 |
| 13 | 0.850529186615114 | 0.846093362341363 |
| 14 | 0.859269243503570 | 0.854965010888865 |
| 15 | 0.867809986591733 | 0.863573476118276 |
| 16 | 0.876276194510891 | 0.872046497065191 |
| 17 | 0.884601885565474 | 0.880505891956591 |
| 18 | 0.892677122942858 | 0.888697879174358 |
| 19 | 0.900611218414459 | 0.896656366711358 |
| 20 | 0.908488685704656 | 0.904566070117560 |
| 21 | 0.916345915748475 | 0.912411301291753 |
| 22 | 0.924136753220972 | 0.920280530205198 |
| 23 | 0.931802483748684 | 0.927992976236746 |
| 24 | 0.939373439827649 | 0.935611991260622 |
| 25 | 0.946806358171909 | 0.943134888394676 |
| 26 | 0.954175434938602 | 0.950477827949142 |
| 27 | 0.961629192811047 | 0.957873041928062 |
| 28 | 0.969104676565697 | 0.965385343694032 |
| 29 | 0.976697762211214 | 0.972824009437363 |
| 30 | 0.984371948899946 | 0.980571514985064 |
| 31 | 0.992097887266163 | 0.988172382814828 |
| 32 | $\infty$ | 0.996023391717497 |

TABLE 131

1 bit, 8 Antenna, Receiver combining
based on combined channel

| Index i | Partition | Codebook |
|---|---|---|
| 0 | $-\infty$ | |
| 1 | 0.879058627972680 | 0.816098440816548 |
| 2 | $\infty$ | 0.942018815128811 |

TABLE 132

2 bits, 8 Antenna, Receiver combining
based on combined channel

| Index i | Partition | Codebook |
|---|---|---|
| 0 | $-\infty$ | |
| 1 | 0.796142512786106 | 0.753550854459790 |
| 2 | 0.872805540687922 | 0.838734171112423 |
| 3 | 0.937991731214210 | 0.906876910263420 |
| 4 | $\infty$ | 0.969106552164999 |

TABLE 133

3 bits, 8 Antenna, Receiver combining
based on combined channel

| Index i | Partition | Codebook |
|---|---|---|
| 0 | $-\infty$ | |
| 1 | 0.735989212277383 | 0.704926519739675 |
| 2 | 0.790019725008078 | 0.767051904815091 |

TABLE 133-continued 3 bits, 8 Antenna, Receiver combining based on combined channel

| Index i | Partition | Codebook |
|---|---|---|
| 3 | 0.832691538763978 | 0.812987545201065 |
| 4 | 0.870172084607922 | 0.852395532326891 |
| 5 | 0.904470871825254 | 0.887948636888954 |
| 6 | 0.936931727537388 | 0.920993106761554 |
| 7 | 0.968677438270710 | 0.952870348313223 |
| 8 | ∞ | 0.984484528228198 |

TABLE 134

4 bits, 8 Antenna, Receiver combining based on combined channel

| Index i | Partition | Codebook |
|---|---|---|
| 0 | −∞ | |
| 1 | 0.684138074714174 | 0.660630307202097 |
| 2 | 0.723999700241723 | 0.707645842226251 |
| 3 | 0.754185550426834 | 0.740353558257194 |
| 4 | 0.779964457633886 | 0.768017542596474 |
| 5 | 0.802656762208250 | 0.791911372671298 |
| 6 | 0.823318809187342 | 0.813402151745202 |
| 7 | 0.842763465309713 | 0.833235466629481 |
| 8 | 0.861495148955285 | 0.852291463989945 |
| 9 | 0.879835568844078 | 0.870698833920626 |
| 10 | 0.897829745855078 | 0.888972303767531 |
| 11 | 0.915375466573261 | 0.906687187942624 |
| 12 | 0.932401568667493 | 0.924063745203897 |
| 13 | 0.949037685316277 | 0.940739392131089 |
| 14 | 0.965772162952050 | 0.957335978501466 |
| 15 | 0.982820703031977 | 0.974208347402633 |
| 16 | ∞ | 0.991433058661321 |

TABLE 135

5 bits, 8 Antenna, Receiver combining based on combined channel

| Index i | Partition | Codebook |
|---|---|---|
| 0 | −∞ | |
| 1 | 0.634272127028901 | 0.614700343034539 |
| 2 | 0.667177725867886 | 0.653843911023262 |
| 3 | 0.690744610744471 | 0.680511540712510 |
| 4 | 0.709499194473766 | 0.700977680776432 |
| 5 | 0.725565115300573 | 0.718020708171099 |
| 6 | 0.740206994163187 | 0.733109522430046 |
| 7 | 0.754230679014352 | 0.747304465896328 |
| 8 | 0.767496718997649 | 0.761156892132377 |
| 9 | 0.779745287944148 | 0.773836545862920 |
| 10 | 0.791337642334742 | 0.785654030025376 |
| 11 | 0.802555515422420 | 0.797021254644108 |
| 12 | 0.813241505032440 | 0.808089776200733 |
| 13 | 0.823329512841045 | 0.818393233864147 |
| 14 | 0.833088062039382 | 0.828265791817942 |
| 15 | 0.842730553179606 | 0.837910332260822 |
| 16 | 0.852318670967247 | 0.847550774098391 |
| 17 | 0.861809266926740 | 0.857086567836104 |
| 18 | 0.871351512501314 | 0.866531966017376 |
| 19 | 0.880953566557998 | 0.876171058985252 |
| 20 | 0.890499512893663 | 0.885736074130745 |
| 21 | 0.899935070643586 | 0.895262951656581 |
| 22 | 0.909192639982231 | 0.904607189630591 |
| 23 | 0.918449113191388 | 0.913778090333871 |
| 24 | 0.927623141035163 | 0.923120136048904 |
| 25 | 0.936662735255028 | 0.932126146021422 |
| 26 | 0.945716929639342 | 0.941199324488633 |
| 27 | 0.954631180414343 | 0.950234534790051 |
| 28 | 0.963526026741812 | 0.959027826038636 |
| 29 | 0.972574901382134 | 0.968024227444988 |
| 30 | 0.981682493327862 | 0.977125575319281 |

TABLE 135-continued 5 bits, 8 Antenna, Receiver combining based on combined channel

| Index i | Partition | Codebook |
|---|---|---|
| 31 | 0.990838949836768 | 0.986239411336443 |
| 32 | ∞ | 0.995438488337093 |

Table 136 through Table 150 below illustrate examples of different lookup tables 126 with the codebooks 544 and partitions 542 for indexes to obtain the quantized relative amplitude 130 when the user equipment (UE) 104 uses receiver combining based on the combined channel and when the relative amplitude 122 is obtained using Equation (11) above. These tables may be obtained using a Lloyd-Max algorithm. A lookup table 126 used may also be selected based on the number of bits available and the number of transmit antenna ports used for downlink transmission to the user equipment (UE) 104.

TABLE 136

1 bit, 2 Antenna, Receiver combining based on combined channel

| Index i | Partition | Codebook |
|---|---|---|
| 0 | −∞ | |
| 1 | 0.837548256276136 | 0.746583437382367 |
| 2 | ∞ | 0.928513075169906 |

TABLE 137

2 bits, 2 Antenna, Receiver combining based on combined channel

| Index i | Partition | Codebook |
|---|---|---|
| 0 | −∞ | |
| 1 | 0.725563375120884 | 0.665098812581691 |
| 2 | 0.834327351289805 | 0.786027937660076 |
| 3 | 0.922702072926234 | 0.882626764919534 |
| 4 | ∞ | 0.962777380932935 |

TABLE 138

3 bits, 2 Antenna, Receiver combining based on combined channel

| Index i | Partition | Codebook |
|---|---|---|
| 0 | −∞ | |
| 1 | 0.648587458202216 | 0.609655654860919 |
| 2 | 0.718693955097477 | 0.687519261543514 |
| 3 | 0.777657687500927 | 0.749868648651440 |
| 4 | 0.830420719745617 | 0.805446726350414 |
| 5 | 0.877963516984195 | 0.855394713140820 |
| 6 | 0.921277429598419 | 0.900532320827571 |
| 7 | 0.961552820944005 | 0.942022538369268 |
| 8 | ∞ | 0.981083103518743 |

TABLE 139

4 bits, 2 Antenna, Receiver combining based on combined channel

| Index i | Partition | Codebook |
|---|---|---|
| 0 | −∞ | |
| 1 | 0.599727897577442 | 0.574814278818825 |
| 2 | 0.644605789107980 | 0.624641516336058 |
| 3 | 0.682319658331317 | 0.664570061879902 |
| 4 | 0.715928412160983 | 0.700069254782731 |

TABLE 139-continued 4 bits, 2 Antenna, Receiver combining based on combined channel

| Index i | Partition | Codebook |
|---|---|---|
| 5 | 0.746682968766651 | 0.731787569539235 |
| 6 | 0.775827376075744 | 0.761578367994067 |
| 7 | 0.803681573113405 | 0.790076384157421 |
| 8 | 0.829993167108695 | 0.817286762069388 |
| 9 | 0.854843317107685 | 0.842699572148002 |
| 10 | 0.878297012404837 | 0.866987062067369 |
| 11 | 0.900186400011141 | 0.889606962742306 |
| 12 | 0.921035378542328 | 0.910765837279976 |
| 13 | 0.941341277611779 | 0.931304919804680 |
| 14 | 0.961111129760613 | 0.951377635418878 |
| 15 | 0.980577120671857 | 0.970844624102349 |
| 16 | ∞ | 0.990309617241365 |

TABLE 140

5 bits, 2 Antenna, Receiver combining based on combined channel

| Index i | Partition | Codebook |
|---|---|---|
| 0 | −∞ | |
| 1 | 0.560330962152529 | 0.545579843753230 |
| 2 | 0.586372165240294 | 0.575082080551828 |
| 3 | 0.608062713579205 | 0.597662249928760 |
| 4 | 0.627685242714138 | 0.618463177229651 |
| 5 | 0.646375320772952 | 0.636907308198625 |
| 6 | 0.664411533614896 | 0.655584333347277 |
| 7 | 0.681523182212955 | 0.672979733882514 |
| 8 | 0.697805580470115 | 0.690066630543395 |
| 9 | 0.712998076371025 | 0.705544530396835 |
| 10 | 0.727547351926101 | 0.720451622345216 |
| 11 | 0.741852970738830 | 0.734643081506987 |
| 12 | 0.756151783207961 | 0.749062859970672 |
| 13 | 0.770241126271079 | 0.763240706445250 |
| 14 | 0.784147754349181 | 0.777241546096907 |
| 15 | 0.797780896849391 | 0.791053962601456 |
| 16 | 0.811229119608937 | 0.804507831097326 |
| 17 | 0.824539870837084 | 0.817950408120548 |
| 18 | 0.837343007573158 | 0.831129333553619 |
| 19 | 0.849686691580346 | 0.843556681592696 |
| 20 | 0.861952142222052 | 0.855816701567997 |
| 21 | 0.874088799023600 | 0.868087582876108 |
| 22 | 0.885945305900170 | 0.880090015171091 |
| 23 | 0.897483707558882 | 0.891800596629248 |
| 24 | 0.908758048622958 | 0.903166818488515 |
| 25 | 0.920039350194236 | 0.914349278757401 |
| 26 | 0.931361205864140 | 0.925729421631072 |
| 27 | 0.942685647366833 | 0.936992990097208 |
| 28 | 0.954094191834805 | 0.948378304636458 |
| 29 | 0.965555170364002 | 0.959810079033152 |
| 30 | 0.977114616770630 | 0.971300261694853 |
| 31 | 0.988612087307055 | 0.982928971846407 |
| 32 | ∞ | 0.994295202767704 |

TABLE 141

1 bit, 4 Antenna, Receiver combining based on combined channel

| Index i | Partition | Codebook |
|---|---|---|
| 0 | −∞ | |
| 1 | 0.817130482830634 | 0.723919874284410 |
| 2 | ∞ | 0.910341091376858 |

TABLE 142

2 bits, 4 Antenna, Receiver combining based on combined channel

| Index i | Partition | Codebook |
|---|---|---|
| 0 | −∞ | |
| 1 | 0.700084700084003 | 0.639480978243448 |
| 2 | 0.810552945729416 | 0.760688421924558 |
| 3 | 0.906762789157092 | 0.860417469534273 |
| 4 | ∞ | 0.953108108779912 |

TABLE 143

3 bits, 4 Antenna, Receiver combining based on combined channel

| Index i | Partition | Codebook |
|---|---|---|
| 0 | −∞ | |
| 1 | 0.610457192931005 | 0.567337057541379 |
| 2 | 0.686387710710994 | 0.653577328320632 |
| 3 | 0.747741017651375 | 0.719198093101355 |
| 4 | 0.802599761566891 | 0.776283942201394 |
| 5 | 0.854156520793324 | 0.828915580932387 |
| 6 | 0.903618906708178 | 0.879397460654260 |
| 7 | 0.951841545426160 | 0.927840352762096 |
| 8 | ∞ | 0.975842738090224 |

TABLE 144

4 bits, 4 Antenna, Receiver combining based on combined channel

| Index i | Partition | Codebook |
|---|---|---|
| 0 | −∞ | |
| 1 | 0.546779028864126 | 0.514502540127209 |
| 2 | 0.602246230777005 | 0.579055517601043 |
| 3 | 0.644392967855465 | 0.625436943952966 |
| 4 | 0.680271653643829 | 0.663348991757963 |
| 5 | 0.712815174918974 | 0.697194315529695 |
| 6 | 0.742851678308472 | 0.728436034308253 |
| 7 | 0.770965307980420 | 0.757267322308690 |
| 8 | 0.797933986011434 | 0.784663293652150 |
| 9 | 0.824105356199783 | 0.811204678370718 |
| 10 | 0.849644147340593 | 0.837006034028849 |
| 11 | 0.874741790646680 | 0.862282260652337 |
| 12 | 0.899524622834607 | 0.887201320641023 |
| 13 | 0.924597438243410 | 0.911847925028190 |
| 14 | 0.950077361143093 | 0.937346951458630 |
| 15 | 0.975202696662467 | 0.962807770827556 |
| 16 | ∞ | 0.987597622497378 |

TABLE 145

5 bits, 4 Antenna, Receiver combining based on combined channel

| Index i | Partition | Codebook |
|---|---|---|
| 0 | −∞ | |
| 1 | 0.474906878052175 | 0.448572594516827 |
| 2 | 0.516972284815104 | 0.501241161587523 |
| 3 | 0.546533480225689 | 0.532703408042685 |
| 4 | 0.572129355928619 | 0.560363552408694 |
| 5 | 0.594642640230199 | 0.583895159448544 |
| 6 | 0.615288698998694 | 0.605390121011854 |
| 7 | 0.634806746690122 | 0.625187276985534 |
| 8 | 0.653374872002275 | 0.644426216394710 |
| 9 | 0.670824369165124 | 0.662323527609840 |
| 10 | 0.687648729500831 | 0.679325210720408 |
| 11 | 0.704059833822295 | 0.695972248281255 |
| 12 | 0.720042433178019 | 0.712147419363335 |
| 13 | 0.735353423669237 | 0.727937446992704 |
| 14 | 0.750060323726691 | 0.742769400345770 |
| 15 | 0.764508311297653 | 0.757351247107613 |
| 16 | 0.778590962166679 | 0.771665375487694 |

TABLE 145-continued 5 bits, 4 Antenna, Receiver combining based on combined channel

| Index i | Partition | Codebook |
|---|---|---|
| 17 | 0.792583381627356 | 0.785516548845663 |
| 18 | 0.806579174214368 | 0.799650214409049 |
| 19 | 0.820229590562504 | 0.813508134019688 |
| 20 | 0.833645877218196 | 0.826951047105321 |
| 21 | 0.846833373470566 | 0.840340707331072 |
| 22 | 0.859913207336148 | 0.853326039610061 |
| 23 | 0.873108646437415 | 0.866500375062235 |
| 24 | 0.886276370326794 | 0.879716917812595 |
| 25 | 0.899583340684042 | 0.892835822840992 |
| 26 | 0.913417677810853 | 0.906330858527092 |
| 27 | 0.927701888944164 | 0.920504497094614 |
| 28 | 0.941933590065744 | 0.934899280793715 |
| 29 | 0.956196872868691 | 0.948967899337773 |
| 30 | 0.970555606175456 | 0.963425846399609 |
| 31 | 0.985085151561833 | 0.977685365951303 |
| 32 | ∞ | 0.992484937172363 |

TABLE 146

1 bit, 8 Antenna, Receiver combining based on combined channel

| Index i | Partition | Codebook |
|---|---|---|
| 0 | -∞ | |
| 1 | 0.786160215388890 | 0.677691857209799 |
| 2 | ∞ | 0.894628573567982 |

TABLE 147

2 bits, 8 Antenna, Receiver combining based on combined channel

| Index i | Partition | Codebook |
|---|---|---|
| 0 | -∞ | |
| 1 | 0.648562682970780 | 0.580072591977534 |
| 2 | 0.775174437508856 | 0.717052773964025 |
| 3 | 0.888638017563039 | 0.833296101053686 |
| 4 | ∞ | 0.943979934072391 |

TABLE 148

3 bits, 8 Antenna, Receiver combining based on combined channel

| Index i | Partition | Codebook |
|---|---|---|
| 0 | -∞ | |
| 1 | 0.556033516217647 | 0.508979431041819 |
| 2 | 0.639322247834289 | 0.603087601393475 |
| 3 | 0.707846230848130 | 0.675556894275104 |
| 4 | 0.770399690702527 | 0.740135567421156 |
| 5 | 0.829860889188174 | 0.800663813983897 |
| 6 | 0.887340565026126 | 0.859057964392450 |
| 7 | 0.943913821153819 | 0.915623165659801 |
| 8 | ∞ | 0.972204476647836 |

TABLE 149

4 bits, 8 Antenna, Receiver combining based on combined channel

| Index i | Partition | Codebook |
|---|---|---|
| 0 | -∞ | |
| 1 | 0.485545211218459 | 0.451433965301349 |
| 2 | 0.544409211187473 | 0.519654571355569 |
| 3 | 0.590296911517340 | 0.569161965239378 |
| 4 | 0.630402763719233 | 0.611431857795302 |
| 5 | 0.666862095799977 | 0.649373669643165 |

TABLE 149-continued 4 bits, 8 Antenna, Receiver combining based on combined channel

| Index i | Partition | Codebook |
|---|---|---|
| 6 | 0.700902323884797 | 0.684350521956790 |
| 7 | 0.733322466123468 | 0.717454125812805 |
| 8 | 0.764869970812281 | 0.749190806434131 |
| 9 | 0.795391375128020 | 0.780549135190430 |
| 10 | 0.824789053287319 | 0.810233615065611 |
| 11 | 0.853804236955321 | 0.839344491509027 |
| 12 | 0.882807506200829 | 0.868263982401614 |
| 13 | 0.911891796421538 | 0.897351030000043 |
| 14 | 0.941089982236236 | 0.926432562843032 |
| 15 | 0.970456658090998 | 0.955747401629440 |
| 16 | ∞ | 0.985165914552556 |

TABLE 150

5 bits, 8 Antenna, Receiver combining based on combined channel

| Index i | Partition | Codebook |
|---|---|---|
| 0 | -∞ | |
| 1 | 0.418152315339603 | 0.393304437135295 |
| 2 | 0.460516635674202 | 0.443000193543910 |
| 3 | 0.492989313852757 | 0.478033077804494 |
| 4 | 0.520584584355250 | 0.507945549901020 |
| 5 | 0.545075751251037 | 0.533223618809479 |
| 6 | 0.568074650436732 | 0.556927883692594 |
| 7 | 0.589362000294904 | 0.579221417180871 |
| 8 | 0.609073337518604 | 0.599502583408938 |
| 9 | 0.627780794281404 | 0.618644091628270 |
| 10 | 0.645837227820068 | 0.636917496934539 |
| 11 | 0.663141964520746 | 0.654756958705597 |
| 12 | 0.679586194801680 | 0.671526970335896 |
| 13 | 0.695574914782822 | 0.687645419267465 |
| 14 | 0.711415977327007 | 0.703504410298179 |
| 15 | 0.727153943560001 | 0.719327544355834 |
| 16 | 0.742742096748018 | 0.734980342764167 |
| 17 | 0.758458477766232 | 0.750503850731869 |
| 18 | 0.774415110395988 | 0.766413104800594 |
| 19 | 0.790312834311954 | 0.782417115991381 |
| 20 | 0.805909973863758 | 0.798208552632527 |
| 21 | 0.821344971100107 | 0.813611395094988 |
| 22 | 0.836950704374560 | 0.829078547105225 |
| 23 | 0.852601862023332 | 0.844822861643895 |
| 24 | 0.868094796692422 | 0.860380862402769 |
| 25 | 0.883500238904934 | 0.875808730982074 |
| 26 | 0.899087426218004 | 0.891191746827794 |
| 27 | 0.914954055439947 | 0.906983105608215 |
| 28 | 0.931131900771575 | 0.922925005271680 |
| 29 | 0.947872551495590 | 0.939338796271470 |
| 30 | 0.965020382418870 | 0.956406306719710 |
| 31 | 0.982401913387605 | 0.973634458118029 |
| 32 | ∞ | 0.991169368657181 |

Figure 9:
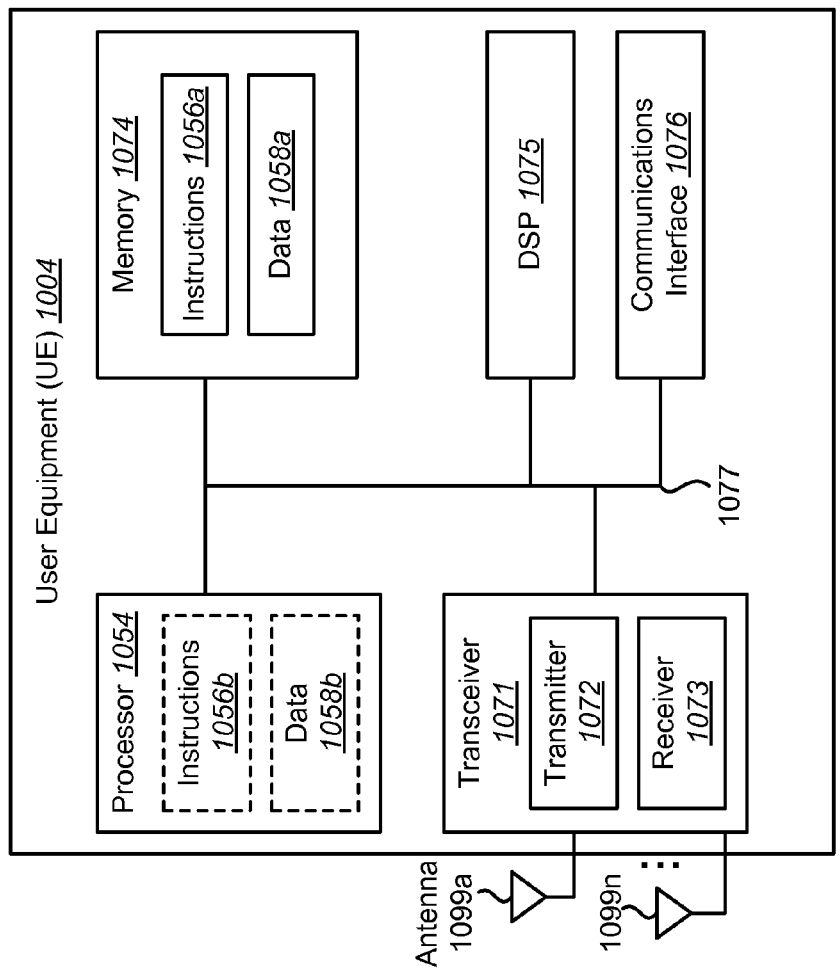
FIG. 9 illustrates various components that may be utilized in a user equipment (UE)

FIG. 9 illustrates various components that may be utilized in a user equipment (UE) 1004. The user equipment (UE) 1004 may be utilized as the user equipment (UE) 104 illustrated previously. The user equipment (UE) 1004 includes a processor 1054 that controls operation of the user equipment (UE) 1004. The processor 1054 may also be referred to as a CPU. Memory 1074, which may include both read-only memory (ROM), random access memory (RAM) or any type of device that may store information, provides instructions 1056*a* and data 1058*a* to the processor 1054. A portion of the memory 1074 may also include non-volatile random access memory (NVRAM). Instructions 1056*b* and data 1058*b* may also reside in the processor 1054. Instructions 1056*b* and/or data 1058*b* loaded into the processor 1054 may also include instructions 1056*a* and/or data 1058*a* from memory 1074 that were loaded for execution or processing by the processor 1054. The instructions 1056b may be executed by the processor 1054 to implement the systems and methods disclosed herein.

The user equipment (UE) 1004 may also include a housing that contains a transmitter 1072 and a receiver 1073 to allow transmission and reception of data. The transmitter 1072 and receiver 1073 may be combined into a transceiver 1071. One or more antennas 1099a-n are attached to the housing and electrically coupled to the transceiver 1071.

The various components of the user equipment (UE) 1004 are coupled together by a bus system 1077, which may include a power bus, a control signal bus, and a status signal bus, in addition to a data bus. However, for the sake of clarity, the various buses are illustrated in FIG. 9 as the bus system 1077. The user equipment (UE) 1004 may also include a digital signal processor (DSP) 1075 for use in processing signals. The user equipment (UE) 1004 may also include a communications interface 1076 that provides user access to the functions of the user equipment (UE) 1004. The user equipment (UE) 1004 illustrated in FIG. 9 is a functional block diagram rather than a listing of specific components.

Figure 10:
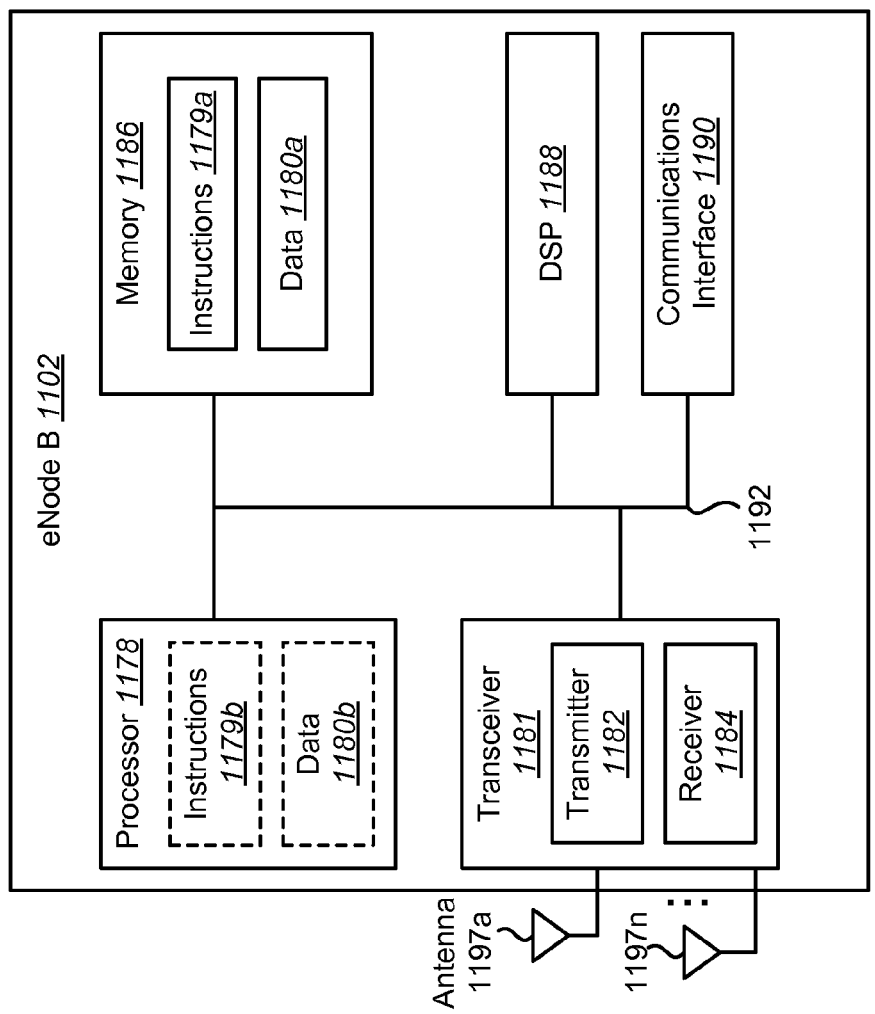
FIG. 10 illustrates various components that may be utilized in an eNode B.

FIG. 10 illustrates various components that may be utilized in an eNode B 1102. The eNode B 1102 may include and/or control one or more points 102. The eNode B 1102 may include components that are similar to the components discussed above in relation to the user equipment (UE) 1004, including a processor 1178, memory 1186 that provides instructions 1179a and data 1180a to the processor 1178, instructions 1179b and data 1180b that may reside in or be loaded into the processor 1178, a housing that contains a transmitter 1182 and a receiver 1184 (which may be combined into a transceiver 1181), one or more antennas 1197a-n electrically coupled to the transceiver 1181, a bus system 1192, a DSP 1188 for use in processing signals, a communications interface 1190 and so forth.

Unless otherwise noted, the use of '/' above represents the phrase "and/or."

The functions described herein may be implemented in hardware, software, firmware or any combination thereof. If implemented in software, the functions may be stored as one or more instructions on a computer-readable medium. The term "computer-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

As used herein, the term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory may be integral to a processor and still be said to be in electronic communication with the processor.

The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may comprise a single computer-readable statement or many computer-readable statements.

Software or instructions may also be transmitted over a transmission medium. For example, if the software is transmitted from a website, server, or other remote source using a coaxial cable, fiber optic cable, twisted pair, digital subscriber line (DSL) or wireless technologies such as infrared, radio, and microwave, then the coaxial cable, fiber optic cable, twisted pair, DSL, or wireless technologies such as infrared, radio and microwave are included in the definition of transmission medium.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:
1. A method for quantizing a relative phase and a relative amplitude, comprising:
  obtaining a received symbol;
  determining a relative phase from the received symbol;

determining a relative amplitude from the received symbol;
obtaining a quantized relative phase; and
obtaining a quantized relative amplitude;
wherein a quantization error of the quantized relative phase and the quantized relative amplitude is less than a quantization error of a uniform quantizer for both the relative phase and the relative amplitude.

2. The method of claim 1, further comprising feeding back the quantized relative phase and the quantized relative amplitude to a serving eNode B.

3. The method of claim 1, wherein the method is performed by a user equipment (UE).

4. The method of claim 3, further comprising:
receiving signals from a first set of antenna ports over a first downlink channel, wherein the first set of antenna ports use a first reference signal configuration; and
receiving signals from a second set of antenna ports over a second downlink channel, wherein the second set of antenna ports use a second reference signal configuration, wherein the received symbol is obtained from the signals.

5. The method of claim 4, wherein the first set of antenna ports comprises a first transmission point, wherein the second set of antenna ports comprises a second transmission point, and wherein the first transmission point and the second transmission point use coordinated multipoint (CoMP) transmissions.

6. The method of claim 5, wherein the first transmission point is a serving point.

7. The method of claim 5, wherein the first transmission point is a serving point and the second transmission point is a serving point.

8. The method of claim 5, further comprising:
estimating a combined downlink channel between the UE and both the first transmission point and the second transmission point; and
performing a singular value decomposition operation on the estimated downlink channel.

9. The method of claim 5, wherein the relative amplitude is one of an amplitude of a received signal from the first transmission point divided by an amplitude of a received signal from the second transmission point, a square of the amplitude of the received signal from the first transmission point divided by a square of the amplitude of the received signal from the second transmission point, a minimum of the amplitude of the received signal from the first transmission point and the amplitude of the received signal from the second transmission point divided by a maximum of the amplitude of the received signal from the first transmission point and the amplitude of the received signal from the second transmission point, and a square of a minimum of the amplitude of the received signal from the first transmission point and the amplitude of the received signal from the second transmission point divided by a square of a maximum of the amplitude of the received signal from the first transmission point and the amplitude of the received signal from the second transmission point.

10. The method of claim 4, wherein obtaining the quantized relative phase comprises:
determining a number of bits available for use in the quantized relative phase;
determining a number of transmit antenna ports used for downlink transmission; and
using a first lookup table to obtain a set of partition and codebook as the quantized relative phase, wherein the first lookup table is dependent on the number of bits available and the number of transmit antenna ports used.

11. The method of claim 10, wherein the first lookup table is generated using a Lloyd-Max algorithm.

12. The method of claim 10, wherein a second lookup table is used to determine the first lookup table used.

13. The method of claim 10, wherein the first lookup table is dependent on receiver combining based on a combined channel and using mean squared error as a metric for evaluating quantization error.

14. The method of claim 10, wherein the first lookup table is dependent on receiver combining based on a combined channel and using absolute value of error as a metric for evaluating quantization error.

15. The method of claim 4, wherein obtaining the quantized relative amplitude comprises:
determining a number of bits available for use in the quantized relative amplitude;
determining a number of transmit antenna ports used for downlink transmission; and
using a first lookup table to obtain a set of partition and codebook as the quantized relative amplitude, wherein the first lookup table is dependent on the number of bits available, the number of transmit antenna ports used, and one of receiver combining based on a serving cell channel and receiver combining based on a combined channel.

16. The method of claim 15, wherein the first lookup table is generated using a Lloyd-Max algorithm.

17. The method of claim 15, wherein a second lookup table is used to determine the first lookup table.

18. The method of claim 1, wherein the quantized relative phase comprises a partition and a codebook, and wherein the partition and the codebook are obtained directly from a distribution of the relative phase.

19. The method of claim 1, wherein the quantized relative amplitude comprises a partition and a codebook, and wherein the partition and the codebook are obtained directly from a distribution of the relative amplitude.

20. A user equipment (UE) configured for quantizing a relative phase and a relative amplitude, comprising:
a processor;
memory in electronic communication with the processor;
instructions stored in the memory, the instructions being executable to:
obtain a received symbol;
determine a relative phase from the received symbol;
determine a relative amplitude from the received symbol;
obtain a quantized relative phase; and
obtain a quantized relative amplitude,
wherein a quantization error of the quantized relative phase and the quantized relative amplitude is less than a quantization error of a uniform quantizer for both the relative phase and the relative amplitude.

21. The UE of claim 20, wherein the instructions are further executable to feedback the quantized relative phase and the quantized relative amplitude to a serving eNode B.

22. The UE of claim 20, wherein the instructions are further executable to:
receive signals from a first set of antenna ports over a first downlink channel, wherein the first set of antenna ports use a first reference signal configuration; and
receive signals from a second set of antenna ports over a second downlink channel, wherein the second set of antenna ports use a second reference signal configuration, wherein the received symbol is obtained from the signals.

23. The UE of claim 22, wherein the first set of antenna ports comprises a first transmission point, wherein the second set of antenna ports comprises a second transmission point, and wherein the first transmission point and the second transmission point use coordinated multipoint (CoMP) transmissions.

24. The UE of claim 23, wherein the first transmission point is a serving point.

25. The UE of claim 23, wherein the first transmission point is a serving point and the second transmission point is a serving point.

26. The UE of claim 23, wherein the instructions are further executable to:
estimate a combined downlink channel between the UE and both the first transmission point and the second transmission point; and
perform a singular value decomposition operation on the estimated combined downlink channel.

27. The UE of claim 23, wherein the relative amplitude is one of an amplitude of a received signal from the first transmission point divided by an amplitude of a received signal from the second transmission point, a square of the amplitude of the received signal from the first transmission point divided by a square of the amplitude of the received signal from the second transmission point, a minimum of the amplitude of the received signal from the first transmission point and the amplitude of the received signal from the second transmission point divided by a maximum of the amplitude of the received signal from the first transmission point and the amplitude of the received signal from the second transmission point, and a square of a minimum of the amplitude of the received signal from the first transmission point and the amplitude of the received signal from the second transmission point divided by a maximum of the amplitude of the received signal from the first transmission point and a square of the amplitude of the received signal from the second transmission point.

28. The UE of claim 22, wherein the instructions executable to obtain the quantized relative phase comprise instructions executable to:
determine a number of bits available for use in the quantized relative phase;
determine a number of transmit antenna ports used downlink transmission; and
use a first lookup table to obtain a set of partition and codebook as the quantized relative phase, wherein the first lookup table is dependent on the number of bits available and the number of transmit antenna ports used.

29. The UE of claim 28, wherein the first lookup table is generated using a Lloyd-Max algorithm.

30. The UE of claim 28, wherein a second lookup table is used to determine the first lookup table.

31. The UE of claim 28, wherein the first lookup table is dependent on receiver combining based on a combined channel and using mean squared error as a metric for evaluating quantization error.

32. The UE of claim 28, wherein the first lookup table is dependent on receiver combining based on a combined channel and using absolute value of error as a metric for evaluating quantization error.

33. The UE of claim 22, wherein the instructions executable to obtain the quantized relative amplitude comprise instructions executable to:
determine a number of bits available for use in the quantized relative amplitude;
determine a number of transmit antenna ports used for downlink transmission; and
use a first lookup table to obtain a set of partition and codebook as the quantized relative amplitude, wherein the first lookup table is dependent on the number of bits available, the number of transmit antenna ports used, and one of receiver combining based on a serving cell channel and receiver combining based on a combined channel.

34. The UE of claim 33, wherein the first lookup table is generated using a Lloyd-Max algorithm.

35. The UE of claim 33, wherein a second lookup table is used to determine the first lookup table.

36. The UE of claim 20, wherein the quantized relative phase comprises a partition and a codebook, and wherein the partition and the codebook are obtained directly from a distribution of the relative phase.

37. The UE of claim 20, wherein the quantized relative amplitude comprises a partition and a codebook, and wherein the partition and the codebook are obtained directly from a distribution of the relative amplitude.

* * * * *